(12) United States Patent
Cooper et al.

(10) Patent No.: US 10,331,121 B2
(45) Date of Patent: Jun. 25, 2019

(54) VEHICLE COMMUNICATION SYSTEM

(71) Applicant: General Electric Company, Schenectady, NY (US)

(72) Inventors: Jared Klineman Cooper, Melbourne, FL (US); Brian Joseph McManus, Fort Worth, TX (US); Frank Wawrzyniak, Melbourne, FL (US); Ralph C. Haddock, III, Melbourne, FL (US); Robert James Foy, Melbourne, FL (US); James Glen Corry, Melbourne, FL (US); Mark Bradshaw Kraeling, Melbourne, FL (US); Todd William Goodermuth, Melbourne, FL (US); Eugene Smith, Melbourne, FL (US); Steven Andrew Kellner, Melbourne, FL (US); Joseph Mario Nazareth, Melbourne, FL (US); Brian William Schroeck, Melbourne, FL (US); David Michael Peltz, Melbourne, FL (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

(21) Appl. No.: 15/377,594

(22) Filed: Dec. 13, 2016

(65) Prior Publication Data

US 2017/0090473 A1 Mar. 30, 2017

Related U.S. Application Data

(63) Continuation-in-part of application No. 14/616,795, filed on Feb. 9, 2015, now abandoned, and a
(Continued)

(51) Int. Cl.
*G05D 1/00* (2006.01)
*H04W 4/38* (2018.01)
(Continued)

(52) U.S. Cl.
CPC ........ *G05D 1/0027* (2013.01); *B61L 15/0027* (2013.01); *B61L 15/0036* (2013.01);
(Continued)

(58) Field of Classification Search
CPC ..... G05D 1/0027; G05D 1/0022; H04W 4/38; H04W 76/11; H04W 4/006;
(Continued)

(56) References Cited

U.S. PATENT DOCUMENTS

2002/0004693 A1* 1/2002 Collins ..................... B61L 1/14
701/19
2004/0193334 A1* 9/2004 Carlsson .............. G05D 1/0022
701/9

(Continued)

*Primary Examiner* — Aaron L Troost
*Assistant Examiner* — Paula L Schneider
(74) *Attorney, Agent, or Firm* — Christopher R. Carroll; The Small Patent Law Group LLC

(57) ABSTRACT

A communication system and method for communicatively linking vehicles in a vehicle consist determine a vehicle identifier for a first remote vehicle included in a vehicle consist formed from a lead vehicle and at least the first remote vehicle. The system and method communicate a wireless linking message addressed to the vehicle identifier from the lead vehicle to the first remote vehicle, and establish a communication link between the lead vehicle and the first remote vehicle responsive to receipt of the wireless linking message at the first remote vehicle. The communication link is established such that movement of the first remote vehicle is remotely controlled from the lead vehicle via the communication link. The communication link is established without an operator entering the first remote vehicle.

9 Claims, 31 Drawing Sheets

Related U.S. Application Data continuation-in-part of application No. 14/836,063, filed on Aug. 26, 2015, now abandoned, which is a continuation-in-part of application No. 14/275,297, filed on May 12, 2014, now Pat. No. 9,180,892, which is a continuation of application No. 13/593,258, filed on Aug. 23, 2012, now Pat. No. 8,725,323, which is a continuation-in-part of application No. 11/552,602, filed on Oct. 25, 2006, now Pat. No. 8,280,566, and application No. 14/836,063, Aug. 26, 2015, which is a continuation-in-part of application No. 14/741,229, filed on Jun. 16, 2015, now abandoned, application No. 15/377,594, which is a continuation-in-part of application No. 14/803,089, filed on Jul. 19, 2015, now Pat. No. 9,656,680, which is a continuation of application No. 13/741,649, filed on Jan. 15, 2013, now Pat. No. 9,114,817, application No. 15/377,594, which is a continuation-in-part of application No. 14/520,585, filed on Oct. 22, 2014, now Pat. No. 9,550,484, and a continuation-in-part of application No. 15/238,501, filed on Aug. 16, 2016, now Pat. No. 9,917,773, which is a continuation-in-part of application No. 14/633,255, filed on Feb. 27, 2015, now Pat. No. 9,637,147, which is a continuation-in-part of application No. 14/566,344, filed on Dec. 10, 2014, now Pat. No. 9,379,775, which is a continuation of application No. 14/154,373, filed on Jan. 14, 2014, now Pat. No. 8,935,022, which is a continuation-in-part of application No. 13/189,944, filed on Jul. 25, 2011, now Pat. No. 8,798,821, and a continuation-in-part of application No. 13/523,967, filed on Jun. 15, 2012, now abandoned, and a continuation-in-part of application No. 12/948,053, filed on Nov. 17, 2010, now abandoned, and a continuation-in-part of application No. 13/168,482, filed on Jun. 24, 2011, now abandoned, and a continuation-in-part of application No. 13/186,651, filed on Jul. 20, 2011, now abandoned, and a continuation-in-part of application No. 13/082,738, filed on Apr. 8, 2011, now Pat. No. 8,825,239, and a continuation-in-part of application No. 13/082,864, filed on Apr. 8, 2011, now Pat. No. 8,655,517, said application No. 13/189,944 is a continuation-in-part of application No. 12/683,874, filed on Jan. 7, 2010, now Pat. No. 8,532,850, and application No. 13/189,944, Jul. 25, 2011, and application No. 13/523,967, Jun. 15, 2012, and a continuation-in-part of application No. 12/683,874, filed on Jan. 7, 2010, now Pat. No. 8,532,850, and application No. 13/082,738, Apr. 8, 2011, and a continuation-in-part of application No. 12/891,938, filed on Sep. 28, 2010, now Pat. No. 8,457,815, and a continuation-in-part of application No. 12/891,936, filed on Sep. 28, 2010, now Pat. No. 8,702,043, and a continuation-in-part of application No. 12/891,925, filed on Sep. 28, 2010, now Pat. No. 8,423,208, and application No. 13/082,864, Apr. 8, 2011, and a continuation-in-part of application No. 12/891,938, filed on Sep. 28, 2010, now Pat. No. 8,457,815, and a continuation-in-part of application No. 12/891,936, filed on Sep. 28, 2010, now Pat. No. 8,702,043, and a continuation-in-part of application No. 12/891,925, filed on Sep. 28, 2010, now Pat. No. 8,423,208, and application No. 15/238,501, Aug. 16, 2016, which is a continuation-in-part of application No. 12/212,079, filed on Sep. 17, 2008, now Pat. No. 9,419,816, and application No. 15/238,501, Aug. 16, 2016, which is a continuation-in-part of application No. 13/493,315, filed on Jun. 11, 2012, now abandoned.

(60) Provisional application No. 60/792,428, filed on Apr. 17, 2006, provisional application No. 62/049,524, filed on Sep. 12, 2014, provisional application No. 61/160,930, filed on Mar. 17, 2009, provisional application No. 61/382,765, filed on Sep. 14, 2010, provisional application No. 61/498,152, filed on Jun. 17, 2011, provisional application No. 61/346,448, filed on May 19, 2010, provisional application No. 61/361,702, filed on Jul. 6, 2010, provisional application No. 61/086,144, filed on Aug. 4, 2008, provisional application No. 61/495,878, filed on Jun. 10, 2011.

(51) Int. Cl.
*B61L 15/00* (2006.01)
*H04W 76/11* (2018.01)
*H04W 76/14* (2018.01)
*H04W 4/04* (2009.01)

(52) U.S. Cl.
CPC ........ *B61L 15/0072* (2013.01); *G05D 1/0022* (2013.01); *H04W 4/046* (2013.01); *H04W 4/38* (2018.02); *H04W 76/11* (2018.02); *H04W 76/14* (2018.02)

(58) Field of Classification Search
CPC ... H04W 76/021; H04W 76/14; H04W 4/046; B61L 15/0027; B61L 15/0036; B61L 15/0072
USPC .......................................................... 701/20
See application file for complete search history.

(56) References Cited

U.S. PATENT DOCUMENTS

| | | | | |
|---|---|---|---|---|
| 2007/0112482 A1* | 5/2007 | Kane | ........................ | B61K 9/12 |
| | | | | 701/19 |
| 2016/0267795 A1* | 9/2016 | Miyazawa | ................ | G08G 1/22 |
| 2016/0313730 A1* | 10/2016 | Ricci | ........................ | H04W 4/21 |
| 2017/0289864 A1* | 10/2017 | Narasimha | ........ | H04W 36/0027 |
| 2017/0344023 A1* | 11/2017 | Laubinger | ............ | G05D 1/0272 |

* cited by examiner

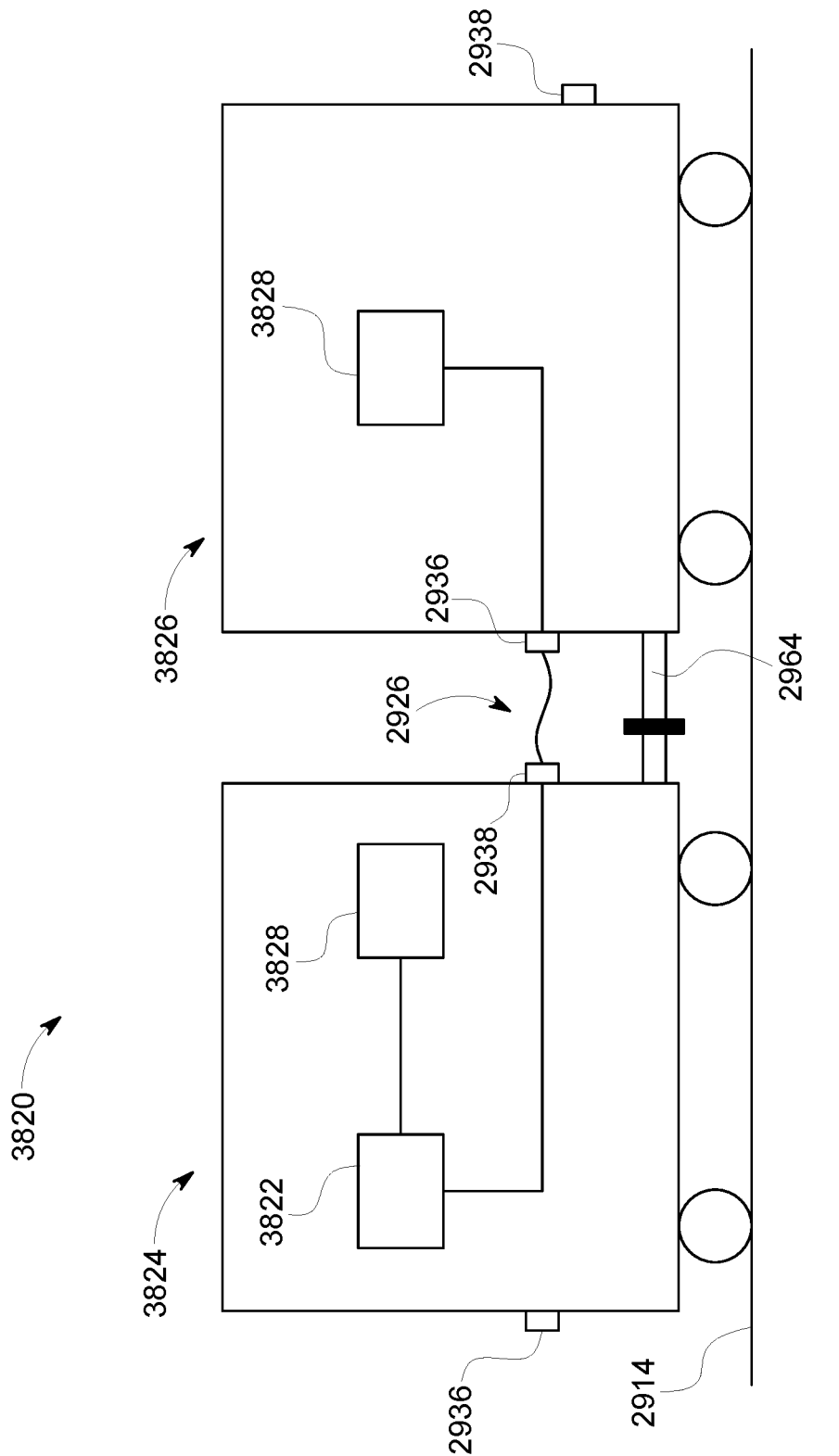

VEHICLE COMMUNICATION SYSTEM

CROSS-REFERENCE TO RELATED APPLICATIONS

This application is a continuation-in-part of U.S. patent application Ser. No. 14/616,795, filed on 9 Feb. 2015 (the "'795 application").

This application also is a continuation-in-part of U.S. patent application Ser. No. 14/836,063, filed on 26 Aug. 2015 (the "'063 application"), which is a continuation-in-part of U.S. patent application Ser. No. 14/275,297, filed on 12 May 2014 and issued as U.S. Pat. No. 9,180,892 on 10 Nov. 2015 (the "'297 application"), which is a continuation of U.S. patent application Ser. No. 13/593,258, filed on 23 Aug. 2012 (the "'258 application"). The '258 application issued as U.S. Pat. No. 8,725,323 on 13 May 2014. The '258 application is a continuation-in-part of U.S. patent application Ser. No. 11/552,602, filed on 25 Oct. 2006 (the "'602 application"), which issued as U.S. Pat. No. 8,280,566 on 2 Oct. 2012. The '602 application claims priority to U.S. Provisional Application No. 60/792,428, filed on 17 Apr. 2006 (the "'428 application"). The '063 application also is a continuation-in-part of U.S. patent application Ser. No. 14/741,229, filed 16 Jun. 2015 (the "'229 application"), which claims priority to U.S. Provisional Application No. 62/049,524, which filed on 12 Sep. 2014 (the "'524 application").

This application also is a continuation-in-part of U.S. patent application Ser. No. 14/803,089, filed on 19 Jul. 2015 (the "'089 application"), which is a continuation of U.S. patent application Ser. No. 13/741,649, filed on 15 Jan. 2013 (the "'649 application"), which issued as U.S. Pat. No. 9,114,817 on 25 Aug. 2015.

This application also is a continuation-in-part of U.S. patent application Ser. No. 14/520,585, filed on 22 Oct. 2014 (the "'585 application").

This application also is a continuation-in-part of U.S. patent application Ser. No. 15/238,501, filed on 16 Aug. 2016 (the "'501 application"), which is a continuation-in-part of U.S. application Ser. No. 14/633,255, filed Feb. 27, 2015, which is a continuation-in-part of U.S. patent application Ser. No. 14/566,344, filed Dec. 10, 2014 and issued as U.S. Pat. No. 9,379,775 on 28 Jun. 2016 (the "'344 application"), which is a continuation of U.S. patent application Ser. No. 14/154,373, filed Jan. 14, 2014 (the "'373 application")(now U.S. Pat. No. 8,935,022 issued Jan. 15, 2015), which is a continuation-in-part of U.S. patent application Ser. No. 13/189,944 (the "'944 application"), U.S. patent application Ser. No. 13/523,967 (the "'967 application"), U.S. patent application Ser. No. 12/948,053 (the "'053 application"), U.S. patent application Ser. No. 13/168,482 (the "'482 application"), U.S. patent application Ser. No. 13/186,651 (the "'651 application"), U.S. patent application Ser. No. 13/082,738 (the "'738 application"), and U.S. patent application Ser. No. 13/082,864 (the "'864 application").

The '944 application was filed on Jul. 25, 2011, and is now U.S. Pat. No. 8,798,821 issued Aug. 5, 2014. The '944 application is a continuation-in-part of U.S. patent application Ser. No. 12/683,874, which was filed on Jan. 7, 2010 (the "'874 application"), now U.S. Pat. No. 8,532,850 issued Sep. 10, 2013, which claims priority to U.S. Provisional Application Ser. No. 61/160,930, which was filed on Mar. 17, 2009 (the "'930 application"). The '944 application also claims priority to U.S. Provisional Application Ser. No. 61/382,765, filed on Sep. 14, 2010 (the "'765 application").

The '967 application was filed on Jun. 15, 2012, and is now abandoned. The '967 application claims priority to U.S. Provisional Patent Application Ser. No. 61/498,152, which was filed Jun. 17, 2011 (the "'152 application"). The '967 application is also a continuation-in-part of the '874 application, which claims priority to the '930 application.

The '053 application was filed Nov. 17, 2010, and is now abandoned.

The '482 application was filed Jun. 24, 2011, and is now abandoned.

The '651 application was filed on Jul. 20, 2011, and is now abandoned.

The '738 application was filed on Apr. 8, 2011, and is now U.S. Pat. No. 8,825,239 issued Sep. 2, 2014. The '738 application claims priority to U.S. Provisional Application No. 61/346,448, filed on May 19, 2010, and to U.S. Provisional Application No. 61/361,702, filed on Jul. 6, 2010. The '738 application also is a continuation-in-part of U.S. application Ser. No. 12/891,938, filed on Sep. 28, 2010, now U.S. Pat. No. 8,457,815 issued Jun. 4, 2013, and of U.S. application Ser. No. 12/891,936, filed on Sep. 28, 2010 and now U.S. Pat. No. 8,702,043 issued Apr. 22, 2014, and of U.S. application Ser. No. 12/891,925, filed on Sep. 28, 2010, now U.S. Pat. No. 8,423,208 issued Apr. 16, 2013.

The '864 application was filed on Apr. 8, 2011, and is now U.S. Pat. No. 8,655,517 issued Feb. 18, 2014. The '864 application claims priority to U.S. Provisional Application No. 61/346,448 filed on May 19, 2010 and to U.S. Provisional Application No. 61/361,702, filed on Jul. 6, 2010. The '864 application also is a continuation-in-part of U.S. application Ser. No. 12/891,938, filed on Sep. 28, 2010, now U.S. Pat. No. 8,457,815 issued Jun. 4, 2013, and of U.S. application Ser. No. 12/891,936, filed on Sep. 28, 2010 and now U.S. Pat. No. 8,702,043 issued Apr. 22, 2014, and of U.S. application Ser. No. 12/891,925, filed on Sep. 28, 2010, now U.S. Pat. No. 8,423,208 issued Apr. 16, 2013.

The '501 application also is a continuation-in-part of U.S. application Ser. No. 12/212,079 filed Sep. 17, 2008 ("the '079 application")(now U.S. Pat. No. 9,419,816 issued Aug. 16, 2016), which claims priority to U.S. Provisional Application No. 61/086,144 filed Aug. 4, 2008.

The '501 application also is continuation in part of U.S. application Ser. No. 13/493,315, filed Jun. 11, 2012 ("the '315 application"), which claims priority to U.S. Provisional Application No. 61/495,878, filed Jun. 10, 2011.

The entire disclosures of each of these applications is incorporated herein by reference.

FIELD

Embodiments of the inventive subject matter described herein relate to communications between vehicles.

BACKGROUND

Some known vehicle consists include several propulsion-generating vehicles that generate tractive effort for propelling the vehicle consists along a route. For example, trains may have several locomotives coupled with each other that propel the train along a track. The locomotives may communicate with each other to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the consist.

Some known consists use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands.

Before the remote vehicles will operate per command messages received from a lead locomotive, however, communication links between the lead locomotive and the remote locomotive may need to be established. A communication "handshake" between the lead and remote locomotives may need to occur so that the remote locomotives can identify the lead locomotive, the lead locomotive can identify the remote locomotives, and the remote locomotives can determine that forthcoming command messages are received from the lead locomotive and not from another locomotive. To establish the communication links used to remotely control the remote locomotives from the lead locomotive, some known systems require an operator to go onboard each of the remote locomotives, manually input information about the lead locomotive and/or remote locomotives, and initiate communication of one or more wireless messages from the remote locomotives to the lead locomotive. In some vehicle consists having many remote locomotives, requiring an operator to enter onboard and manually enter this type of information onboard each remote locomotive can be very time-consuming and susceptible to human errors in entering the correct information. Thus, considerable time and effort may be expended in establishing communication links between the lead and remote locomotives in a vehicle consist.

Additionally, if the lead locomotive experiences one or more faults (e.g., in communication with the other locomotives that are linked with the lead locomotive in a distributed power arrangement), the lead locomotive may need to be decoupled from the train and replaced with another lead locomotive. To do this, the replacement lead locomotive is coupled to the train and an operator may need to manually enter each remote locomotive along the length of the train to manually input the change in lead locomotive into control systems of the remote locomotives so that these control systems know to receive commands from the replacement lead locomotive, and not the previous lead locomotive that has been removed. For relatively long trains and/or trains having several remote locomotives, this process can consume a significant amount of time.

In certain conventional vehicle systems, the order of powered vehicles in a consist may not be known or easily obtainable. Further, to the extent ordering information may be entered by an operator, such information is prone to operator error, and may be incorrectly entered. These and other drawbacks of conventional powered units of a consist may result in limited adjustability and/or fine tuning of control of plural powered units, difficulty in troubleshooting and/or adjusting for changes in status of one or more vehicles, and the like.

BRIEF DESCRIPTION

In one embodiment, a system (e.g., a vehicle communication system) includes a remote communication unit configured to receive a link command message at a first remote vehicle in a vehicle consist having a lead vehicle and at least the first remote vehicle. The link command message includes identifying information representative of at least one of a designated vehicle consist or one or more designated remote vehicles. The system also includes a control unit configured to be disposed onboard the first remote vehicle and to compare the identifying information of the link command message with one or more of a stored consist identifier or a stored vehicle identifier stored onboard the first remote vehicle. The control unit also is configured to establish a communication link between the lead vehicle and the first remote vehicle responsive to the identifying information of the link command message matching the one or more of the stored consist identifier or the stored vehicle identifier and without intervention or set up by an operator onboard the first remote vehicle.

In one embodiment, another system (e.g., another vehicle communication system) includes a control unit configured to determine a vehicle identifier for a first remote vehicle included in a vehicle consist formed from a lead vehicle and at least the first remote vehicle, and a communication unit configured to communicate a wireless linking message addressed to the vehicle identifier from the lead vehicle to the first remote vehicle. The communication unit also is configured to establish a communication link between the lead vehicle and the first remote vehicle responsive to receipt of the wireless linking message at the first remote vehicle. The control unit is configured to remotely control movement of the first remote vehicle from the lead vehicle via the communication link, and wherein the communication link is established without an operator entering the first remote vehicle.

In one embodiment, another system (e.g., another vehicle communication system) includes one or more processors configured to be disposed onboard a first vehicle of a vehicle system formed from the first vehicle and at least a second vehicle. The one or more processors are configured to remotely control movement of the second vehicle by communicating a signal to the second vehicle. The one or more processors also are configured to perform two or more of communicatively coupling the first and second vehicles by communicating a unique identification of the first vehicle to the second vehicle prior to remotely controlling the movement of the second vehicle without an operator onboard the first vehicle going onboard the second vehicle, communicating a replacement identification of a third vehicle that is not yet included in the vehicle system but is to replace the first vehicle in the vehicle system, determining an order of the first vehicle and the second vehicle based on a monitored direction of fluid flow in a conduit of the vehicle system, determining an orientation of the first vehicle based on the monitored direction of fluid flow in the conduit of the vehicle system, communicatively coupling with the second vehicle responsive to a single actuation of a single input device by the operator onboard the first vehicle without the operator going onboard the second vehicle, determining a unique identification of the second vehicle based on information provided by an energy management system that designates operational settings of the vehicle system for one or more different times, different locations, or different distances along a route, and/or communicating messages to the second vehicle along two or more different communication channels by splitting the messages up and communicating the messages along the different communication channels for re-combining at the second vehicle.

BRIEF DESCRIPTION OF THE DRAWINGS

Reference is now made briefly to the accompanying drawings, in which:

FIG. 38 is a schematic diagram of a system for resolving a conflict between IP addresses of vehicles in a consist, in accordance with one embodiment.

DETAILED DESCRIPTION

Figure 1:
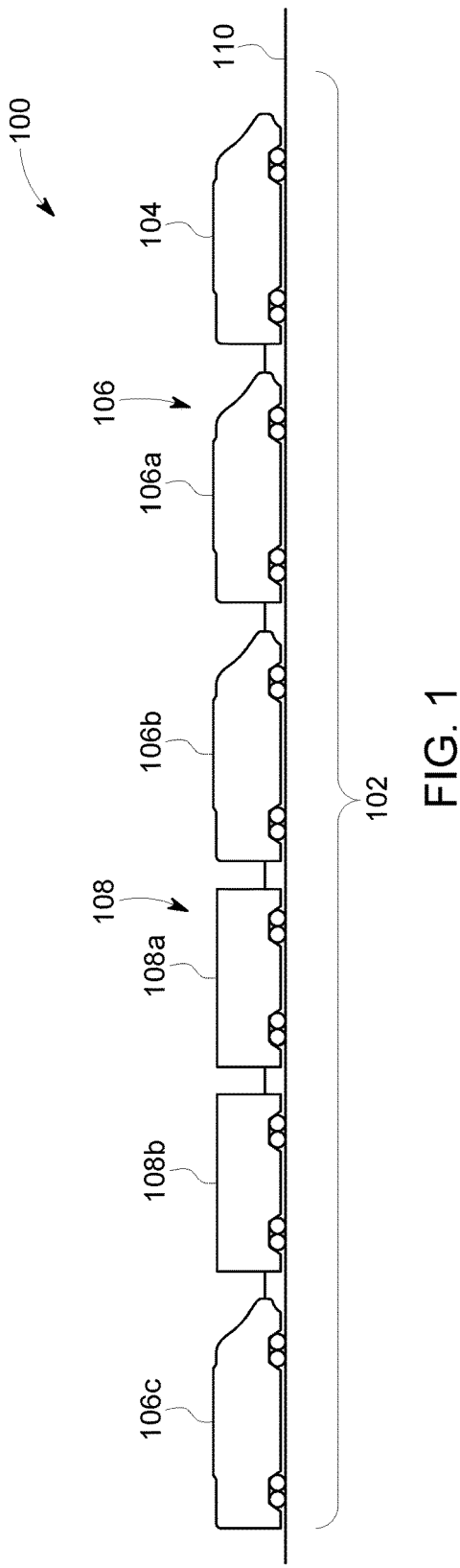
FIG. 1 illustrates one embodiment of a communication system of a vehicle consist or vehicle system.

One or more embodiments of the inventive subject matter described herein provides for methods and systems for communicating between propulsion-generating vehicles in a vehicle consist or vehicle system. This subject matter may be used in connection with rail vehicles and rail vehicle consists, or alternatively may be used with other types of vehicles. For example, the subject matter described herein may be used in connection with automobiles, trucks, mining vehicles, other off-highway vehicles (e.g., vehicles that are not designed or are not legally permitted for travel on public roadways), aerial vehicles (e.g., fixed wing aircraft, drones or other unmanned aircraft, etc.), or marine vessels.

The vehicle consist or vehicle system can include two or more vehicles mechanically coupled with each other to travel along a route together. Optionally, the vehicle consist can include two or more vehicles that are not mechanically coupled with each other, but that travel along a route together. For example, two or more automobiles may wirelessly communicate with each other as the vehicles travel along the route together as a vehicle system to coordinate movements with each other.

In operation, a lead vehicle can obtain unique vehicle identifiers associated with the remote vehicles included in the same vehicle consist as the lead vehicle. These vehicle identifiers may not include identifiers associated with remote vehicles that are not included in the vehicle consist. The vehicle identifiers may be obtained from a system such as a vehicle control system that restricts movement of vehicle consists based on locations of the vehicle consists. For example, such a system may include a positive train control (PTC) system. Optionally, the vehicle identifiers may be obtained from an energy management system, such as a system that creates a trip plan that designates operational settings of the vehicle consist as a function of time, location, and/or distance along a route to control movement of the vehicle consist. Additionally or alternatively, the vehicle identifiers of the remote vehicles in the vehicle consist may be manually input by an operator or obtained from another system.

The lead vehicle can communicate wireless linking messages to the remote vehicles. These linking messages may be addressed to the remote vehicles using the vehicle identifiers. For example, the linking messages may include the vehicle identifiers. Vehicles that receive the linking messages other than the remote vehicles in the consist may not be linked with the lead vehicle due to the vehicle identifiers not matching or being associated with these other vehicles. At the remote vehicles that are included in the vehicle consist, the remote vehicles may be communicatively linked with the lead vehicle. For example, the remote vehicles may communicate linking confirmation messages responsive to receiving the linking messages.

The remote vehicles can communicate these confirmation messages without an operator having to enter onboard the remote vehicles. For example, while an operator may be onboard the lead vehicle, the operator may not enter onboard any other vehicles in the vehicle consists to establish communication links between the lead and remote vehicles in the vehicle consists. Upon receiving the confirmation messages at the lead vehicle, communication links between the lead and remote vehicles are established. Establishing these communication links allows for the lead vehicle to remotely control operations of the remote vehicles during movement of the vehicle consists along the route. For example, the lead vehicle can communicate wireless command messages to change throttle settings, brake settings, speeds, power outputs, or the like of the remote vehicles during movement of the vehicle consists. Other vehicles that do not have communication links established with the lead vehicle cannot be remotely controlled by the lead vehicle.

FIG. 1 illustrates one embodiment of a communication system 100 of a vehicle consist or vehicle system 102. The illustrated vehicle consist 102 includes propulsion-generating vehicles 104, 106 (e.g., vehicles 104, 106A, 106B, 106C) and non-propulsion-generating vehicles 108 (e.g., vehicles 108A, 108B) that travel together along a route 110. Although the vehicles 104, 106, 108 are shown as being mechanically coupled with each other, optionally, the vehicles 104, 106, 108 may not be mechanically coupled with each other.

The propulsion-generating vehicles 104, 106 are shown as locomotives, the non-propulsion-generating vehicles 108 are shown as rail cars, and the vehicle consist 102 is shown as a train in the illustrated embodiment. Alternatively, the vehicles 104, 106 may represent other vehicles, such as automobiles, marine vessels, or the like, and the vehicle consist 102 can represent a grouping or coupling of these other vehicles. The number and arrangement of the vehicles 104, 106, 108 in the vehicle consist 102 are provided as one example and are not intended as limitations on all embodiments of the subject matter described herein.

In one embodiment, the group of vehicles 104, 106, 108 may be referred to as a vehicle system, with groups of one or more adjacent or neighboring propulsion-generating vehicles 104 and/or 106 being referred to as a vehicle consist. For example, the vehicles 104, 106A, 106B, 108A, 108B, and 106C may be referred to as a vehicle system with vehicles 104, 106A, 106B be referred to as a first vehicle consist of the vehicle system and the vehicle 106C referred to as a second vehicle consist in the vehicle system. Alternatively, the vehicle consists may be defined as the vehicles that are adjacent or neighboring to each other, such as a vehicle consist defined by the vehicles 104, 106A, 106B, 108A, 108B, 106C.

The propulsion-generating vehicles 104, 106 can be arranged in a distributed power (DP) arrangement. For example, the propulsion-generating vehicles 104, 106 can include a lead vehicle 104 that issues command messages to the other propulsion-generating vehicles 106A, 106B, 106C which are referred to herein as remote vehicles. The designations "lead" and "remote" are not intended to denote spatial locations of the propulsion-generating vehicles 104, 106 in the vehicle consist 102, but instead are used to indicate which propulsion-generating vehicle 104, 106 is communicating (e.g., transmitting, broadcasting, or a combination of transmitting and broadcasting) command messages and which propulsion-generating vehicles 104, 106 are being remotely controlled using the command messages. For example, the lead vehicle 104 may or may not be disposed at the front end of the vehicle consist 102 (e.g., along a direction of travel of the vehicle consist 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or non-propulsion-generating vehicles 108.

The command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 104 issues the command messages to coordinate the tractive efforts and/or braking efforts provided by the propulsion-generating vehicles 104, 106 in order to propel the vehicle consist 102 along a route 110, such as a track, road, waterway, or the like.

The command messages can be communicated using the communication system 100. In one embodiment, the command messages are wirelessly communicated using the communication system 100. The communication system 100 may include wireless transceiving hardware and circuitry disposed onboard two or more of the vehicles 104, 106. Prior to the remote vehicles being remotely controlled by a lead vehicle in the vehicle consists, communication links may be established between the lead and remote vehicles.

To establish a communication link between a lead vehicle and a remote vehicle, the lead vehicle may wirelessly communicate a linking message to the remote vehicle. This linking message may include a unique code, such as a unique vehicle identifier, that is associated with the remote vehicle. This code may not be associated with or otherwise identify other remote vehicles in one embodiment. Alternatively, the vehicle identifier may identify or be associated with two or more remote vehicles, such as two or more remote vehicles that are the same type of vehicle, there included in the vehicle consists, or the like. At the remote vehicle that receives linking message, if the vehicle identifier in the linking message matches, is associated with, or otherwise identifies the remote vehicle, then the remote vehicle may communicate a confirmation message back to the lead vehicle. This confirmation message may be wirelessly communicated to the lead vehicle. The communication link between the lead and remote vehicles may be established responsive to the linking message being received by the remote vehicle and a confirmation message being received by the lead vehicle. Alternatively, the communication link between the lead and remote vehicles may be established once the linking message is received at the remote vehicles, without requiring a confirmation message from being received back at the lead vehicle.

The lead vehicle may determine vehicle identifiers for the remote vehicles by receiving a list of unique identifying codes associated with the remote vehicles in the vehicle consist. This list may be received from one or more systems other than the communication system 100, such as a vehicle control system that restricts movement of the vehicle consists based at least in part on the location of the vehicle consists. One example of such a vehicle control system includes a positive train control or PTC system. Another example of such a system may include an energy management system that creates a trip plan to control movement of the vehicle consist. The trip plan can designate operational settings of the vehicle consist as a function of time, location, and/or distance along the route. The operational settings designated by the trip plan can reduce fuel consumed and/or emissions generated by the vehicle consist relative to the vehicle consist traveling according to other operational settings. Alternatively, the vehicle identifiers may be received from another type of system, such as a dispatch facility, a vehicle yard such as a rail yard, or the like. In one aspect, and operator may manually input the vehicle identifiers onboard the lead vehicle.

In contrast to some known systems, operators are not required to enter onboard the remote vehicles to identify these remote vehicles to the lead vehicle. Instead, the remote vehicles are identified by a separate system such that the operators do not need to enter onboard the remote vehicles to determine which remote vehicles are in the vehicle consist. Thus, communication links between the lead and remote vehicles may be established without requiring operators to enter onboard the remote vehicles. Consequently, considerable time and effort can be saved by avoiding requiring the operators to enter onboard the remote vehicles.

Figure 2:
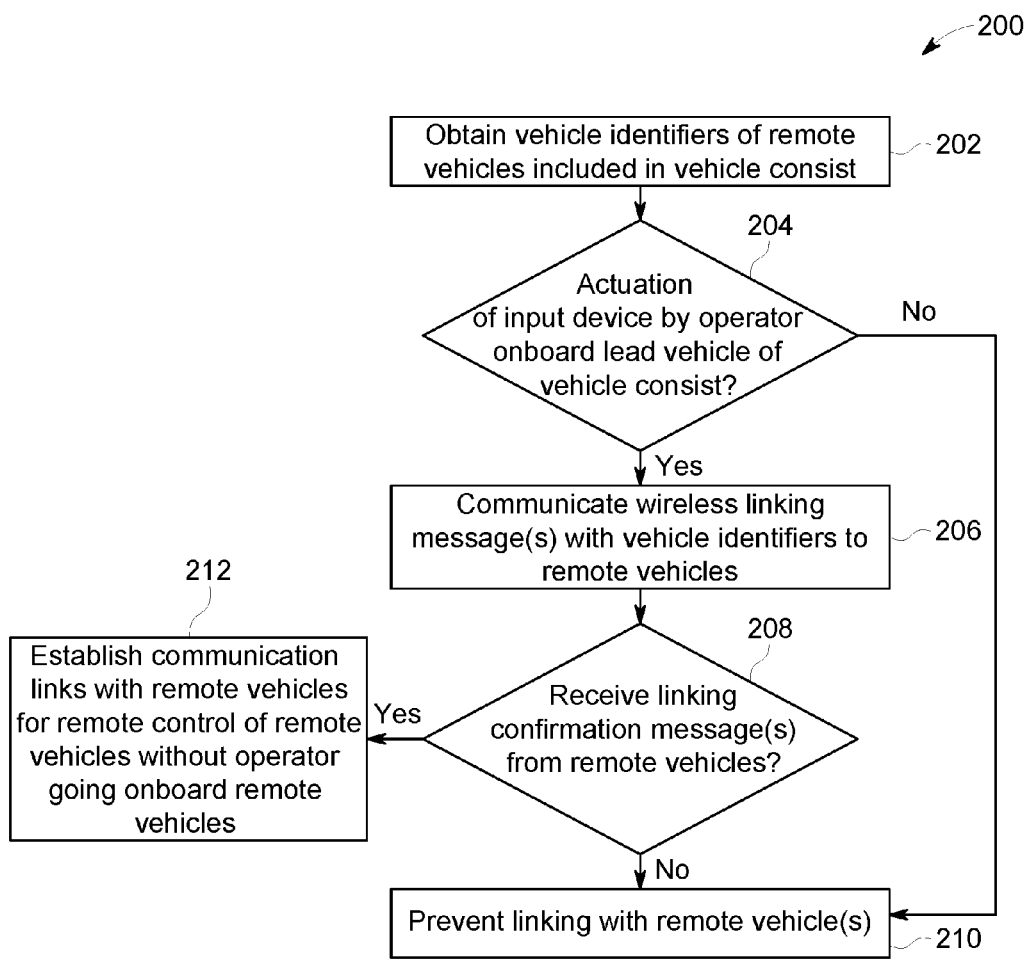
FIG. 2 illustrates a flowchart of one embodiment of a method for communicatively linking vehicles in a vehicle consist.

FIG. 2 illustrates a flowchart of one embodiment of a method 200 for communicatively linking vehicles in a vehicle consist. The method 200 may be performed by communication system 100 shown in FIG. 1. At 202, the vehicle identifiers of remote vehicles included in the vehicle consist are obtained. The vehicle identifiers may be obtained from a system other than the communication system, such as a vehicle control system, energy management system, a dispatch facility, or the like. Optionally, the vehicle identifiers may be input by an operator onboard the lead vehicle. The vehicle identifiers that are obtained may be unique codes that uniquely identify the remote vehicles included in the vehicle consist, and that do not include vehicles that are not included in the vehicle consist. For example, the vehicles that are included in the vehicle consist may already be mechanically linked and/or otherwise positioned near one another to travel together along the route as a consist. The vehicle identifiers that are obtained may represent those vehicles in the consist, and not any vehicles not included in the consist.

At 204, a determination is made as to whether an input device onboard the lead vehicle of the vehicle consists has been actuated. For example, a determination may be made as to whether an operator has pressed a button, flip the switch, moved a lever, typed on a keyboard, touched a touch-sensitive display screen, spoken commands into a microphone, or the like. Actuation of an input device may indicate that the operator wishes to initiate establishment of the communication links between the lead and remote vehicles in the consist. For example, once the vehicle identifiers of the remote vehicles in the consist have been obtained, the operator onboard lead vehicle can press a single button (or otherwise perform a single actuation of an input device) to initiate the establishment of communication links between the lead and remote vehicles. Alternatively, the operator may actuate the same input device several times and/or may actuate multiple input devices to cause the linking messages to be sent. If the input device has been actuated, flow of the method 200 can continue to 206. On the other hand, if the input device is not actuated, then flow of the method 200 can proceed to 210, described below.

At 206, linking messages are communicated to the remote vehicles in the consist. These linking messages may be wirelessly communicated from the lead vehicle to the remote vehicles. Linking messages may be addressed to the remote vehicles. For example, the linking messages may include the vehicle identifiers of the remote vehicles included in the consist. Different linking messages may be communicated to different remote vehicles. For example, a first linking message having a first vehicle identifier may be communicated to a first remote vehicle, a second linking message having a different, second vehicle identifier may be communicated to a different, second remote vehicle, and so on. Optionally, one or more linking messages may include multiple vehicle identifiers. For example, a linking message may be wirelessly communicated from the lead vehicle and may include the vehicle identifiers of the remote vehicles included in the vehicle consist.

Onboard the remote vehicles, if a linking message is received that includes a vehicle identifier that matches or otherwise corresponds with the remote vehicle receiving the linking message, the remote vehicle may communicate a linking confirmation message back to the lead vehicle. This confirmation message may be wirelessly communicated to the lead vehicle to indicate or confirm receipt of the linking message. The linking confirmation messages may be communicated from the remote vehicles to lead vehicles without operators having to go onboard the remote vehicles. For example, responsive to a remote vehicle receiving a linking message from the lead vehicle that includes the vehicle identifier of the remote vehicle, the remote vehicle may autonomously (e.g., without operator intervention) wirelessly communicate the linking confirmation message to lead vehicle. Alternatively, the remote vehicles may not communicate a linking confirmation message responsive to receiving the linking message.

At 208, a determination is made as to whether a linking confirmation message is received at the lead vehicle from one or more of the remote vehicles in the vehicle consist. For example, the lead vehicle may determine if all remote vehicles included in the vehicle consist communicated linking confirmation messages responsive to communicating the linking messages. Receipt of the linking confirmation messages from all remote vehicles at the lead vehicle can indicate or confirm that the remote vehicles received the linking messages from the lead vehicle. Failure to receive linking confirmation messages or an absence of linking confirmation messages from all remote vehicles at the lead vehicle can indicate that one or more remote vehicles did not receive linking messages from the lead vehicle. In one aspect, the lead vehicle may re-communicate one or more additional linking messages to the remote vehicles from which the lead vehicle did not receive a linking confirmation message.

If it is determined that linking confirmation messages were received from all remote vehicles, then flow of the method can proceed to 212. Alternatively, if linking confirmation messages were not received from the remote vehicles, then flow the method 200 can proceed to 210.

At 210, communication linking between the lead and remote vehicles is prevented. For example, if the remote vehicles did not receive the linking messages, if the lead vehicle did not receive confirmation of receipt of the linking messages at the remote vehicles, and/or if an operator did not actuate any input device to initiate establishment of communication links between the lead and remote vehicles, the communication links between the lead vehicle and one or more remote vehicles may not be established. This can prevent communication links from being established between the lead and remote vehicles that are not included in the vehicle consist, prevent communication links from being established between the lead vehicle and remote vehicle that did not receive a linking message, and/or prevent communication links from being established between vehicles in the vehicle consist without the operator initiating formation of the communication links.

At 212, communication links between the lead vehicle and the remote vehicles are established. These communication links allow for the lead vehicle to remotely control operations and movement of the remote vehicles. For example, the communication links can allow the lead vehicle to issue command messages to the remote vehicles. The command messages may direct the remote vehicles to change throttle settings, brake settings, accelerations, speeds, power outputs, or the like. Upon receipt of the command messages, the remote vehicles may implement the changes in operational settings dictated by the command messages.

A communication link may be established by the lead vehicle identifying which remote vehicles are included in the vehicle consist, communicating linking messages to those remote vehicles, and receiving confirmation that the linking messages are received at the remote vehicles. The failure of the lead vehicle to determine which remote vehicles are included in the vehicle consist, the failure of the lead vehicle to communicate linking messages to those remote vehicles, or the failure of lead vehicle to receive confirmation that linking messages were received at the remote vehicles can prevent communication links from being established between the lead and remote vehicles. Alternatively, the communication links may be established by the lead vehicle identifying which remote vehicles are included in the vehicle consist and communicating linking messages to those remote vehicles, regardless of whether confirmation that the linking messages were received remote vehicles is received lead vehicle. For example, the communication links may be established without the remote vehicles communicating linking confirmation messages and/or without the lead vehicle receiving linking confirmation messages.

A communication link may be defined by a communication handshake between lead and remote vehicles. For example, communication of a first message from a lead vehicle to remote vehicle (e.g., a linking message) followed by successful communication of a second message from the remote vehicle to lead vehicle (e.g., a linking confirmation message) may be a communication handshake that establishes a communication link. Optionally, the communication link may be established by a dedicated communications channel being used between the lead and remote vehicles. For example, a designated frequency or frequency band may define a communication link.

The communication links between the lead and remote vehicles may be established without an operator having to go onboard the remote vehicles. As described above, the operator may go onboard the lead vehicle and, once the lead vehicle has determined which remote vehicles are included in the vehicle consist, the lead vehicle may establish communication links with the remote vehicles without the operator or other operators having to go onboard the remote vehicles to communicate information from the remote vehicles to the lead vehicle. Thus, considerable time and effort may be saved in setting up a vehicle consist for travel.

Figure 3:
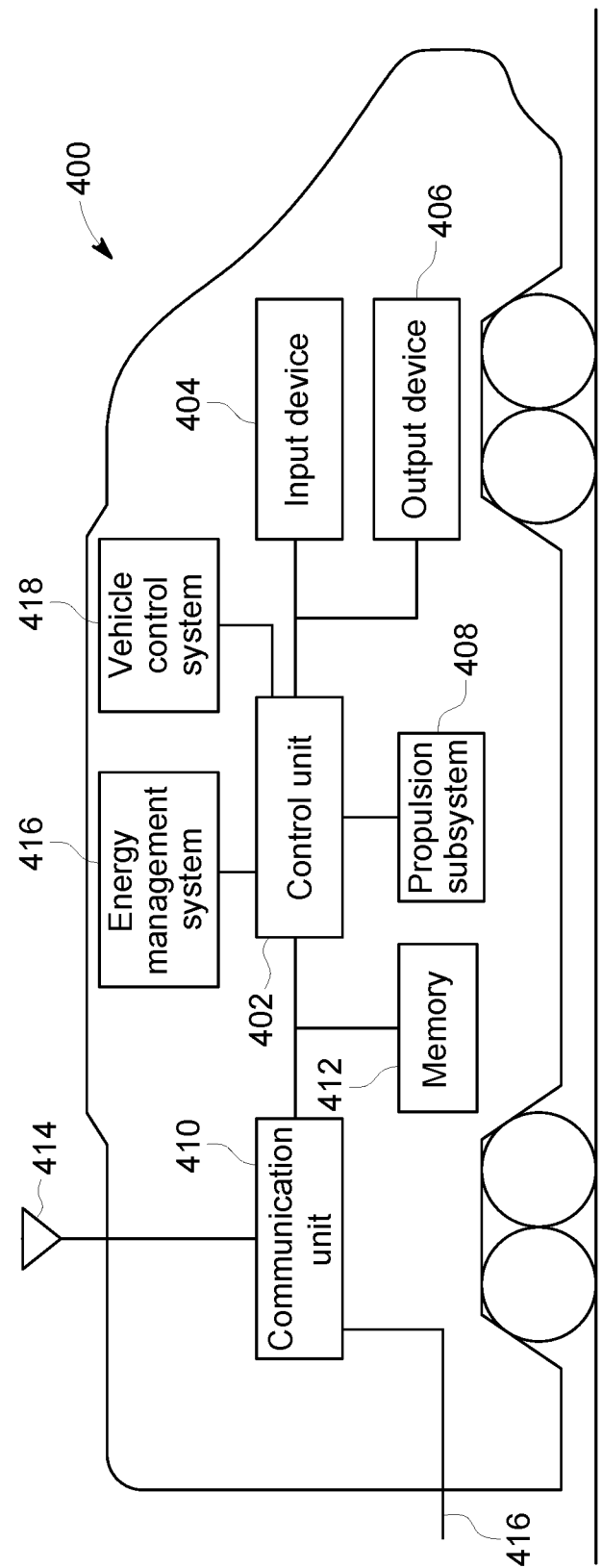
FIG. 3 is a schematic diagram of a propulsion-generating vehicle in accordance with one embodiment.

FIG. 3 is a schematic diagram of a propulsion-generating vehicle 400 in accordance with one embodiment. The vehicle 400 may represent one or more of the vehicles 104, 106 shown in FIG. 1. The communication system 100 shown in FIG. 1 may include one or more components onboard the vehicle 400 that are used to establish communication links between the vehicle 400 and one or more other vehicles in the same vehicle consist.

The vehicle 400 includes a control unit 402 that controls operations of the vehicle 400. The control unit 402 can include or represent one or more hardware circuits or circuitry that include, are connected with, or that both include and are connected with one or more processors, controllers, or other hardware logic-based devices. The control unit 402 is connected with an input device 404 and an output device 406. The control unit 402 can receive manual input from an operator of the propulsion-generating vehicle 400 through the input device 404, such as a touchscreen, keyboard, electronic mouse, microphone, or the like. For example, the control unit 402 can receive manually input changes to the tractive effort, braking effort, speed, power output, and the like, from the input device 404. The control unit 402 may receive a single instance of an actuation of the input device 404 to initiate the establishment of communication links between lead and remote vehicles in the vehicle consist. For example, instead of having one or more operators go onboard lead and remote vehicles of a consist to establish communication links for the remote control of the remote vehicles by the lead vehicles, an operator may go onboard the lead vehicle and press a single button or other input device to cause the lead vehicle to communicate linking messages to the remote vehicles to establish the communication links.

The control unit 402 can present information to the operator using the output device 406, which can represent a display screen (e.g., touchscreen or other screen), speakers, printer, or the like. For example, the control unit 402 can present the identities and statuses of the remote vehicles 106, identities of the missing remote vehicles 106 (e.g., those remote vehicles 106 from which the lead vehicle 104 has not received the status), contents of one or more command messages, or the like.

The control unit 402 is connected with a propulsion subsystem 408 of the propulsion-generating vehicle 400. The propulsion subsystem 408 provides tractive effort and/or braking effort of the propulsion-generating vehicle 400. The propulsion subsystem 408 may include or represent one or more engines, motors, alternators, generators, brakes, batteries, turbines, and the like, that operate to propel the propulsion-generating vehicle 400 under the manual or autonomous control that is implemented by the control unit 402. For example, the control unit 402 can generate control signals autonomously or based on manual input that is used to direct operations of the propulsion subsystem 408.

The control unit 402 also is connected with a communication unit 410 and a memory 412 of the communication system in the propulsion-generating vehicle 400. The memory 412 can represent an onboard device that electronically and/or magnetically stores data. For example, the memory 412 may represent a computer hard drive, random access memory, read-only memory, dynamic random access memory, an optical drive, or the like. The communication unit 410 includes or represents hardware and/or software that is used to communicate with other vehicles 400 in the vehicle consist 102. For example, the communication unit 410 may include a transceiver and associated circuitry (e.g., antennas) 414 for wirelessly communicating (e.g., communicating and/or receiving) linking messages, command messages, linking confirmation messages, reply messages, retry messages, repeat messages, or the like. Optionally, the communication unit 410 includes circuitry for communicating the messages over a wired connection 416, such as an electric multiple unit (eMU) line of the vehicle consist 102, catenary or third rail of electrically powered vehicle, or another conductive pathway between or among the propulsion-generating vehicles 104, 106, 400 in the vehicle consist 102. The control unit 402 may control the communication unit 410 by activating the communication unit 410. The communication unit 410 can examine the messages that are received by the vehicle 400. For example, the communication unit 410 of a remote vehicle 106 can examine received command messages to determine the directive sent by the lead vehicle 104. The directive can be conveyed to the control unit 402, which then implements the directive by creating control signals that are communicated to the propulsion subsystem 408 for autonomous control or by presenting the directive to the operator on the output device 406 for manual implementation of the directive.

The memory 412 can store vehicle identifiers. In the lead vehicle 104, the memory 412 can store the vehicle identifiers of the remote vehicles 106 in the same consist as the lead vehicle 104. In the remote vehicles 106, the memory 412 can store the vehicle identifier of the remote vehicle 106 in which the memory 412 is located (e.g., to allow the remote vehicle 106 to communicate the vehicle identifier), the vehicle identifier of the lead vehicle 104 (e.g., to allow the remote vehicle 106 to verify that received messages are sent from the lead vehicle 104 in the same consist), and/or other information.

The control unit 402 can obtain the vehicle identifiers from another system, such as a vehicle control system 418, an energy management system 416, or another system. The vehicle control system 418 shown in FIG. 3 can include hardware circuits or circuitry that include and/or are connected with one or more processors. The vehicle control system 418 can control or limit movement of the vehicle 400 and/or the vehicle consist that includes the vehicle 400 based on one or more limitations. For example, the vehicle control system 418 can prevent the vehicle and/or vehicle consist from entering a restricted area, can prevent the vehicle and/or vehicle consist from exiting a designated area, can prevent the vehicle and/or vehicle consist from traveling at a speed that exceeds an upper speed limit, can prevent the vehicle and/or vehicle consist from traveling at a speed that is less than a lower speed limit, or the like. In one embodiment, the vehicle control system 418 includes or represents a positive train control system. The vehicle control system 418 may be programmed or otherwise have access to the vehicle identifiers of the vehicles included in the vehicle consist that includes the vehicle 400. For example, the vehicle control system 418 may store right access to the vehicle identifiers so that the vehicle control system 418 can determine how to control or limit control of the vehicle 400 and/or the vehicle consist that includes the vehicle 400 to prevent the vehicle 400 and/or vehicle consist from violating one or more of the limits.

The energy management system 416 can include hardware circuits or circuitry that include and and/or are connected with one or more processors. The energy management system 416 can create a trip plans for trips of the vehicle 400 and/or the vehicle consist that includes the vehicle 400. As described above, a trip plan may designate operational settings of the vehicle 400 and/or the vehicle consist as a function of time, location, and/or distance along a route for a trip. Traveling according to the operational settings designated by the trip plan can reduce fuel consumed and/or emissions generated by the vehicle 400 and/or the vehicle consist relative to the vehicle 400 and/or vehicle consist traveling according to other operational settings that are not designated by the trip plan. The energy management system 416 may be programmed with or otherwise have access to the vehicle identifiers of the vehicles included in the vehicle consist. The identities of the vehicles in the consists may be known to energy management system 416 so that the energy management system 416 can determine what operational settings to designate for a trip plan to achieve a goal of reducing fuel consumed and/or emissions generated by the consists during the trip.

One or more of the vehicle control system 418, the energy management system 416, or another system may communicate or otherwise provide the vehicle identifiers to the control unit 402 and/or the communication unit 410. As described above, the communication unit 410 and/or the control unit 402 may communicate wireless linking messages that are addressed to the remote vehicles in the consist using the vehicle identifiers obtained from one or more of the systems.

Figure 4:
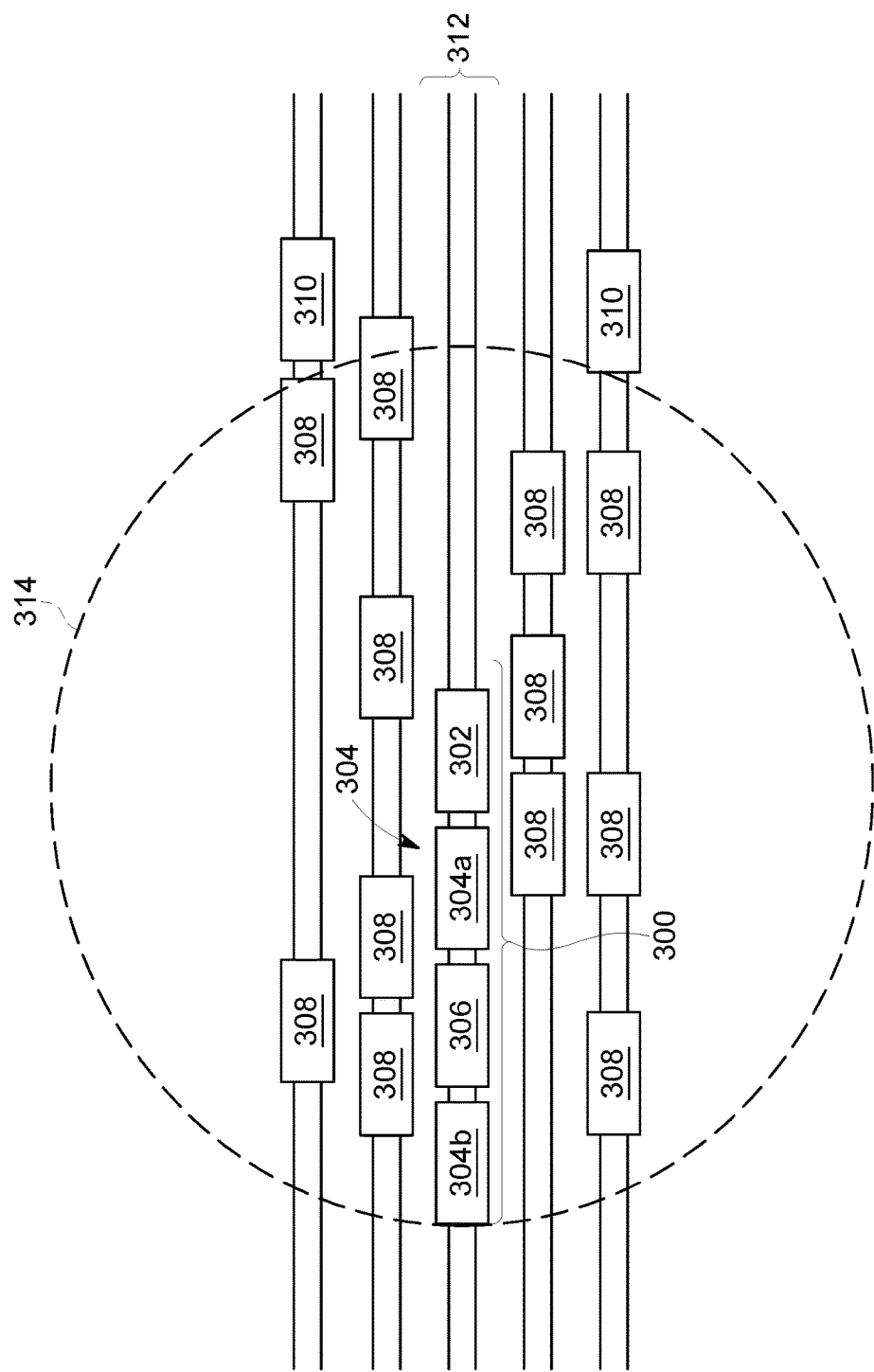
FIG. 4 illustrates several vehicles located on neighboring routes according to one example.

FIG. 4 illustrates several vehicles 302, 304 (e.g., 304A, 304B), 306, 308, 310 located on neighboring routes 312 according to one example. The vehicles 302, 304, 306, 308, 310 can represent one or more of the vehicles 104, 106, 108, 400 shown in FIGS. 1 and 3. The routes 312 may be relatively close to one another, such as within five, ten, fifteen, twenty, twenty-five meters or another distance apart. For example, the routes 312 may be neighboring tracks in a vehicle yard, such as a rail yard. Alternatively, the routes may be another type of route and/or another location.

The vehicles 302, 304, 306 may be grouped together in the vehicle consist 300. For example, the vehicle 302 may represent the lead vehicle 104 shown in FIG. 1, the vehicles 304A, 304B may represent remote vehicles 106 shown in FIG. 1, and the vehicle 306 may represent a non-propulsion-generating vehicle 108 shown in FIG. 1. Other vehicles 308, 310 shown in FIG. 4 are not included in the vehicle consist 300. For example, vehicles 308, 310 are not grouped with the vehicles 302, 304, 306 to travel with the vehicles 302, 304, 306 along a route 312. Instead, the vehicles 308, 310 may be included in another vehicle consist or may not be included in any vehicle consist.

The communication unit 410 (shown in FIG. 3) of the lead vehicle 302 may have a wireless communication range 314. The range 314 indicates how far wireless messages sent from the communication unit 410 of the lead vehicle 302 may be successfully communicated to another vehicle. In the illustrated example, the vehicles 304, 306, 308 are within the wireless range 314 lead vehicle 302, while the vehicles 310 are outside of the wireless range 314 the lead vehicle 302. Thus, wireless messages (such as wireless linking messages) communicated from the lead vehicle 302 may be received by the vehicles 304, 306, 308, but not received by the vehicles 310.

Communicating the wireless linking messages from the lead vehicle 302 with the vehicle identifiers of the remote vehicles 304A, 304B can prevent establishment of communication links with the vehicles 308 that are within the wireless range 314 of the lead vehicle 302, but that are not included in the vehicle consist 300 of the lead vehicle 302. For example, one or more of the vehicles 308 may receive a wireless linking message the lead vehicle 302. These vehicles 308 can examine the vehicle identifier or vehicle identifiers included in the wireless linking message to determine if the vehicle identifier or identifiers in the wireless linking message matches the vehicle identifier associated with the vehicle 308. Because the vehicle identifiers in the wireless linking messages do not match or otherwise correspond with the vehicles 308, the vehicles 308 may determine that the wireless linking messages are not addressed to the vehicles 308. Thus, the vehicles 308 do not establish a communication link with the lead vehicle and/or do not respond to the wireless linking message with a linking confirmation message sent back to lead vehicle 302. Because the vehicle identifiers included in the linking message do match or otherwise correspond with the remote vehicles 304A, 304B, these vehicles 304A, 304B do establish communication link with the lead vehicle 302 and/or establish the communication links by responding with a linking confirmation message.

In one embodiment, a method (e.g., for communicatively linking vehicles in a vehicle consist) includes determining a vehicle identifier for a first remote vehicle included in a vehicle consist formed from a lead vehicle and at least the first remote vehicle, communicating a wireless linking message addressed to the vehicle identifier from the lead vehicle to the first remote vehicle, and establishing a communication link between the lead vehicle and the first remote vehicle responsive to receipt of the wireless linking message at the first remote vehicle. The communication link can be established such that movement of the first remote vehicle is remotely controlled from the lead vehicle via the communication link. The communication link can be established without an operator entering the first remote vehicle.

In one aspect, establishing the communication link can include receiving a wireless linking confirmation message from the first remote vehicle at the lead vehicle responsive to the wireless linking message being received at the first remote vehicle.

In one aspect, determining the vehicle identifier can include receiving a list of one or more unique identifying codes associated with at least the first remote vehicle from a vehicle control system that restricts movement of the vehicle consist based at least in part on a location of the vehicle consist.

In one aspect, the vehicle control system can include a positive train control system.

In one aspect, determining the vehicle identifier can include receiving a list of one or more unique identifying codes associated with at least the first remote vehicle from an energy management system that creates a trip plan to control movement of the vehicle consist. The trip plan can designate operational settings of the vehicle consist as a function of one or more of time, location, or distance along a route.

In one aspect, the vehicle consist includes the lead vehicle, the first remote vehicle, and at least a second remote vehicle. Determining the vehicle identifier can include determining a first unique vehicle identifier for the first remote vehicle and at least a second unique vehicle identifier for at least the second remote vehicle. Communicating the wireless linking message can include communicating a first wireless linking message to the first remote vehicle and communicating at least a second wireless linking message to at least the second remote vehicle. Establishing the communication link can include establishing a first communication link between the lead vehicle and the first remote vehicle and at least a second communication link between the lead vehicle and at least the second remote vehicle.

In one aspect, the method also can include detecting a single instance of an operator actuating an input device onboard the lead vehicle and communicating the first wireless linking message and the at least the second wireless linking message responsive to detecting the single instance of the operator actuating the input device.

In one aspect, communicating the wireless linking message can include broadcasting the wireless linking message such that the first remote vehicle receives the wireless linking message and at least one other remote vehicle that is located within a wireless communication range of the lead vehicle but that is not included in the vehicle consist receives the wireless linking message. Establishing the communication link between the lead vehicle and the first remote vehicle can include preventing the at least one other remote vehicle from establishing a communication link with the lead vehicle based at least in part on the vehicle identifier.

In another embodiment, a system (e.g., a communication system) includes a control unit and a communication unit. The control unit can be configured to determine a vehicle identifier for a first remote vehicle included in a vehicle consist formed from a lead vehicle and at least the first remote vehicle. The communication unit can be configured to communicate a wireless linking message addressed to the vehicle identifier from the lead vehicle to the first remote vehicle. The communication unit also can be configured to establish a communication link between the lead vehicle and the first remote vehicle responsive to receipt of the wireless linking message at the first remote vehicle. The control unit can be configured to remotely control movement of the first remote vehicle from the lead vehicle via the communication link. The communication link can be established without an operator entering the first remote vehicle.

In one aspect, the communication unit can be configured to receive a wireless linking confirmation message from the first remote vehicle at the lead vehicle responsive to the wireless linking message being received at the first remote vehicle.

In one aspect, the control unit can be configured to determine the vehicle identifier by receiving a list of one or more unique identifying codes associated with at least the first remote vehicle from a vehicle control system that restricts movement of the vehicle consist based at least in part on a location of the vehicle consist.

In one aspect, the vehicle control system can include a positive train control system.

In one aspect, the control unit can be configured to determine the vehicle identifier by receiving a list of one or more unique identifying codes associated with at least the first remote vehicle from an energy management system that creates a trip plan to control movement of the vehicle consist. The trip plan can designate operational settings of the vehicle consist as a function of one or more of time, location, or distance along a route.

In one aspect, the vehicle consist can include the lead vehicle, the first remote vehicle, and at least a second remote vehicle. The control unit can be configured to determine the vehicle identifier by determining a first unique vehicle identifier for the first remote vehicle and at least a second unique vehicle identifier for at least the second remote vehicle. The communication unit can be configured to communicate the wireless linking message by communicating a first wireless linking message to the first remote vehicle and communicating at least a second wireless linking message to at least the second remote vehicle. The communication unit also can be configured to establish the communication link by establishing a first communication link between the lead vehicle and the first remote vehicle and at least a second communication link between the lead vehicle and at least the second remote vehicle.

In one aspect, the control unit can be configured to detect a single instance of an operator actuating an input device onboard the lead vehicle and the communication unit can be configured to communicate the first wireless linking message and the at least the second wireless linking message responsive to the control unit detecting the single instance of the operator actuating the input device.

In one aspect, the communication unit can be configured to communicate the wireless linking message by broadcasting the wireless linking message such that the first remote vehicle receives the wireless linking message and at least one other remote vehicle that is located within a wireless communication range of the communication unit but that is not included in the vehicle consist receives the wireless linking message. The communication unit can be configured to prevent the at least one other remote vehicle from establishing a communication link with the lead vehicle based at least in part on the vehicle identifier.

In another embodiment, a method (e.g., for communicatively linking vehicles in a vehicle consist) includes receiving unique vehicle identifiers of remote vehicles included in a vehicle consist with a lead vehicle, communicating linking messages with the unique vehicle identifiers to the remote vehicles, and responsive to the unique vehicle identifiers in the linking messages matching the remote vehicles in the vehicle consist, establishing one or more communication links between the lead vehicle and the remote vehicles to permit the lead vehicle to remotely control movement of the remote vehicles included in the vehicle consist. The one or more communication links are established without an operator being onboard the remote vehicles to communicate responsive messages from the remote vehicles to the lead vehicle.

In one aspect, establishing the one or more communication links can include receiving one or more linking confirmation messages from the remote vehicles at the lead vehicle responsive to the linking messages being received at the remote vehicles without the operator being onboard the remote vehicles.

In one aspect, determining the vehicle identifiers can include receiving a list of one or more unique identifying codes associated with the remote vehicles from one or more of a vehicle control system that restricts movement of the vehicle consist based at least in part on a location of the vehicle consist and/or an energy management system that creates a trip plan to control movement of the vehicle consist. The trip plan can designate operational settings of the vehicle consist as a function of one or more of time, location, or distance along a route.

In one aspect, the method also can include detecting a single instance of an operator actuating an input device onboard the lead vehicle and communicating the linking messages occurs responsive to detecting the single instance of the operator actuating the input device.

In another embodiment, a method (e.g., for communicatively linking vehicles in a vehicle consist) includes determining a first unique vehicle identifier for a first remote vehicle and a second unique vehicle identifier for a second remote vehicle included in a vehicle consist formed from a lead vehicle, the first remote vehicle, and the second remote vehicle, detecting a single instance of an operator actuating an input device onboard the lead vehicle, communicating from the lead vehicle a first wireless linking message addressed to the first unique vehicle identifier to the first remote vehicle and communicating a second wireless linking message addressed to the second unique vehicle identifier to the second remote vehicle responsive to detecting the single instance of the operator actuating the input device, establishing a first communication link between the lead vehicle and the first remote vehicle responsive to receipt of the first wireless linking message at the first remote vehicle and a second communication link between the lead vehicle and the second remote vehicle responsive to receipt of the second wireless linking message at the second remote vehicle (where the communication link is established without an operator entering the first remote vehicle or the second remote vehicle), and remotely controlling movement of the first remote vehicle and the second remote vehicle from the lead vehicle via the first communication link and the second communication link, respectively. Communicating the wireless linking message can include broadcasting the first wireless linking message and the second wireless linking message such that the first remote vehicle receives the first wireless linking message and the second remote vehicle receives the second wireless linking message and at least one other remote vehicle that is located within a wireless communication range of the lead vehicle but that is not included in the vehicle consist receives at least one of the first wireless linking message or the second wireless linking message. Establishing the first communication link between the lead vehicle and the first remote vehicle and the second communication link between the lead vehicle and the second remote vehicle can include preventing the at least one other remote vehicle from establishing a communication link with the lead vehicle based at least in part on the first unique vehicle identifier or the second unique vehicle identifier.

Additional embodiments of the inventive subject matter are directed toward a system, method, and a computer software code for remotely establishing distributed power operations of a vehicle consist, such as a train. For example, one embodiment relates to a system for establishing distributed power operations of a vehicle consist (e.g., such as, but not limited to, a locomotive consist) from a single location in the vehicle consist. The vehicle consist may have a lead propulsion unit (e.g., such as, but not limited to, a locomotive) and/or a remote propulsion unit, with a distributed power system on each propulsion unit. The system includes a communication network providing communications within the vehicle consist, and at least one distributed power setup unit in communication with the propulsion units by way of the communication network. The distributed power setup unit has a processor, display, and/or an input device to allow a user to establish distributed power operations, or the setup unit may work autonomously. In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

Broadly speaking, at least one technical effect of the inventive subject matter provides for a method, system, and computer software code for automated set-up of a vehicle system, such as a distributed power train or another vehicle consist. To facilitate an understanding of the embodiments of the inventive subject matter, it is described hereinafter with reference to specific implementations thereof. Embodiments of the inventive subject matter may use program modules that may include routines, programs, objects, components, data structures, etc. that perform particular tasks or implement particular abstract data types. For example, the software programs that underlie embodiments of the inventive subject matter may be coded in different languages for use with different platforms.

Though one or more embodiments of the inventive subject matter are disclosed below as operating with hand-held devices, other embodiments may be practiced with other computer system configurations, including multiprocessor systems, microprocessor-based or programmable consumer electronics, minicomputers, mainframe computers, and the like. Embodiments of the inventive subject matter may also be practiced in distributed computing environments where tasks are performed by remote processing devices that are linked through a communications network. In a distributed computing environment, program modules may be in both local and remote computer storage media including memory storage devices. These local and remote computing environments may be contained entirely within the locomotive, or adjacent locomotives in consist, or off-board in wayside or central offices where wireless communication is used.

Throughout this document the term vehicle consist is used. A vehicle consist is a group of two or more vehicles that are mechanically coupled to travel together along a route. A vehicle consist may have one or more propulsion-generating units (e.g., vehicles capable of generating propulsive force, which also are referred to as propulsion units) in succession and connected to provide motoring and/or braking capability for the vehicle consist. The propulsion units may be connected with no other vehicles or cars between the propulsion units. One example of a vehicle consist is a locomotive consist that includes locomotives as the propulsion units. Other vehicles may be used instead of or in addition to locomotives to form the vehicle consist. A vehicle consist can also include non-propulsion units, such as where two or more propulsion units are connected with each other by a non-propulsion unit, such as a rail car, passenger car, or other vehicle that cannot generate propulsive force to propel the vehicle consist. A larger vehicle consist, such as a train, can have sub-consists. Specifically, there can be a lead consist (of propulsion units), and one or more remote consists (of propulsion units), such as midway in a line of cars and another remote consist at the end of the train. The vehicle consist may have a lead propulsion unit and a trail or remote propulsion unit. The terms "lead," "trail," and "remote" are used to indicate which of the propulsion units control operations of other propulsion units, and which propulsion units are controlled by other propulsion units, regardless of locations within the vehicle consist. For example, a lead propulsion unit can control the operations of the trail or remote propulsion units, even though the lead propulsion unit may or may not be disposed at a front or leading end of the vehicle consist along a direction of travel. A vehicle consist can be configured for distributed power operation, wherein throttle and braking commands are relayed from the lead propulsion unit to the remote propulsion units by a radio link or physical cable. Toward this end, the term vehicle consist should be not be considered a limiting factor when describing multiple propulsion units within the same vehicle consist.

Figure 5:
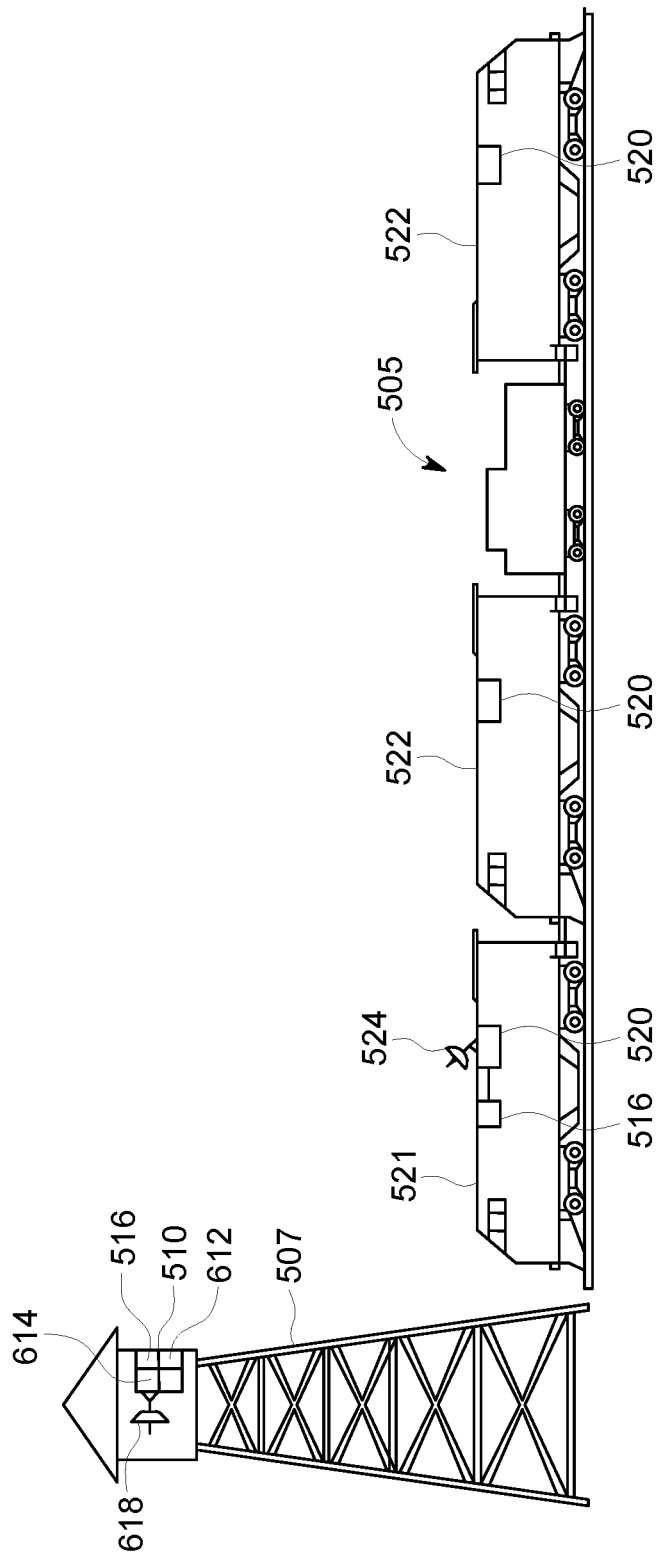
FIG. 5 depicts an embodiment of a system for remotely setting up, linking, and testing distributed power operations of a vehicle system, such as a vehicle consist.

Referring now to the drawings, embodiments of the inventive subject matter will be described. FIG. 5 depicts an embodiment of a system for remotely setting up, linking, and testing operations of a vehicle consist. In one embodiment, the system may set up, link, and/or test distributed power operations of a vehicle consist such as a train. At a location, or remote location, such as away from a vehicle consist or system 505, such as in a tower 507, a setup unit 510 is provided for an operator to use. The setup unit 510 can be a unit that sets up the vehicle consist 505 for distributed power operations or for other operations. In another embodiment, an operator aboard a vehicle consist, such as located in a lead propulsion unit 521 of the vehicle consist 505, may use the setup unit 510 to remotely setup remote propulsion units 522 in the vehicle consist 5 for operations, such as distributed power operations. While the propulsion units 521, 522 may be referred to as lead and remote locomotives, respectively, alternatively the units 521, 522 may represent other vehicles capable of generating propulsive force to propel the vehicle consist 505.

Figure 6:
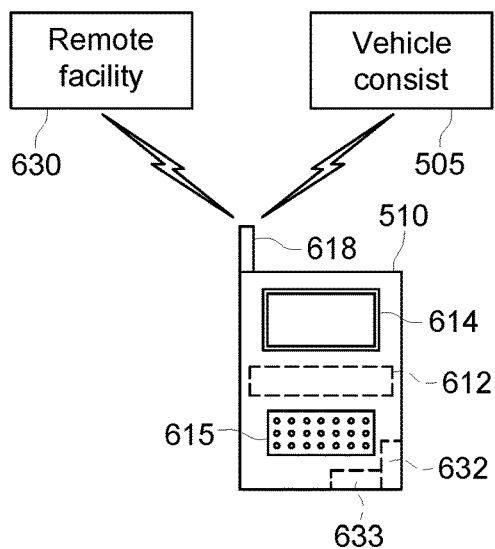
FIG. 6 depicts an embodiment of a setup unit.

FIG. 6 depicts an embodiment of a setup unit. The setup unit 510 has one or more computers, or processors, 612 with a display 614 and operator input device 615, such as but not limited to a mouse and/or a keyboard. As disclosed herein, the setup unit 510 may be a hand-held device. A first communication interface 618 is also connected to the setup unit 510. As further illustrated in FIG. 5, the first communication interface 618 can communicate with a distributed power system 520 on the propulsion units 521, 522.

At the vehicle consist 505, a second communication interface 524 is provided to receive and send communications between the second communication interface 524 and the first communication interface 618 at the setup unit 510. The first communication interface 618 at the setup unit 510 is in communication with the distributed power system 520 so that the setup unit 510 can receive information from the distributed power system 520 and send commands to the distributed power system 520. Examples of the distributed power system include, but are not limited to Assignee's LOCOTROL® Locomotive System Integration (LSI) Electronics, or System, and/or other systems/equipment that functions with the LSI system.

In an example use of the inventive subject matter, an operator may use the setup unit 510 to input such information as, but not limited to, road numbers of the lead propulsion unit 521 and all remote propulsion units 522 within the vehicle consist 505 to be linked (or other identifying information), the orientation of each propulsion unit 521, 522 within the vehicle consist 505 (e.g., whether the short hood or long hood of the respective propulsion unit 521, 522 is forward), and the like. By doing so, the propulsion units will know which direction is forward since each of the propulsion units 521, 522 may have either its respective short hood or long hood facing the direction that the vehicle consist 505 will move.

The setup unit 510 may transmit this information to each distributed power generating unit 521, 522 in the vehicle consist 505, or to the lead propulsion unit 521, which in turn can communicate with the remote propulsion units 522. In one embodiment, the on-board distributed system 520 only accepts such data when the propulsion units 521, 522 are not already linked. In another embodiment, the operator may override a prior link of the propulsion units 521, 522 with new information.

The on-board distributed system 520 may accept the data and proceed with linking the propulsion units 521, 522. The linking process could continue through completion of a test that confirms proper linking of the locomotives. The complete linking process could be completed without human intervention aboard any of the propulsion units 521, 522 and prior to operators physically entering the vehicle consist 505.

For example, with the LOCOTROL® LSI system, in an embodiment, information that may be provided on a display of the LSI system is also provided on a display on the setup unit 510. Based on how the LSI system functions, the remote propulsion units 521, 522 in a vehicle consist 505 are set up first. The lead propulsion unit 521 of the vehicle consist 505 is only set after all setups for the remote propulsion units 522 are completed. The distributed power operations can also be shutdown using an embodiment of the inventive subject matter. As described in more detail below with respect to FIG. 7, the lead propulsion unit 521 may report a status back to the setup unit 510, either confirming the linking process was successful or reporting a failure and identifying what step in the process detected the failure along with any information, or data, as to what could have caused the failure.

As further illustrated in FIG. 6, the setup unit may be accessible by other remote locations 630, such as a dispatch location and/or a repair depot. This remote location will know when the vehicle consist 505 is properly linked. If the linking process is not completed due to a failure, this information can also be forwarded.

In an embodiment, connections between the setup unit 510 and the distributed power system 520 may be via radio and/or any other form of wireless communication. In another embodiment, communication may take place via a wired connection. Communications between the setup unit 510 and the remote facility 507 may be via wireless communications and/or wired communications. For example, communications may occur using the Internet where dial-in-connections, cable modems, special high-speed IDSN lines, networks such as local area networks, wide area networks, etc. may be utilized. Furthermore, when the setup unit 510 is used aboard the vehicle consist 505, such aboard the lead propulsion unit 521, the unit 510 may be directly interfaced into the distributed power system 520 aboard the lead propulsion unit 521.

In addition to the parts of the setup unit 510 disclosed above, the setup unit 510 may also have a mass storage device 632 and memory 633. The setup unit 510 may store information regarding linking processes that are completed so that data about prior linking processes may be later communicated to a remote facility.

Figure 7:
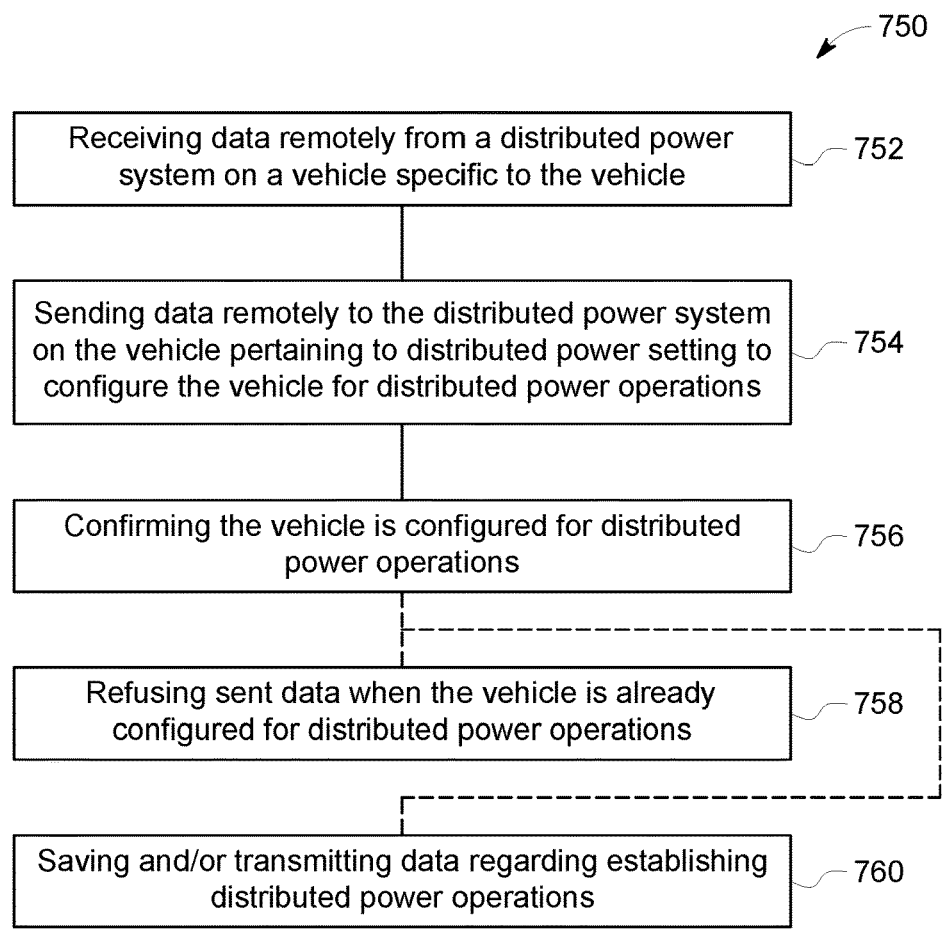
FIG. 7 depicts an embodiment of a flowchart of a method for remotely setting up, linking and testing distributed power operations of a vehicle consist.

FIG. 7 depicts a flowchart of a method for remotely setting up, linking, and testing operations of a vehicle consist. As described above and illustrated in the flowchart 750, the method includes receiving data remotely from a distributed power system on a propulsion unit, at 752. This data may be specific to the propulsion unit that receives the data. The data is sent remotely to the distributed power system on the propulsion unit pertaining to distributed power settings in order to configure the propulsion unit for distributed power operations, at 754. A confirmation is made as to whether the propulsion unit is configured for distributed power operations, at 756. As described above, if the propulsion unit 521, 522 is already configured for distributed power operations, the method may refuse the sent data, at 758. Additionally, data may be saved and/or transmitted regarding the establishment, or inability to establish, distributed power operations, at 760. As described above, the data may be sent back to the setup unit 510. If a failure occurs the data may include, but is not limited to, what step in the process detected the failure including data as to what could have caused the failure.

Figure 8:
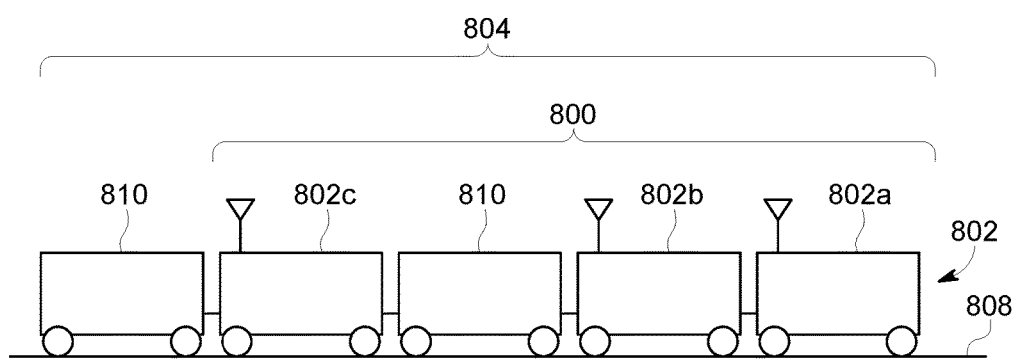
FIG. 8 is a schematic illustration of another embodiment of a communication system for controllably linking propulsion units in a vehicle consist.

FIG. 8 is a schematic illustration of another embodiment of a system 800 (e.g., a communication system) for controllably linking propulsion units 802 in a vehicle consist or system 804. The vehicle consist includes one or more propulsion units 802 (e.g., vehicles that generate propulsive force to propel the vehicle consist 804). In the illustrated embodiment, the vehicle consist includes three propulsion units 802A, 802B, 802C, but alternatively may include two propulsion units or more than three propulsion units. The vehicle consist is shown as a train, but alternatively may represent another system of vehicles that are connected with each other to travel together along a route 808, such as a track, road, waterway, and the like. The propulsion units may represent rail vehicles that are powered to propel the vehicle consist. Alternatively, the propulsion units may represent other vehicles that generate propulsive force, such as other rail vehicles, other off-highway vehicles, automobiles, marine vessels, and the like. The vehicle consist includes several non-propulsion units 810, such as vehicles that do not generate propulsive force to propel the vehicle consist. Examples of such non-propulsion units include, but are not limited to, rail cars, passenger cars, trailers, barges, and the like.

The communication system allows for the propulsion units of the vehicle consist to be controllably linked with each other. When the propulsion units are controllably linked, at least one of the propulsion units (referred to herein as a lead propulsion unit) can remotely control operations of other propulsion units (referred to herein as trail or remote propulsion units). When the propulsion units are not controllably linked, the lead propulsion unit may not be able to control operations of the remote propulsion units. The communication system is shown as including antennas of the propulsion units that wirelessly communicate with each other, but alternatively or additionally may include one or more wired connections, such as by using communications through one or more cables, buses, trainlines, conductors used for communications with electronically controlled pneumatic (ECP) brakes, conductors used for communications within an electric multiple unit (MU cable), and the like.

The terms "lead" and "remote" are meant to indicate which propulsion units control operations of other propulsion units, and does not necessarily indicate relative locations of the propulsion units in the vehicle consist. By "remotely" control, it is meant that the operations of the remote propulsion unit are controlled from a location that is outside of the remote propulsion unit, although not necessarily far away from the remote propulsion unit. In one embodiment, the communication system controllably links the propulsion units in a distributed power system so that the lead propulsion unit remotely controls the tractive efforts (e.g., propulsive forces) generated by the remote propulsion units.

The remote propulsion units can prevent a lead propulsion unit from remotely controlling operations of the remote propulsion units unless the lead propulsion unit and the remote propulsion unit are controllably linked with each other. Several remote propulsion units (e.g., propulsion units 802B, 802C) may be controllably linked with a single lead propulsion unit (e.g., propulsion unit 802A). Alternatively, one or more remote propulsion units can be controllably linked with more than one lead propulsion unit.

In order to controllably link propulsion units with each other, such as in a distributed power system, a linking process may be performed. The linking process described herein is used to associate (e.g., controllably link) a single lead propulsion unit with a single remote propulsion unit. The process may be used, however, to controllably link the lead propulsion unit with several remote propulsion units.

Figure 9A:
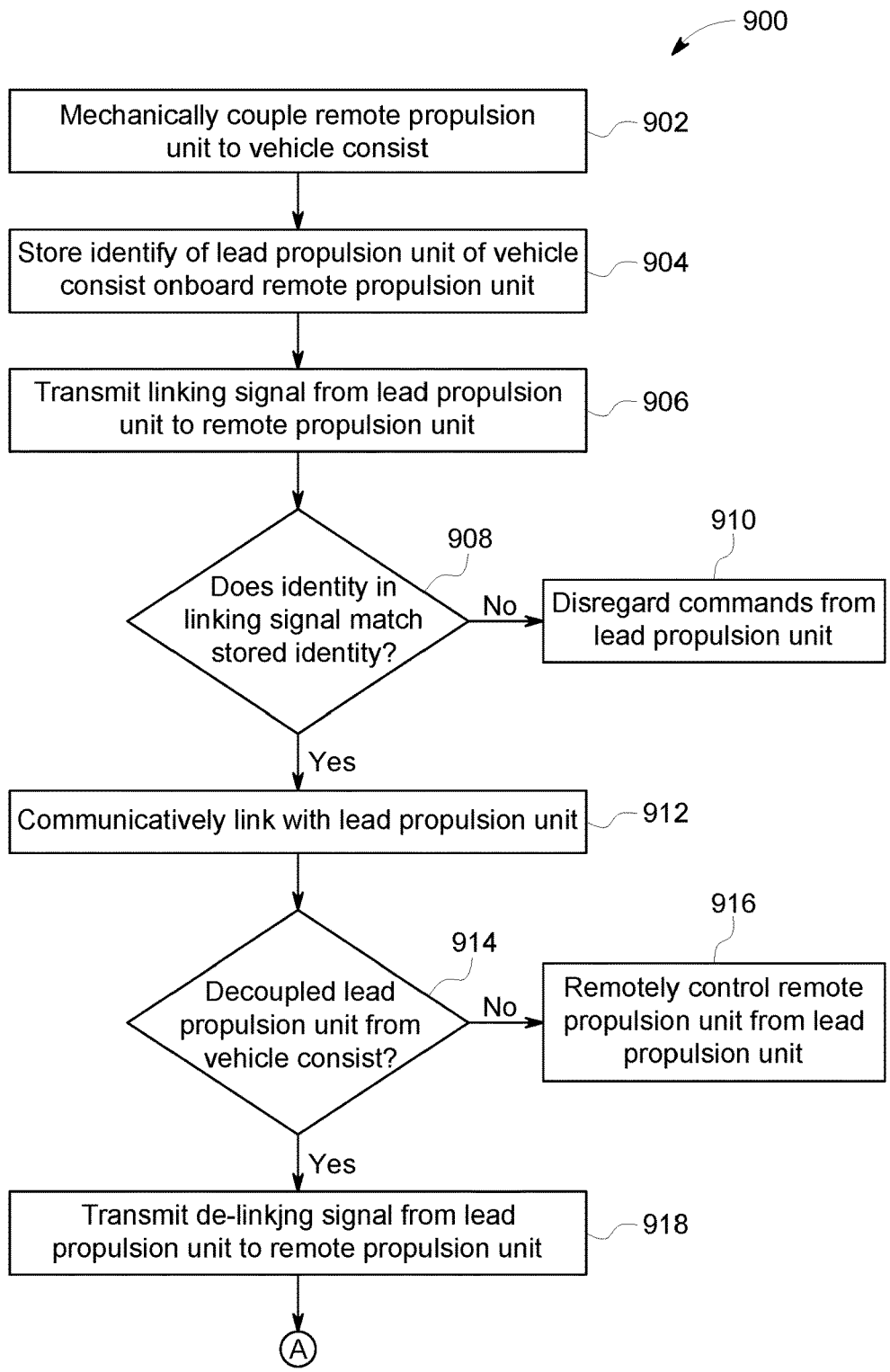
FIGS. 9A and 9B illustrate a flowchart of one embodiment of a method or process for controllably linking propulsion units of a vehicle consist.
Figure 9B:
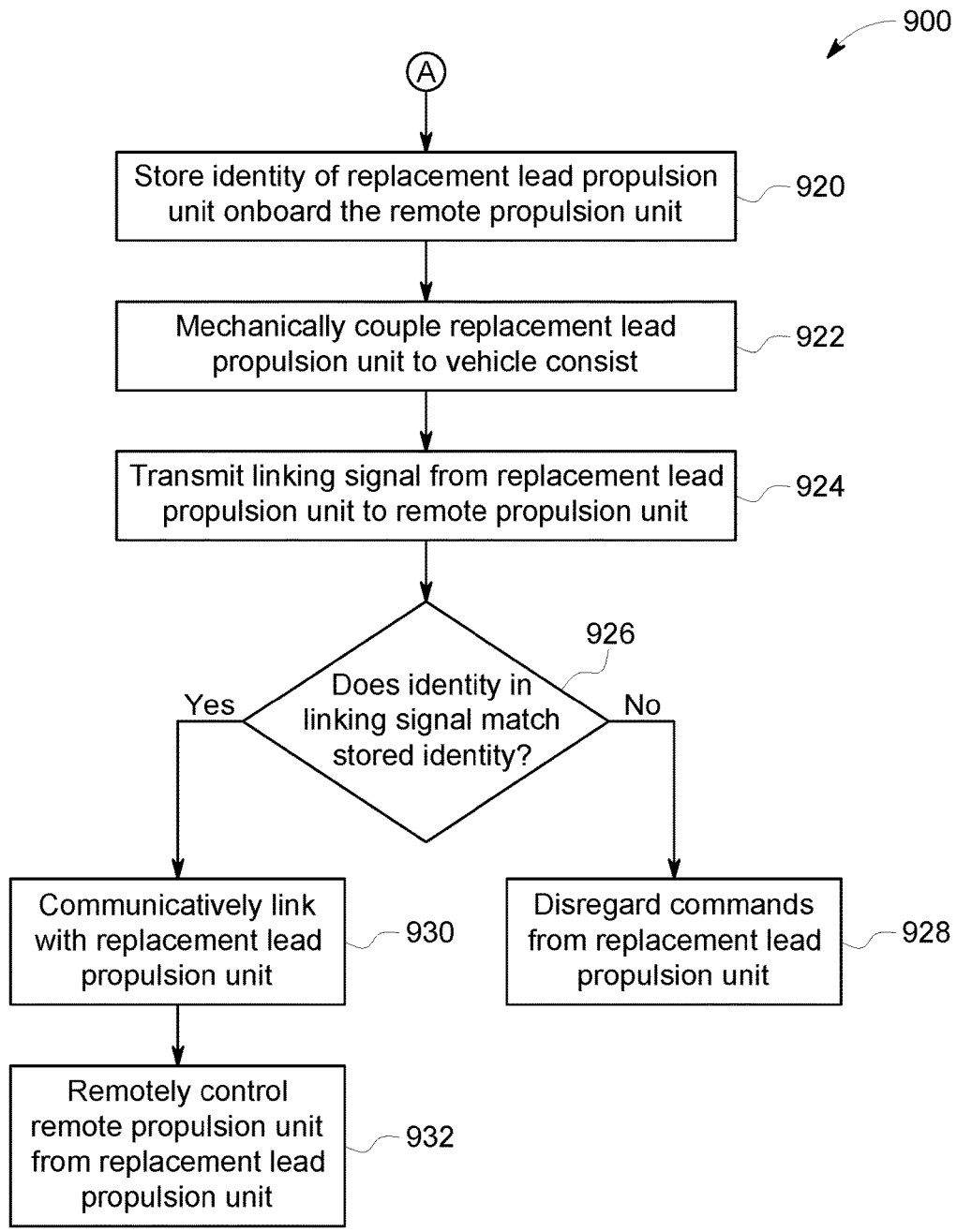

FIGS. 9A and 9B illustrate a flowchart of one embodiment of a method or process 900 for controllably linking propulsion units of a vehicle consist. The method 900 can represent the linking process that is used to controllably link or couple a remote propulsion unit with a first lead propulsion unit, to communicatively de-couple the remote propulsion unit from the first lead propulsion unit, and then to controllably link the remote propulsion unit with another, replacement lead propulsion unit. The linking of the remote propulsion unit with the replacement lead propulsion unit can be performed without requiring a human operator to enter the remote propulsion unit after the remote propulsion unit is first controllably linked with the first lead propulsion unit.

At 902, a remote propulsion unit 802B (shown in FIG. 8) is mechanically coupled with the vehicle consist. The remote propulsion unit 802B can be sequentially coupled with other propulsion units and/or non-propulsion units.

At 904, an identity of the first lead propulsion unit 802A is provided to the remote propulsion unit 802B. For example, an operator may enter the remote propulsion unit 802B and manually input the identity of the first lead propulsion unit 802A into a setup unit of the remote propulsion unit 802B. The propulsion units may be associated with unique identities that allow the remote propulsion unit 802B to differentiate between the different propulsion units. These identities may be alphanumeric strings, numeric strings, letter strings, or the like. The identity of the lead propulsion unit 802A that is provided to the remote propulsion unit 802B is referred to herein as a designated identity, as the identity may be designated by a person, component, device, or system other than the lead propulsion unit 802A.

At 906, a linking signal is transmitted from the lead propulsion unit 802A to the remote propulsion units. For example, a communication interface of the lead propulsion unit 802A may transmit or broadcast signals to the remote propulsion units of the vehicle consist. The linking signal includes an identity of the lead propulsion unit 802A that transmitted the linking signal. A communication interface onboard the remote propulsion unit 802B may receive the linking signal and extract the identity of the lead propulsion unit 802A from the linking signal.

At 908, a determination is made as to whether the identity that is included in the received linking signal corresponds to the designated identity that is locally stored at the remote propulsion unit 802B. For example, a setup unit onboard the remote propulsion unit 802B can compare the identity in the received linking signal with the locally stored designated identity to see if the identities both represent the same lead propulsion unit 802A. If the identity input at the remote propulsion unit 802B and the identity communicated in the received linking signal do not both represent the same lead propulsion unit 802A, then the remote propulsion unit 802B determines that the linking signal was sent from a propulsion unit that is not the same propulsion unit identified by the identity provided to the remote propulsion unit 802B. As a result, flow of the method 900 proceeds to 910. If both identities represent the same lead propulsion unit 802A, then the remote propulsion unit 802B determines that the linking signal was sent from the lead propulsion unit 802A previously identified by the operator. Thus, flow of the method 900 proceeds to 912.

At 910, the remote propulsion unit 802B does not controllably link with the lead propulsion unit 802A that transmitted the linking signal and command or control signals that are sent by the lead propulsion unit 802A to the remote propulsion unit 802B are ignored by the remote propulsion unit 802B.

At 912, the remote propulsion unit 802B is controllably linked with the lead propulsion unit 802A. For example, once a setup unit onboard the remote propulsion unit 802B confirms that the lead propulsion unit 802A is identified by both the designated identity stored onboard the remote propulsion unit 802B and the identity sent in the linking signal, then the setup unit may controllably link with the lead propulsion unit 802A. The lead propulsion unit 802A may then remotely control operations of the remote propulsion unit 802B.

At 914, a determination is made as to whether the lead propulsion unit 802A is to be removed from the vehicle consist or remain in the vehicle consist. For example, one or more faults may occur during operation of the lead propulsion unit, such as faults in the communication interface of the lead propulsion unit. Thus, the lead propulsion unit may be unable to remotely control the remote propulsion units. If the lead propulsion unit does not need to be decoupled from the vehicle consist and replaced with another lead propulsion unit, flow of the method 900 may proceed to 916. If the lead propulsion unit does need to be decoupled from the vehicle consist and replaced, then flow of the method 900 can continue to 918.

At 916, the lead propulsion unit remotely controls operations of the remote propulsion unit 802B during movement of the vehicle consist along the route. For example, the lead propulsion unit 802A can direct the tractive efforts, braking efforts, and the like, that are provided by the remote propulsion unit 802B during travel of the vehicle consist.

At 918, the lead propulsion unit is to be removed from the vehicle consist and, as a result, transmits a de-linking signal to the remote propulsion unit 802B. The de-linking signal may be transmitted before or after the lead propulsion unit is removed from the vehicle consist. The de-linking signal notifies the remote propulsion unit 802B that the lead propulsion unit is being removed and replaced by another, replacement propulsion unit.

Figure 10:
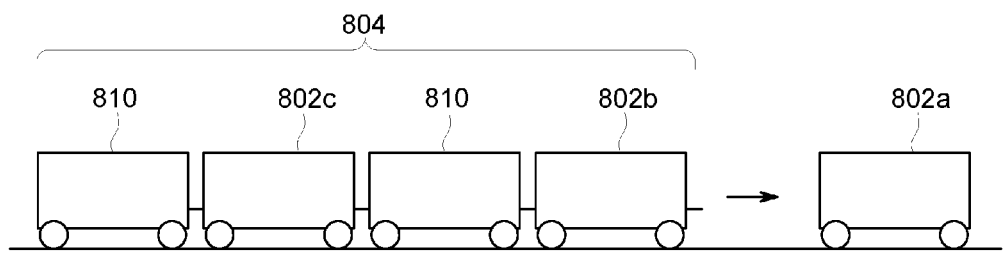
FIG. 10 schematically illustrates removal of a lead propulsion unit from the vehicle system in accordance with one embodiment.
Figure 11:
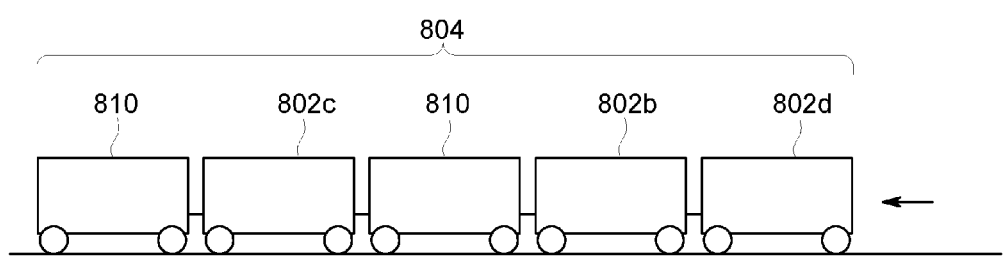
FIG. 11 schematically illustrates coupling of a replacement lead propulsion unit with the vehicle consist in accordance with one embodiment.

FIG. 10 schematically illustrates removal of the lead propulsion unit 802A from the vehicle consist 804 in accordance with one embodiment. The lead propulsion unit can be mechanically and/or logically de-coupled from the vehicle consist and moved away from the vehicle consist. FIG. 11 schematically illustrates coupling of a replacement lead propulsion unit 802D with the vehicle consist 804 in accordance with one embodiment. The replacement lead propulsion unit can be mechanically coupled with the vehicle consist after the lead propulsion unit 802A is removed from the vehicle consist.

Returning to the description of the method 900 shown in FIGS. 9A and 9B, the de-linking signal also can include an identity of the replacement lead propulsion unit 802D (referred to herein as a replacement identity). An operator may input the replacement identity into a setup unit onboard the lead propulsion unit. Alternatively, the replacement identity may be communicated to the lead propulsion unit from a remote location.

At 920 (shown in FIG. 9B), the identity of the replacement lead propulsion unit is stored onboard the remote propulsion unit 802B. For example, the setup unit disposed onboard the remote propulsion unit 802B can locally store the replacement identity in an onboard memory.

At 922, the replacement lead propulsion unit is mechanically coupled with the vehicle consist 804, as shown in FIG. 11. At 924, a linking signal (also referred to herein as a replacement linking signal) is transmitted from the replacement lead propulsion unit to the remote propulsion unit 802B. Like the linking signal transmitted by the previous lead propulsion unit 802A, the replacement linking signal may include the identity of the replacement propulsion unit 802D.

At 926, a determination is made as to whether the identity that is included in the replacement linking signal corresponds to the replacement identity that is locally stored at the remote propulsion unit 802B. For example, the setup unit onboard the remote propulsion unit 802B can compare the identity in the received replacement linking signal with the locally stored replacement identity to see if the identities both represent the same replacement lead propulsion unit. If the identities do not both represent the same replacement lead propulsion unit, then the remote propulsion unit 802B determines that the replacement linking signal was sent from a propulsion unit that is not the same propulsion unit identified by the replacement identity provided to the remote propulsion unit 802B in the de-linking signal sent by the previous lead propulsion unit 802A. Thus, flow of the method 900 proceeds to 928.

If both identities represent the same replacement lead propulsion unit 802D, then the remote propulsion unit 802B determines that the replacement linking signal was sent from the same replacement lead propulsion unit previously identified by the de-linking signal from the previous lead propulsion unit 802A. Thus, flow of the method 900 proceeds to 930.

At 928, the remote propulsion unit 802B does not controllably link with the replacement lead propulsion unit that transmitted the replacement linking signal. Consequently, command or control signals that are sent by the replacement lead propulsion unit to the remote propulsion unit 802B are ignored by the remote propulsion unit 802B.

At 930, the remote propulsion unit 802B is controllably linked with the replacement lead propulsion unit 802D. For example, once a setup unit onboard the remote propulsion unit 802B confirms that the replacement lead propulsion unit is identified by both the replacement identity stored onboard the remote propulsion unit 802B and the identity sent in the replacement linking signal, then the setup unit may controllably link with the replacement lead propulsion unit 802D.

At 932, the replacement lead propulsion unit remotely controls operations of the remote propulsion unit 802B. For example, the replacement lead propulsion unit can direct the tractive efforts, braking efforts, and the like, that are provided by the remote propulsion unit 802B during travel of the vehicle consist.

Figure 12:
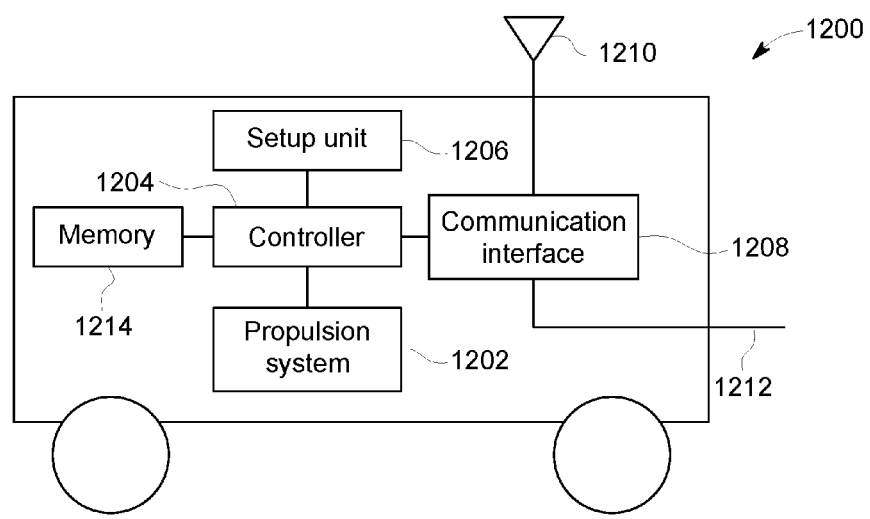
FIG. 12 is a schematic illustration of one embodiment of a propulsion unit.

FIG. 12 is a schematic illustration of one embodiment of a propulsion unit 1200. The propulsion unit 1200 may represent one or more of the propulsion units 802 shown or described herein. For example, the propulsion unit 1200 may represent the lead propulsion unit 802A, the remote propulsion unit 802B, and/or the replacement lead propulsion unit 802D.

The propulsion unit 1200 includes a propulsion system 1202 that generates propulsive force to propel the propulsion unit 1200. The propulsion system 1202 may include or represent one or more engines, alternators, generators, energy storage devices (e.g., batteries, flywheels, and the like), catenaries, shoes, traction motors, and the like.

The propulsion system 1202 is controlled by a controller 1204. The controller 1204 includes or represents one or more processors, input devices, output devices, and the like, that is used to control operations of the propulsion system 1202. The controller 1204 may receive input from an operator disposed onboard the propulsion unit 1200 to control the propulsion system 1202. Alternatively or additionally, the controller 1204 may be remotely controlled by another propulsion unit 1200. For example, if the controller 1204 is disposed onboard a remote propulsion unit that is controllably linked with a lead propulsion unit in a distributed power system, the controller 1204 may receive control signals or commands from the lead propulsion unit. The controller 1204 may then implement the commands from the lead propulsion unit to control operations of the propulsion system 1202.

A setup unit 1206 disposed onboard the propulsion unit 1200 may be similar to the setup unit 510 shown in FIG. 5. As described above, the setup unit 1206 can include or represent one or more processors, output devices (e.g., a display), and/or input devices. The setup unit 1206 can be a portable, hand-held device that is capable of being moved by an average human being within the propulsion unit 1200 and/or outside of the propulsion unit 1200 without mechanical assistance to lift and carry the setup unit 1206. Alternatively, the setup unit 1206 may be fixed within the propulsion unit 1200, such as by being mounted to a surface within the propulsion unit 1200.

The setup unit 1206 is operably connected with a communication interface 1208, which may be similar to the communication interface 518 shown in FIG. 5. The communication interface 1208 can include circuitry and associated hardware and/or software for allowing the propulsion unit 1200 to communicate with one or more other propulsion units 1200 or other locations. The communication interface 1208 includes an antenna 1210 that wirelessly communicates with other propulsion units 1200. Additionally or alternatively, the communication interface 1208 can be connected with a conductive pathway 1212 that is joined with the communication interface 1208 of another propulsion unit 1200. The communication interfaces 1208 can communicate with each other over this conductive pathway 1212. The conductive pathway 1212 can represent one or more cables, buses, and the like, such as an ECP line, a trainline, an eMU line, or the like.

A memory 1214 is disposed onboard the propulsion unit 1200 and is accessible to the controller 1204, setup unit 1206, and/or communication interface 1208. The memory 1214 can represent a tangible and non-transitory computer readable storage medium, such as a computer hard drive or other volatile or non-volatile memory. The memory 1214 can store one or more sets of instructions (e.g., software) that directs the setup unit 1206 and/or controller 1204 to perform one or more operations. As described herein, the memory 1214 can be used to store identities of propulsion units 1200. For example, where the propulsion unit 1200 represents a remote propulsion unit 1200 (e.g., the remote propulsion unit 802B in FIG. 8), the setup unit 1206 can be used to receive an operator-designated identity of a first lead propulsion unit and to store the designated identity in the memory 1214. The setup unit 1206 can then compare the designated identity in the memory 1214 with an identity that is received by the communication interface 1206 via a linking signal, as described above. When a replacement identity is received by the communication interface 1206, the setup unit 1206 can store the replacement identity in the memory 1214, also as described above.

In one embodiment, the propulsion units described herein may be interchangeable in that one or more propulsion units may can operate as lead propulsion units and remote propulsion units. For example, a first propulsion unit may operate as a lead propulsion unit in a vehicle consist to control operations of other propulsion units in the vehicle consist during a first time period. During a different, second time period (e.g., during the same or different trip of the vehicle consist), the first propulsion unit may operate as a remote propulsion unit so that operations of the first propulsion unit are controlled by another propulsion unit in the vehicle consist.

Figure 13:
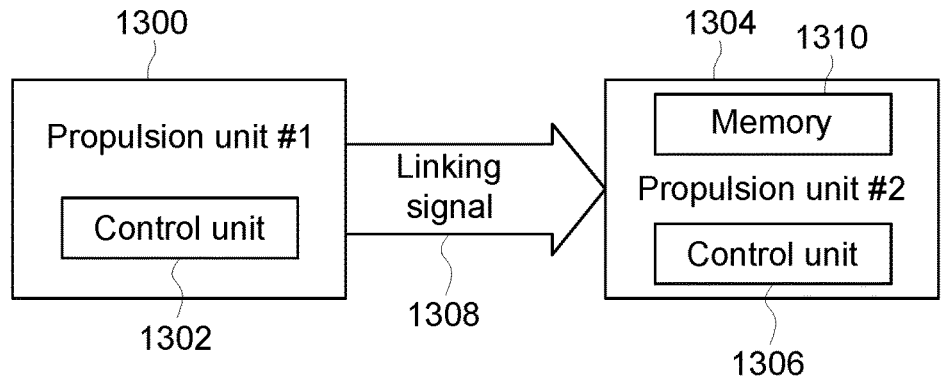
FIG. 13 illustrates one embodiment of a control unit of a propulsion unit operating in a first mode of operation.
Figure 14:
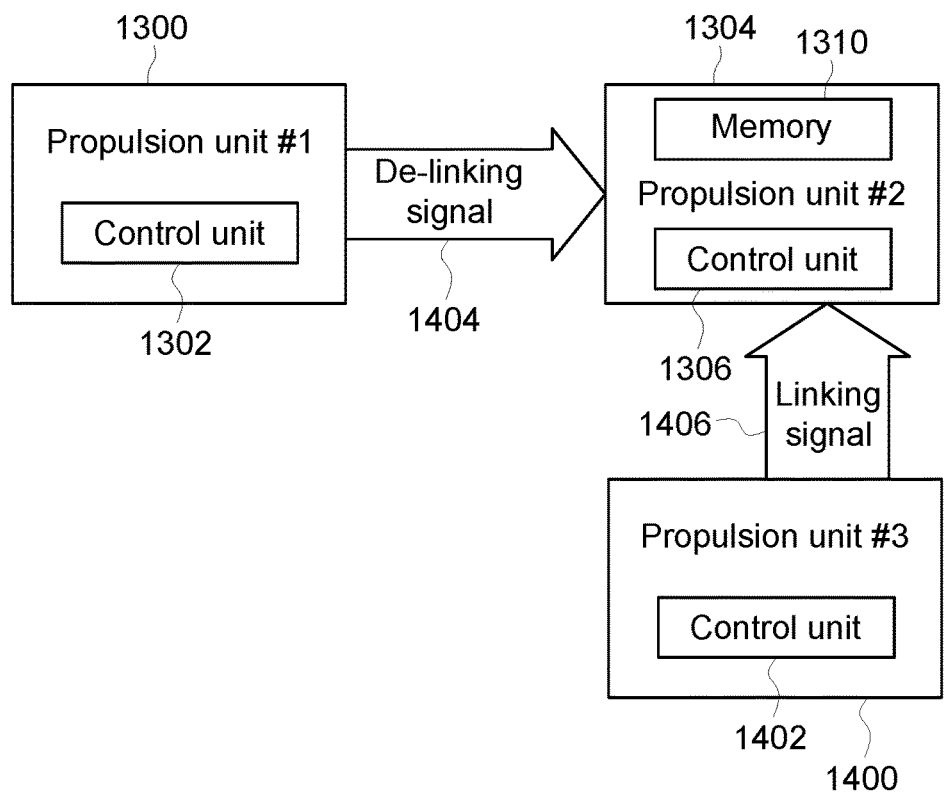
FIG. 14 illustrates one embodiment of the control unit of the propulsion unit shown in FIG. 13 operating in a different, second mode of operation.
Figure 15:
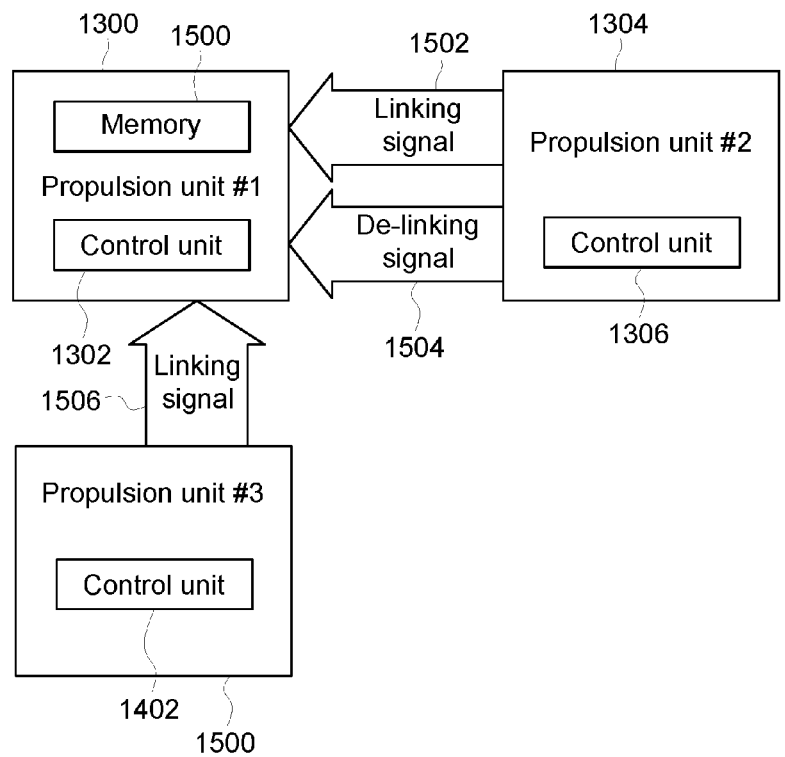
FIG. 15 illustrates one embodiment of the control unit of the first propulsion unit shown in FIG. 13 operating in a different, third mode of operation.

FIGS. 13 through 15 illustrate schematic diagrams of one embodiment of a first propulsion unit 1300 (e.g., "Propulsion Unit #1") operating in different modes. The first propulsion unit 1300 may represent one or more of the propulsion units described herein. The first propulsion unit 1300 includes a control unit 1302, which may represent the setup unit 1206, controller 804, and/or communication interface 1206 (shown in FIG. 12). The first propulsion unit 1300 also can include a memory 1500 (shown in FIG. 15) similar to the memory 814 (shown in FIG. 12). Also shown in FIGS. 13 through 15 are second and third propulsion units 1304, 1400 (e.g., "Propulsion Unit #2" and "Propulsion Unit #3," respectively), which may represent one or more of the propulsion units described herein. The second and third propulsion units 1304, 1400 also can include control units 1306, 1402 and/or memories 1310, similar to the first propulsion unit 1300. In one embodiment, the control units 1302, 1306, 1402 of the first, second, and third propulsion unit 1300, 1304, 1400 may interchangeably switch between operating modes to switch which of the propulsion units 1300, 1304, 1400 operate as a lead propulsion unit (e.g., that remotely controls operations of other propulsion units in a vehicle consist) and which of the propulsion units 1300, 1304, 1400 operate as a remote propulsion unit. While the description herein focuses on the control unit 1302 of the first propulsion unit 1300 switching between different operations modes, the description also may apply to the control units 1306 and/or 1402 of the second and/or third propulsion units 1304, 1400.

FIG. 13 illustrates the control unit 1302 of the first propulsion unit 1300 operating in a first mode of operation where the first propulsion unit 1300 is to controllably link with the second propulsion unit 1304 to control operations of the second propulsion unit 1304. As described above, the control unit 1302 transmits a first linking signal 1308 to the control unit 1306 of the second propulsion unit 1304. The first linking signal 1308 includes or represents an identity of the control unit 1302 of the first propulsion unit 1300 (and/or an identity of the first propulsion unit 1300). The control unit 1306 compares this identity to a designated identity stored in the memory 1310 (or received from an operator, received from an off-board location, or the like), as described above. If the received identity of the first linking signal 1308 matches the designated identity, then the control unit 1302 of the first propulsion unit 1300 is controllably linked with the control unit 1306 of the second propulsion unit 1304 to remotely control operations of the second propulsion unit 1304.

FIG. 14 illustrates the control unit 1302 of the first propulsion unit 1300 operating in a different, second mode of operation where the first propulsion unit 1300 de-links from the second propulsion unit 1304. The control unit 1302 transmits a first de-linking signal 1404 to the control unit 1306 of the second propulsion unit 1304 when the first propulsion unit 1300 is to be mechanically decoupled from the vehicle consist that includes the first and second propulsion units 1300, 1304. The first de-linking signal 1404 includes a first replacement identity of the third propulsion unit 1400 that is to be mechanically coupled to the vehicle consist to replace the first propulsion unit 1304. The control unit 1402 of the third propulsion unit 1400 can transmit a second linking signal 1406 to the control unit 1306 of the second propulsion unit 1400 that includes or represents an identity of the control unit 1402 (and/or an identity of the third propulsion unit 1400). As described above, the third propulsion unit 1400 can be joined with the vehicle consist to control the second propulsion unit 1304 if the first replacement identity that is received in the de-linking signal 1404 matches or otherwise corresponds to the identity that is communicated in the linking signal 1406.

FIG. 15 illustrates the control unit 1302 of the first propulsion unit 1300 operating in a different, third mode of operation where the first propulsion unit 1300 can operate as a remote propulsion unit. Similar to as described above, the control unit 1302 of the first propulsion unit 1300 can receive a third linking signal 1502 from the control unit 1306 of the second propulsion unit 1304. The control unit 1302 can compare an identity that is communicated in the third linking signal 1502 with a designated identity that is stored in the memory 1500 of the first propulsion unit 1300 (or received from an operator, received from an off-board source, or the like). If the identities match, then the control unit 1302 may be controllably linked with the control unit 1306 of the second propulsion unit 1304 such that the control unit 1306 of the second propulsion unit 1304 remotely controls operations of the first propulsion unit 1300.

In the third mode, the control unit 1302 of the first propulsion unit 1300 can receive a second de-linking signal 1504 from the control unit 1306 of the second propulsion unit 1304. As described above, the de-linking signal 1504 may be transmitted when the second propulsion unit 1304 is to separate from the vehicle consist that includes the first propulsion unit 1300. The second de-linking signal 1504 can include a replacement identity of a control unit on another propulsion unit.

The control unit 1402 of the third propulsion unit 1500 transmits a fourth linking signal 1506 to the control unit 1302 of the first propulsion unit 1300 when the third propulsion unit 1500 is to connect with the vehicle consist as a lead propulsion unit. The fourth linking signal 1506 includes an identity of the control unit 1402 of the third propulsion unit 1500 and/or an identity of the third propulsion unit 1500. The control unit 1302 of the first propulsion unit 1300 compares the identity that is received via the fourth linking signal 1506 with the replacement identity that is received via the de-linking signal 1504. If the identities match or otherwise correspond with each other (e.g., by identifying the same control unit and/or propulsion unit), then the control unit 1302 of the first propulsion unit 1300 can be controllably linked with the control unit 1402 of the third propulsion unit 1500 such that the control unit 1402 can remotely control operations of the first propulsion unit 1300.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one aspect, the remote propulsion unit prevents the first lead propulsion unit from remotely controlling operations of the remote propulsion unit when the remote propulsion unit is not controllably linked with the first lead propulsion unit.

In one aspect, the remote propulsion unit prevents the second lead propulsion unit from remotely controlling operations of the remote propulsion unit when the remote propulsion unit is not controllably linked with the second lead propulsion unit.

In another aspect, transmitting the linking signal occurs when both the first lead propulsion unit and the remote propulsion unit are mechanically coupled with the vehicle consist.

In another aspect, the method also includes inputting the designated identity into a memory disposed onboard the remote propulsion unit.

In another aspect, the method further includes confirming that the second lead propulsion unit can control the operations of the remote propulsion unit by comparing the second identity in the linking signal to the replacement identity that is received onboard the remote propulsion unit, and transmitting a confirmation signal from the remote propulsion unit to the second lead propulsion unit that confirms that the second lead propulsion unit can control the operations of the remote propulsion unit.

In another aspect, at least one of transmitting the linking signal, transmitting the de-linking signal, or transmitting the replacement linking signal occurs over a wireless connection between the remote propulsion unit and one or more of the first lead propulsion unit or the second lead propulsion unit.

In another aspect, at least one of transmitting the linking signal, transmitting the de-linking signal, or transmitting the replacement linking signal occurs over a wired connection between the remote propulsion unit and one or more of the first lead propulsion unit or the second lead propulsion unit.

In another aspect, the method also includes storing the replacement identity in a memory disposed onboard the remote propulsion unit so that the replacement identity in the de-linking signal can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, transmitting the de-linking signal to the remote propulsion unit notifies the remote propulsion unit that the first propulsion unit is to be mechanically decoupled from the vehicle consist.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In another aspect, receiving the linking signal occurs when both the first lead propulsion unit and the remote propulsion unit are mechanically coupled with the vehicle consist.

In another aspect, the method also includes receiving the designated identity into a memory disposed onboard the remote propulsion unit.

In another aspect, the method also includes confirming that the second lead propulsion unit can control the operations of the remote propulsion unit by comparing the second identity in the linking signal to the replacement identity that is received onboard the remote propulsion unit, wherein transmitting the second confirmation signal is performed when the second identity corresponds to the replacement identity.

In another aspect, at least one of receiving the linking signal, receiving the de-linking signal, or receiving the replacement linking signal occurs over a wireless connection between the remote propulsion unit and one or more of the first lead propulsion unit or the second lead propulsion unit.

In another aspect, at least one of receiving the linking signal, receiving the de-linking signal, or receiving the replacement linking signal occurs over a wired connection between the remote propulsion unit and one or more of the first lead propulsion unit or the second lead propulsion unit.

In another aspect, the method further includes storing the replacement identity in a memory disposed onboard the remote propulsion unit so that the replacement identity can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, the de-linking signal notifies the remote propulsion unit that the first propulsion unit is to be mechanically decoupled from the vehicle consist.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system when the remote propulsion unit verifies that the lead propulsion unit can control operations of the remote propulsion unit.

In another aspect, transmitting the de-linking signal occurs over a wireless connection between the remote propulsion unit and the lead propulsion unit.

In another aspect, transmitting the de-linking signal occurs over a wired connection between the remote propulsion unit and the lead propulsion unit.

In another aspect, at least one of the propulsion units other than the lead propulsion unit can control the operations of the remote propulsion unit only when the replacement identity that is transmitted in the de-linking signal corresponds to a second identity of the at least one of the propulsion units.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In another aspect, the first communication interface is configured to transmit the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit. The second communication interface can be configured to transmit a confirmation signal from the remote propulsion unit to the second lead propulsion unit that confirms that the second lead propulsion unit can control the operations of the remote propulsion unit.

In another aspect, at least one of the first communication interface, the second communication interface, or the third communication interface is configured to communicate the linking signal, the de-linking signal, or the replacement linking signal over a wireless connection between the remote propulsion unit and one or more of the first lead propulsion unit or the second lead propulsion unit.

In another aspect, at least one of the first communication interface, the second communication interface, or the third communication interface is configured to communicate the linking signal, the de-linking signal, or the replacement linking signal over a wired connection between the remote propulsion unit and one or more of the first lead propulsion unit or the second lead propulsion unit.

In another aspect, the setup unit is configured to store the replacement identity in a memory disposed onboard the remote propulsion unit so that the replacement identity in the de-linking signal can be compared to the second identity in the replacement linking signal when the replacement linking signal is received.

In another aspect, the setup unit controllably links the remote propulsion unit and the second lead propulsion unit in a distributed power system when the second identity in the replacement linking signal corresponds to the replacement identity in the de-linking signal.

In another aspect, the first communication unit is configured to transmit the de-linking signal to the remote propulsion unit to notify the remote propulsion unit that the first propulsion unit is to be mechanically decoupled from the vehicle consist.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit is configured to allow the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In another aspect, the communication unit is configured to receive the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit.

In another aspect, the remote propulsion unit and the second lead propulsion unit are controllably linked in a distributed power system by the setup unit when the second identity in the replacement linking signal corresponds to the replacement identity in the de-linking signal.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In one embodiment, a method (e.g., for controllably linking propulsion units, or propulsion units, in a vehicle consist) includes transmitting a linking signal from a first lead propulsion unit of a vehicle consist to a remote propulsion unit of the vehicle consist. The linking signal includes a first identity of the first lead propulsion unit. The remote propulsion unit and the first lead propulsion unit are controllably linked with each other when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked. The method also includes transmitting a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method further includes transmitting a replacement linking signal from a second lead propulsion unit to the remote propulsion unit. The replacement linking signal includes a second identity of the second lead propulsion unit. The remote propulsion unit and the second lead propulsion unit are controllably linked when the second identity of the second lead propulsion unit corresponds to the replacement identity received at the remote propulsion unit. The remote propulsion unit allows the second lead propulsion unit to remotely control the operations of the remote propulsion unit when the second lead propulsion unit and the remote propulsion unit are controllably linked.

In one aspect, the remote propulsion unit prevents the first lead propulsion unit from remotely controlling operations of the remote propulsion unit when the remote propulsion unit is not controllably linked with the first lead propulsion unit.

In one aspect, the remote propulsion unit prevents the second lead propulsion unit from remotely controlling operations of the remote propulsion unit when the remote propulsion unit is not controllably linked with the second lead propulsion unit.

In another aspect, transmitting the linking signal occurs when both the first lead propulsion unit and the remote propulsion unit are mechanically coupled with the vehicle consist.

In another aspect, the method also includes inputting the designated identity into a memory disposed onboard the remote propulsion unit.

In another aspect, the method further includes confirming that the second lead propulsion unit can control the operations of the remote propulsion unit by comparing the second identity in the linking signal to the replacement identity that is received onboard the remote propulsion unit, and transmitting a confirmation signal from the remote propulsion unit to the second lead propulsion unit that confirms that the second lead propulsion unit can control the operations of the remote propulsion unit.

In another aspect, at least one of transmitting the linking signal, transmitting the de-linking signal, or transmitting the replacement linking signal occurs over a wireless connection between the remote propulsion unit and one or more of the first lead propulsion unit or the second lead propulsion unit.

In another aspect, at least one of transmitting the linking signal, transmitting the de-linking signal, or transmitting the replacement linking signal occurs over a wired connection between the remote propulsion unit and one or more of the first lead propulsion unit or the second lead propulsion unit.

In another aspect, the method also includes storing the replacement identity in a memory disposed onboard the remote propulsion unit so that the replacement identity in the de-linking signal can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, transmitting the de-linking signal to the remote propulsion unit notifies the remote propulsion unit that the first propulsion unit is to be mechanically decoupled from the vehicle consist.

In one embodiment, method (e.g., for controllably linking a remote propulsion unit with a lead propulsion unit in a vehicle consist) includes receiving a linking signal from a first lead propulsion unit of a vehicle consist at a remote propulsion unit of the vehicle consist. The linking signal includes a first identity of the first lead propulsion unit. The method also includes transmitting a first confirmation signal from the remote propulsion unit to the first lead propulsion unit to controllably link the remote propulsion unit with the first lead propulsion unit. The first confirmation signal is transmitted when the first identity of the first lead propulsion unit in the linking signal corresponds to a designated identity that is stored onboard the remote propulsion unit. The remote propulsion unit allows the first lead propulsion unit to remotely control operations of the remote propulsion unit when the first lead propulsion unit and the remote propulsion unit are controllably linked.

The method further includes receiving a de-linking signal from the first lead propulsion unit at the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The method also includes receiving a replacement linking signal from a second lead propulsion unit at the remote propulsion unit, the replacement linking signal including a second identity of the second lead propulsion unit, and transmitting a second confirmation signal from the remote propulsion unit to the second lead propulsion unit to controllably link the remote propulsion unit with the second lead propulsion unit, the second confirmation signal transmitted when the second identity of the second lead propulsion unit corresponds to the replacement identity in the de-linking signal that is received at the remote propulsion unit. The remote propulsion unit allows the second lead propulsion unit to remotely control the operations of the remote propulsion unit when the second lead propulsion unit and the remote propulsion unit are controllably linked.

In another aspect, receiving the linking signal occurs when both the first lead propulsion unit and the remote propulsion unit are mechanically coupled with the vehicle consist.

In another aspect, the method also includes receiving the designated identity into a memory disposed onboard the remote propulsion unit.

In another aspect, the method also includes confirming that the second lead propulsion unit can control the operations of the remote propulsion unit by comparing the second identity in the linking signal to the replacement identity that is received onboard the remote propulsion unit, wherein transmitting the second confirmation signal is performed when the second identity corresponds to the replacement identity.

In another aspect, at least one of receiving the linking signal, receiving the de-linking signal, or receiving the replacement linking signal occurs over a wireless connection between the remote propulsion unit and one or more of the first lead propulsion unit or the second lead propulsion unit.

In another aspect, at least one of receiving the linking signal, receiving the de-linking signal, or receiving the replacement linking signal occurs over a wired connection between the remote propulsion unit and one or more of the first lead propulsion unit or the second lead propulsion unit.

In another aspect, the method further includes storing the replacement identity in a memory disposed onboard the remote propulsion unit so that the replacement identity can be compared to the second identity in the replacement linking signal when the replacement linking signal is received.

In another aspect, the remote propulsion unit and the second lead propulsion unit are controllably linked in a distributed power system when the second identity in the replacement linking signal corresponds to the replacement identity in the de-linking signal.

In another aspect, the de-linking signal notifies the remote propulsion unit that the first propulsion unit is to be mechanically decoupled from the vehicle consist.

In one embodiment, a method (e.g., for de-linking a lead propulsion unit from a remote propulsion unit in a vehicle consist) includes, in the vehicle consist having plural propulsion units configured to propel the vehicle consist, transmitting a linking signal from a lead propulsion unit of the propulsion units to a remote propulsion unit of the propulsion units, the linking signal including a first identity of the lead propulsion unit. The method also includes controllably linking the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked. The method further includes transmitting a de-linking signal from the lead propulsion unit to the remote propulsion unit when the lead propulsion unit is to be mechanically decoupled from the vehicle consist. The de-linking signal includes a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In another aspect, transmitting the de-linking signal occurs over a wireless connection between the remote propulsion unit and the lead propulsion unit.

In another aspect, transmitting the de-linking signal occurs over a wired connection between the remote propulsion unit and the lead propulsion unit.

In another aspect, at least one of the propulsion units other than the lead propulsion unit can control the operations of the remote propulsion unit only when the replacement identity that is transmitted in the de-linking signal corresponds to a second identity of the at least one of the propulsion units.

In one embodiment, a system (e.g., a communication system of a vehicle consist) includes first, second, and third communication interfaces and a setup device. The first communication interface is configured to be disposed onboard a first lead propulsion unit of a vehicle consist. The first communication interface is configured to transmit a linking signal from the first lead propulsion unit to a remote propulsion unit of the vehicle consist. The linking signal includes a first identity of the first lead propulsion unit. The second communication interface is configured to be disposed onboard the remote propulsion unit and to receive the linking signal from the first lead propulsion unit. The setup unit is configured to be disposed onboard the remote propulsion unit and to direct the second communication interface to controllably link with the first communication interface of the first lead propulsion unit when the first identity of the first lead propulsion unit in the linking signal corresponds to a designated identity that is stored onboard the remote propulsion unit.

The setup unit allows the remote propulsion unit to be remotely controlled by the first lead propulsion unit when the first and second communication interfaces are controllably linked. The first communication interface is configured to transmit a de-linking signal from the first lead propulsion unit to the remote propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit.

The third communication interface is configured to be disposed onboard a second lead propulsion unit of the vehicle consist. The third communication interface is configured to transmit a replacement linking signal to the remote propulsion unit that includes a second identity of the second lead propulsion unit. The setup unit is configured to controllably link the remote propulsion unit with the second lead propulsion unit when the second identity of the second lead propulsion unit corresponds to the replacement identity in the de-linking signal that is received at the remote propulsion unit. The setup unit also is configured to allow the second lead propulsion unit to remotely control operations of the remote propulsion unit when the second lead propulsion unit and the remote propulsion unit are controllably linked.

In another aspect, the first communication interface is configured to transmit the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit. The second communication interface can be configured to transmit a confirmation signal from the remote propulsion unit to the second lead propulsion unit that confirms that the second lead propulsion unit can control the operations of the remote propulsion unit.

In another aspect, at least one of the first communication interface, the second communication interface, or the third communication interface is configured to communicate the linking signal, the de-linking signal, or the replacement linking signal over a wireless connection between the remote propulsion unit and one or more of the first lead propulsion unit or the second lead propulsion unit.

In another aspect, at least one of the first communication interface, the second communication interface, or the third communication interface is configured to communicate the linking signal, the de-linking signal, or the replacement linking signal over a wired connection between the remote propulsion unit and one or more of the first lead propulsion unit or the second lead propulsion unit.

In another aspect, the setup unit is configured to store the replacement identity in a memory disposed onboard the remote propulsion unit so that the replacement identity in the de-linking signal can be compared to the second identity in the replacement linking signal when the replacement linking signal is received.

In another aspect, the setup unit controllably links the remote propulsion unit and the second lead propulsion unit in a distributed power system when the second identity in the replacement linking signal corresponds to the replacement identity in the de-linking signal.

In another aspect, the first communication unit is configured to transmit the de-linking signal to the remote propulsion unit to notify the remote propulsion unit that the first propulsion unit is to be mechanically decoupled from the vehicle consist.

In one embodiment, a system (e.g., a communication system of a remote propulsion unit in a vehicle consist) includes a communication interface and a setup unit. The communication interface is configured to be disposed onboard a remote propulsion unit of a vehicle consist and to receive a linking signal from a first lead propulsion unit of the vehicle consist that includes a first identity of the first lead propulsion unit. The setup unit is configured to be disposed onboard the remote propulsion unit and to controllably link the remote propulsion unit with the first lead propulsion unit when the first identity of the first lead propulsion unit in the linking signal corresponds to a designated identity that is stored onboard the remote propulsion unit. The setup unit allows the first lead propulsion unit to remotely control operations of the remote propulsion unit when the first lead propulsion unit and the remote propulsion unit are controllably linked. In one aspect, the setup unit can prevent the first lead propulsion unit from remotely controlling operations of the remote propulsion unit when the remote propulsion unit is not controllably linked with the first lead propulsion unit.

The communication interface is configured to receive a de-linking signal from the first lead propulsion unit when the first lead propulsion unit is to be mechanically decoupled from the vehicle consist. The de-linking signal includes a replacement identity of a propulsion unit other than the first lead propulsion unit that is to be mechanically coupled to the vehicle consist to replace the first lead propulsion unit. The communication interface also is configured to receive a replacement linking signal from a second lead propulsion unit at the remote propulsion unit, the replacement linking signal including a second identity of the second lead propulsion unit. The setup unit is further configured to allow the remote propulsion unit to be controlled by the second lead propulsion unit when the second identity of the second lead propulsion unit corresponds to the replacement identity in the de-linking signal that is received at the remote propulsion unit.

In another aspect, the communication unit is configured to receive the linking signal when both the first lead propulsion unit and the remote propulsion unit are mechanically coupled with the vehicle consist.

In another aspect, the system also includes a memory configured to be disposed onboard the remote propulsion unit and to store the designated identity.

In another aspect, the setup unit is configured to confirm that the second lead propulsion unit can control the operations of the remote propulsion unit by comparing the second identity in the linking signal to the replacement identity that is received onboard the remote propulsion unit.

In another aspect, the remote propulsion unit and the second lead propulsion unit are controllably linked in a distributed power system by the setup unit when the second identity in the replacement linking signal corresponds to the replacement identity in the de-linking signal.

In one embodiment, a system (e.g., a communication system of a lead propulsion unit in a vehicle consist) includes a communication interface that is configured to be disposed onboard the lead propulsion unit of the vehicle consist having plural propulsion units configured to propel the vehicle consist. The communication interface is configured to transmit transmitting a linking signal to a remote propulsion unit of the propulsion units, the linking signal including a first identity of the lead propulsion unit. A setup unit that is onboard the remote propulsion unit controllably links the remote propulsion unit with the lead propulsion unit when the first identity of the lead propulsion unit in the linking signal corresponds to a designated identity that is stored onboard the remote propulsion unit. The remote propulsion unit allows the lead propulsion unit to remotely control operations of the remote propulsion unit when the lead propulsion unit and the remote propulsion unit are controllably linked.

The communication interface also is configured to transmit a de-linking signal to the remote propulsion unit when the lead propulsion unit is to be mechanically decoupled from the vehicle consist. The de-linking signal including a replacement identity of a propulsion unit other than the lead propulsion unit that is to be mechanically coupled to the vehicle consist to replace the lead propulsion unit. The replacement identity is transmitted to the remote propulsion unit to permit the remote propulsion unit to verify which of the propulsion units in the vehicle consist can remotely control operations of the remote propulsion unit.

In another aspect, the de-linking signal notifies the remote propulsion unit that the first propulsion unit is to be mechanically decoupled from the vehicle consist.

In another aspect, the propulsion units of the vehicle consist are controllably linked with each other in a distributed power system.

In another embodiment, a system (e.g., for controllably linking propulsion units) includes a control unit having a first communication interface and a first setup unit operably coupled with the first communication interface. The control unit is configured to be disposed onboard a first propulsion unit of a vehicle consist. The control unit is configured to operate in at least a first mode of operation, a different, second mode of operation, and a different, third mode of operation. When in the first mode of operation, the control unit is configured to transmit a first linking signal to a second propulsion unit in the vehicle consist. The first linking signal includes a first identity of the first propulsion unit for the first propulsion unit to control the second propulsion unit if the first identity corresponds to a first designated identity that is stored onboard the second propulsion unit. When in the second mode of operation, the control unit is configured to transmit a first de-linking signal to the second propulsion unit when the first propulsion unit is to be mechanically decoupled from the vehicle consist. The first de-linking signal includes a first replacement identity of a third propulsion unit that is to be mechanically coupled to the vehicle consist to replace the first propulsion unit, for the third propulsion unit to control the second propulsion unit if a second identity received by the second propulsion unit from the third propulsion unit in a second linking signal matches the first replacement identity. When in the third mode of operation, the control unit is configured to receive a third linking signal from the second propulsion unit, a second de-linking signal from the second propulsion unit, or a fourth linking signal from the third propulsion unit. When in the third mode of operation, the control unit also is configured to allow the second propulsion unit to control the first propulsion unit if a third identity in the third linking signal corresponds to a second designated identity stored onboard the first propulsion unit, or to allow the third propulsion unit to control the first propulsion unit if a fourth identity in the fourth linking signal corresponds to a second replacement identity received in the second de-linking signal from the second propulsion unit.

One or more embodiments of the inventive subject matter described herein provides for methods and systems for establishing communication links between propulsion-generating vehicles in a vehicle system that includes two or more of the propulsion-generating vehicles coupled with each other. For example, embodiments of the inventive subject matter may be used in connection with rail vehicles and rail vehicle consists, or other types of vehicles. In one aspect, remote propulsion-generating vehicles are configured to receive a wireless link command message from one or more lead propulsion-generating vehicles, as long as the link command message includes a remote vehicle identifier (e.g., a road number), or the identifier and name of the remote vehicle. The link command message optionally can include the orientation of the remote vehicle relative to the lead vehicle, such as facing the same direction or facing opposite directions. The lead vehicle can send (e.g., broadcast) a link command message that includes the remote vehicle identifiers of one or more remote vehicles that are to be included in the same vehicle consist as the lead vehicle. Optionally, this link command message can include the name of the vehicle consist and/or the orientation of the remote vehicle relative to the lead vehicle. Each of the remote vehicles that receive the link command message can examine the link command message to determine if the link command message includes a remote vehicle identifier that matches the identifier of the remote vehicle and/or a consist name that matches a designated consist name stored at the remote vehicle. If the identifiers and/or consist names match, then the remote vehicle may establish a communication link with the lead vehicle. For example, the remote vehicle may communicate a link reply message to the lead vehicle (to confirm receipt of the link command message) and begin accepting command messages from the lead vehicle that cause the remote vehicle to change operational settings (e.g., throttle settings, brake settings, etc.) where, prior to establishing the communication link, the remote vehicle would not accept and operate according to such command messages. The remote vehicle optionally may take the orientation included in the link command message and use this orientation to determine how to operate according to the command messages received from the lead vehicle.

In another embodiment, the remote vehicles may each be configured to store a lead vehicle identifier onboard the remote vehicles. This identifier can represent which of several different lead vehicles that the remote vehicle can receive command messages from and operate according to. The lead vehicle may then send (e.g., broadcast) a link command message that includes the lead vehicle identifier. This message may not include the consist name and/or the identifiers of the remote vehicles. Alternatively, the message may include the consist name and/or the identifier of one or more of the remote vehicles. Upon receipt of the command link message at the remote vehicles, the remote vehicles can communicate link reply messages to the lead vehicle to establish communication links with the lead vehicle. Establishing the communication links between the lead and remote vehicles according to one or more embodiments descried herein can reduce the amount of time needed to prepare the consist for travel by eliminating some travel of an operator to the remote vehicles to set the remote vehicles up for distributed power operations. Additionally, human error in setting up the vehicles can be reduced by reducing the number of times the operator has to input identifiers, consist names, or the like.

Figure 16:
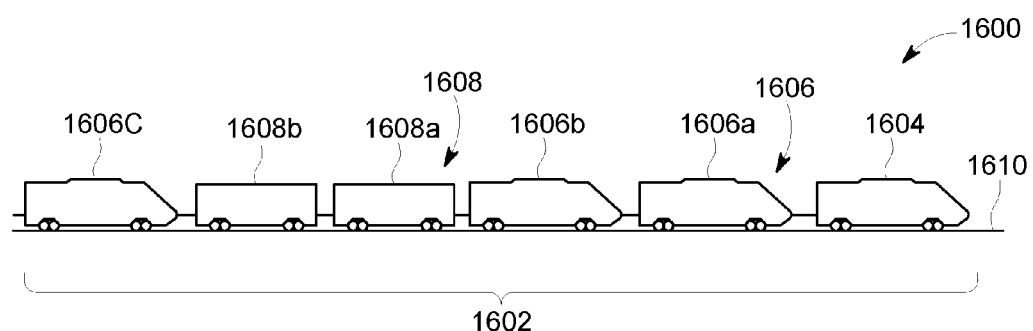
FIG. 16 is a schematic view of one embodiment of a communication system of a vehicle consist or vehicle system.

FIG. 16 is a schematic view of one embodiment of a communication system 1600 of a vehicle consist or vehicle system 1602. The illustrated vehicle consist 1602 includes propulsion-generating vehicles 1604, 1606 (e.g., vehicles 1604, 1606A, 1606B, 1606C) and non-propulsion-generating vehicles 1608 (e.g., vehicles 1608A, 1608B) mechanically coupled with each other. The propulsion-generating vehicles are capable of self-propulsion while the non-propulsion-generating vehicles are not capable of self-propulsion. The propulsion-generating vehicles 1604, 1606 are shown as locomotives, the non-propulsion-generating vehicles 1608 are shown as rail cars, and the vehicle consist 1602 is shown as a train in the illustrated embodiment. Alternatively, the vehicles 1604, 1606 may represent other vehicles, such as automobiles, marine vessels, or the like, and the vehicle consist 1602 can represent a grouping or coupling of these other vehicles. In one embodiment, the vehicles 1604, 1606 may not be mechanically coupled with each other. For example, the vehicles 1604, 1606 may be separate from each other, but may communicate with each other to coordinate operations of the vehicles 1604, 1606. For example, the vehicle 1604 may wirelessly communicate operational command messages to the vehicles 1606 that remotely control or direct operational settings of the vehicles 1606 so that the vehicles 1604, 1606 can remain designated distances from each other or otherwise travel together. The number and arrangement of the vehicles 1604, 1606 in the vehicle consist 1602 are provided as one example and are not intended as limitations on all embodiments of the inventive subject matter described herein.

The vehicles 1604, 1606 can be arranged in a distributed power (DP) arrangement. For example, the vehicles 1604, 1606 can include a lead vehicle 1604 that issues command messages to the other vehicles 1606A, 1606B, 1606C which are referred to herein as remote vehicles. The designations "lead" and "remote" are not intended to denote spatial locations of the vehicles 1604, 1606 in the vehicle consist 1602, but instead are used to indicate which vehicle 1604, 1606 is communicating (e.g., transmitting, broadcasting, or a combination of transmitting and broadcasting) operational command messages and which vehicles 1604, 1606 are being remotely controlled using the operational command messages. For example, the lead vehicle 1604 may or may not be disposed at the front end of the vehicle consist 1602 (e.g., along a direction of travel of the vehicle consist 1602). Additionally, the remote vehicles 1606A-C need not be separated from the lead vehicle 1604. For example, a remote vehicle 1606A-C may be directly coupled with the lead vehicle 1604 or may be separated from the lead vehicle 1604 by one or more other remote vehicles 1606A-C and/or vehicles 1608.

The operational command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 1604 issues the command messages to coordinate the tractive efforts and/or braking efforts provided by the vehicles 1604, 1606 to propel the vehicle consist 1602 along a route 1610, such as a track, road, waterway, or the like.

The operational command messages can be communicated using the communication system 1600, as described below. In one embodiment, the operational command messages are wirelessly communicated using the communication system 1600. Prior to communicating the operational command messages, the vehicles 1604, 1606 may need to be communicatively coupled with each other. For example, one or more communication links may need to be established between the vehicles 1604, 1606 before the vehicles 1606 will operate according to the operational command messages. A communication link may be established between the lead vehicle 1604 and the remote vehicle 1606 responsive to a link command message being communicated between the vehicles 1604, 1606 that correctly identifies the other of the vehicles 1604, 1606 (e.g., the message identifies the vehicle 1604, 1606 that is sending the message and/or the vehicle 1604, 1606 that is receiving the message) and the vehicle 1604, 1606 that receives the link command message communicating a reply link message to confirm receipt of the link command message.

The messages can identify the vehicles 1604, 1606 by a vehicle identifier. The vehicle identifier can represent a unique numeric and/or alphanumeric sequence or code that distinguishes one vehicle 1604, 1606 from other vehicles 1604, 1606. Alternatively, a vehicle identifier may identify two or more vehicles 1604, 1606 differently from one or more other vehicles 1604, 1606. For example, a vehicle identifier can represent a type of vehicle, a group of vehicles, or the like.

Optionally, the messages may identify vehicles 1604, 1606 by a consist name. A consist name can represent a unique numeric and/or alphanumeric sequence or code that distinguishes one vehicle consist 1602 from other vehicle consists 1602. For example, in a vehicle yard such as a rail yard, several vehicle consists 1602 may be relatively close to each other such that the vehicles 1604, 1606 in the different vehicle consists 1602 can wirelessly communicate with each other. To prevent the vehicles 1604, 1606 in one vehicle consist 1602 from mistakenly communicating with a vehicle 1604, 1606 in another vehicle consist 1602 (e.g., such as by operating according to operational command messages from another vehicle consist 1602), the messages optionally may include a consist name to identify which vehicle consist 1602 that the messages are associated with.

Figure 17:
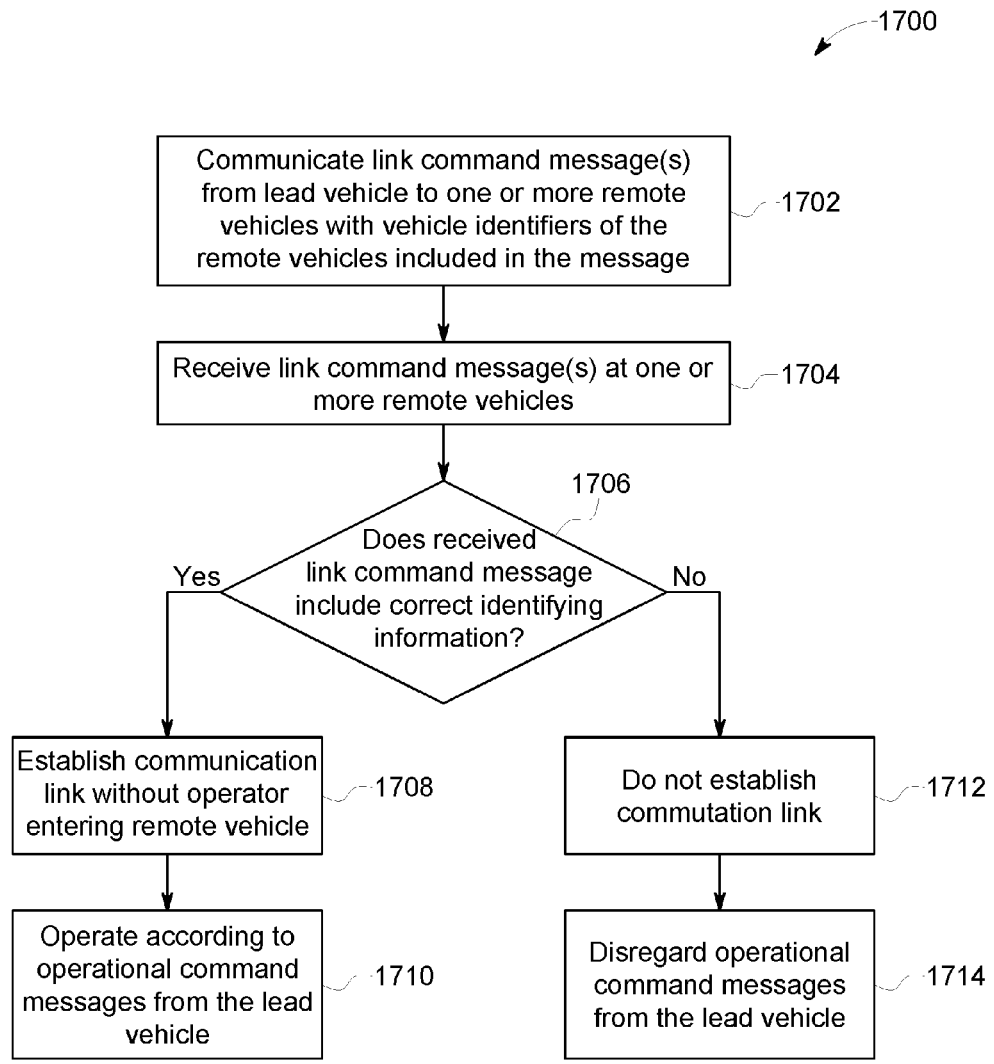
FIG. 17 illustrates a flowchart of one embodiment of a method for communicatively coupling vehicles in the vehicle consist shown in FIG. 16.

FIG. 17 illustrates a flowchart of one embodiment of a method 1700 for communicatively coupling vehicles 1604, 1606 in the vehicle consist shown in FIG. 16. The method 1700 may be used to establish communication links between the vehicles 1604, 1606 so that the lead vehicle 1604 can coordinate tractive efforts and/or braking efforts provided by the vehicles 1606. For example, the method 1700 may be used to set up the vehicles 1604, 1606 to operate in a distributed power (DP) mode. The method 1700 can be used to establish the communication links between the vehicles 1604, 1606 without an operator having to travel to and/or board the remote vehicles 1606.

At 1702, one or more link command messages are communicated to the remote vehicles 1606. The link command message(s) may be broadcast from the lead vehicle 1604 to the remote vehicles 1606. Alternatively, the link command message(s) may be communicated from another source, such as a tower, a dispatch center, a remote control device (e.g., an operator control unit), or the like. The link command message(s) can be wirelessly transmitted and/or broadcast. Prior to communicating the link command message(s), the vehicles 1604, 1606 may not be communicatively coupled. For example, the vehicles 1606 may not be set up to operate according to operational command messages received from the lead vehicle 1604.

The link command message(s) include a vehicle identifier of one or more of the remote vehicles 1606. For example, the link command message(s) can include unique identifiers of the plural remote vehicles 1606 that are to be included in the vehicle consist 1602. Alternatively, each of the link command messages can include a single vehicle identifier of a single remote vehicle 1606 that is to be included in the vehicle consist 1602. Several link command messages may be sent with each link command message identifying another remote vehicle 1606 so that several remote vehicles 1606.

In one embodiment, the link command message(s) can include a vehicle consist identifier. For example, the link command message(s) can include the vehicle identifiers of the remote consists 1606 that are to be communicatively linked with the lead vehicle 1604 and the vehicle consist identifier of the vehicle consist 1602 that will include the vehicles 1604, 1606. Alternatively, the link command message(s) may include the vehicle consist identifier and not the vehicle identifiers of the remote vehicles 1606.

At 1704, the link command message(s) are received at the remote vehicles 1606. In one aspect, the link command message(s) may be received by the remote vehicles 1606 that are to be included in the vehicle consist 1602 and one or more other remote vehicles that are not to be included in the vehicle consist 1602. For example, due to the close proximity between several vehicle consists 1602, the remote vehicles 1606 in one or more other vehicle consists may receive the link command message(s) for the vehicle consist 1602 shown in FIG. 16. Thus, both the remote vehicles 1606 in the vehicle consist 1602 and the remote vehicles 1606 that are not in the vehicle consist 1602 may wirelessly receive the link command message(s). Alternatively, the link command message may only be received by the remote vehicles 1606 that are in the vehicle consist 1602.

At 1706, the link command message is examined to determine if the link command message includes correct identifying information. For example, in response to receiving the link command message at a remote vehicle 1606, the remote vehicle 1606 can parse the link command message to determine if the link command message includes one or more types of identifying information that identifies the remote vehicle 1606 and/or the vehicle consist 1602. The vehicle identifiers and/or consist identifiers can be stored onboard the remote vehicles 1606, such as in memories, control units, or the like, of the remote vehicles 1606.

If the link command message includes the correct identifying information, then the remote vehicle 1606 can determine that the remote vehicle 1606 can communicatively link with the lead vehicle 1604 to receive operational command messages from the lead vehicle 1604. Thus, flow of the method 1700 can proceed to 1708. On the other hand, if the link command message does not include the correct identifying information, then the remote vehicle 1606 can determine that the remote vehicle 1606 cannot communicatively link with the lead vehicle 1604 to receive operational command messages from the lead vehicle 1604. Thus, flow of the method 1700 can proceed to 1716. The determination performed at 1706 can be performed onboard each of the remote vehicles 1606 without an operator being onboard the remote vehicles 1606.

In one aspect, the identifying information in the link command message is correct when the link command message includes the vehicle identifier of the remote vehicle 1606 and the consist identifier stored onboard the remote vehicle 1606. For example, if the link command message includes one or more vehicle identifiers, and at least one of the vehicle identifiers matches or otherwise corresponds to the vehicle identifier of the remote vehicle 1606 that received the link command message, then the link command message includes the correct vehicle identifier for that remote vehicle 1606. If the link command message includes a consist identifier that matches or otherwise corresponds to a consist identifier stored onboard the remote vehicle 1606, then the link command message includes the correct consist identifier for that remote vehicle 1606. If either the vehicle identifier or the consist identifier in the link command message does not match or otherwise correspond to the vehicle identifier of the remote vehicle 1606 or the consist identifier stored onboard the remote vehicle 1606 that receives the link command message, then the identifying information in the link command message is not correct. Alternatively, the identifying information may be correct if the link command message includes the vehicle identifier of the remote vehicle 1606. For example, the link command message may not include the consist identifier of the vehicle consist 1602.

The link command message optionally can include an orientation identification of the remote vehicle 1606. The orientation identification indicates the orientation of the remote vehicle 1606 relative to the lead vehicle 1604. For example, the vehicles 1604, 1606 may be facing different directions, which can be referred to as "short hood forward," "long hood forward," forward, backward, or the like. Depending on whether the remote vehicle 1606 that is to be communicatively linked with the lead vehicle 1604 is facing the same or opposite direction of the lead vehicle 1604, operational settings that are communicated to the remote vehicle 1606 by operational command messages from the lead vehicle 1604 may be implemented differently. For example, the direction in which the remote vehicle 1606 is to rotate wheels of the remote vehicle 1606 may change based on whether the remote vehicle 1606 is facing the same or opposite direction of the lead vehicle 1604 to avoid stretching or compressing the vehicle consist 1602. The link command message can include the orientation of the remote vehicle 1606 relative to the lead vehicle 1602 so that an operator does not need to travel to the remote vehicle 1606 and manually provide this information onboard the remote vehicle 1606.

At 1708, a communication link between the remote vehicle 1606 and the lead vehicle 1604 is established. As described above, because the link command message includes the correct identifying information, the remote vehicle 1606 that received and examined the identifying information can be communicatively linked with the lead vehicle 1604 to be remotely controlled by the lead vehicle 1604 without an operator having to travel to and go onboard the remote vehicle 1606. The examination of the link command message and the establishment of the communication link at 1706 and 1708 can be performed for each of the remote vehicles 1606 (or at least one or more of the remote vehicles 1606) that is included in the vehicle consist 1602.

At 1710, the remote vehicle 1606 that is communicatively linked with the lead vehicle 1604 operates according to operational command messages communicated from the lead vehicle 1604. For example, the lead vehicle 1604 may broadcast operational command messages that include operational settings (e.g., throttle settings, brake settings, or the like) for the remote vehicles 1606 in the vehicle consist 1602. The operational command messages may be received by remote vehicles 1606 that are included in the vehicle consist 1602 and by other remote vehicles that are not included in the vehicle consist 1602. The remote vehicles 1606 that are in the vehicle consist 1602 are communicatively linked with the lead vehicle 1604 and use the operational settings in the received operational command messages to control movement of the remote vehicles 1606. The remote vehicles that are not in the vehicle consist 1602 are not communicatively linked with the lead vehicle 1604 and disregard the operational command messages.

In one embodiment, an operator onboard the lead vehicle 1604 may initiate a test message to verify that the remote vehicles 1606 are communicatively linked with the lead vehicle 1604 prior to the lead vehicle 1604 remotely controlling movement of the remote vehicles 1606. For example, the lead vehicle 1604 may reduce fluid pressure in a brake system of the vehicle system (e.g., reduce the air pressure in an air brake pipe). This reduction in fluid can propagate through one or more conduits to the brake pipes in the remote vehicles 1606. The remote vehicles 1606 can communicate the reduction in pressure in the brake pipes and/or the rate at which fluid (e.g., air) is flowing through the brake pipes to the lead vehicle 1604. The lead vehicle 1604 can use the communicated reduction in pressure and/or airflow from the remote vehicles 1606 as confirmation that the remote vehicles 1606 are communicatively linked with the lead vehicle 1604. If no such reduction in pressure and/or airflow from a remote vehicle 1606 is received at the lead vehicle 1604, then the lead vehicle 1604 can determine that the remote vehicle 1606 is not communicatively linked with the lead vehicle 1604. Alternatively, the test message may be initiated automatically (e.g., without operator action). For example, following an attempted linking of the lead and remote vehicles, the control unit 1502 and/or communication unit 1510 can automatically direct the brake system to reduce the fluid pressure as the test message.

Returning to the description of the determination made at 1706, if the link command message does not include the correct identifying information, then flow of the method 1700 proceeds to 1716. At 1716, a communication link is not established between the remote vehicle (that received the link command message having the incorrect identifying information) and the lead vehicle 1604. For example, because the remote vehicle is not in the vehicle consist 1602, the remote vehicle may have a different vehicle identifier and/or consist identifier that does not match the identifying information in the link command message. Thus, the remote vehicle 1606 is not communicatively linked with the lead vehicle 1604.

At 1714, the remote vehicle disregards operational command messages received from the lead vehicle 1604. For example, because the link command message did not include identifying information that corresponded to the remote vehicle, the remote vehicle disregards operational command messages received from the lead vehicle 1604.

As described herein, the method 1700 may be used to establish communication links between the vehicles 1604, 1606 in the vehicle consist 1602 without an operator having to travel to and board the remote vehicles 1606. In another embodiment, however, the vehicles 1604, 1606 can be communicatively linked with a process that involves the operator traveling to the remote vehicles 1606. The method 1700 can save time in setting up the vehicle consist 1602 by potentially eliminating the need for an operator to travel to and board the remote vehicles 1606 to set up the remote vehicles 1606 for DP operations. Additionally, the method 1700 can reduce human error by reducing the number of times that the operator has to enter the identifying information into control units, memories, or the like, of the vehicles 1604, 1606. Human error of this type can result in communication link failures and additional time required to diagnose the failures and then to properly set up the vehicles 1604, 1606.

Figure 18:
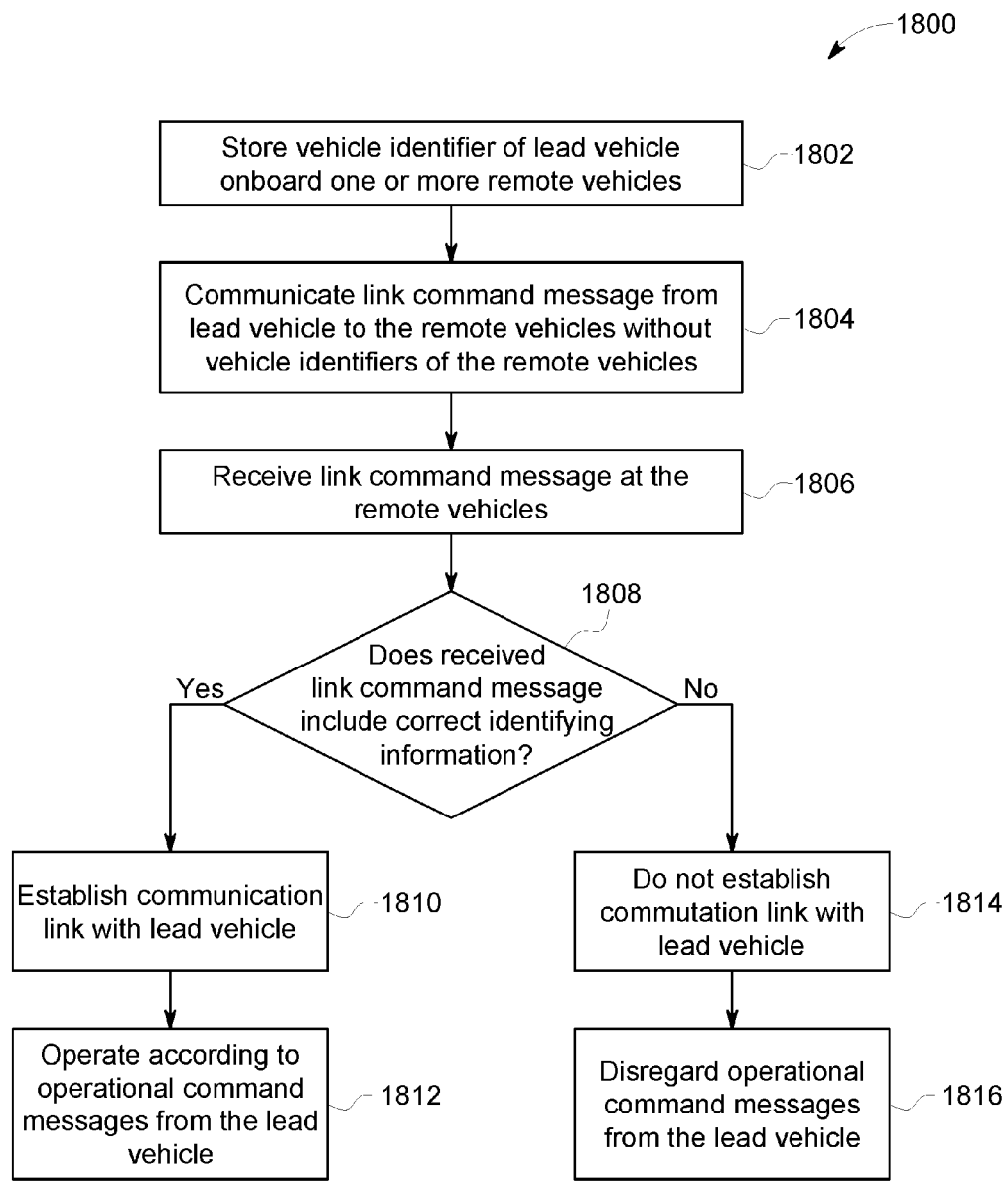
FIG. 18 illustrates a flowchart of another embodiment of a method for communicatively coupling vehicles in the vehicle consist shown in FIG. 16.

FIG. 18 illustrates a flowchart of another embodiment of a method 1800 for communicatively coupling vehicles 1604, 1606 in the vehicle consist 1602 shown in FIG. 16. The method 1800 may be used to establish communication links between the vehicles 1604, 1606 so that the lead vehicle 1604 can coordinate tractive efforts and/or braking efforts provided by the vehicles 1606. For example, the method 1800 may be used to set up the vehicles 1604, 1606 to operate in the DP mode.

At 1802, a vehicle identifier of the lead vehicle 1604 is provided to one or more (or all) of the remote vehicles 1606. For example, an operator can travel to and go onboard the remote vehicles 1606 and input the vehicle identifier of the lead vehicle 1604 into control units, memories, or the like, of the remote vehicles 1606. The remote vehicles 1606 can store the vehicle identifier in the onboard memories, control units, or the like. Alternatively, the vehicle identifier of the lead vehicle 1604 may be communicated to the remote vehicles 1606, such as by communicating the vehicle identifier via, over, through, or otherwise using one or more conductive pathways that connect the lead vehicle 1604 and the remote vehicles 1606 (e.g., a multiple unit cable, train line, brake line, or other cable or bus) or wirelessly communicating the vehicle identifier. The vehicle identifier of the lead vehicle 1604 that is provided to the remote vehicle 1606 can be referred to as a stored vehicle identifier, a designated vehicle identifier, a lead vehicle identifier, or the like. Optionally, the vehicle identifier may be automatically communicated to the remote vehicles 1606, such as by the control unit and/or communication unit sending the vehicle identifiers without any action on the part of the operator.

At 1804, a link command message is communicated to the remote vehicles 1606. The link command message may be broadcast from the lead vehicle 1604 to the remote vehicles 1606. Alternatively, the link command message may be communicated from another source, such as a tower, a dispatch center, a remote control device (e.g., an operator control unit), or the like. The link command message can be wirelessly transmitted and/or broadcast. Prior to communicating the link command message, the vehicles 1604, 1606 may not be communicatively coupled. For example, the vehicles 1606 may not be set up to operate according to operational command messages received from the lead vehicle 1604. The link command message includes the vehicle identifier of the lead vehicle 1604. For example, in contrast to the link command message communicated at 1702 in the flowchart of the method 1700 shown in FIG. 17, the link command message that is communicated to the remote vehicles 1606 at 1404 may include the vehicle identifier of the lead vehicle 1604, but not of the remote vehicles 1606.

At 1806, the link command message is received at the remote vehicles 1606. As described above, the link command message may be received by the remote vehicles 1606 that are to be included in the vehicle consist 1602 and one or more other remote vehicles that are not to be included in the vehicle consist 1602.

At 1808, the link command message is examined to determine if the link command message includes correct identifying information. For example, in response to receiving the link command message at a remote vehicle 1606, the remote vehicle 1606 can parse the link command message to determine if the link command message includes the vehicle identifier of the lead vehicle 1604. The vehicle identifier that is included in and/or received at the remote vehicle 1606 via the link command message may be referred to as a received vehicle identifier.

The remote vehicle 1606 can compare the received vehicle identifier from the link command message with the stored vehicle identifier that previously was provided to the remote vehicle 1606 at 1802. If the received vehicle identifier and the stored vehicle identifier represent the same lead vehicle 1604, then the remote vehicle 1606 can determine that the remote vehicle 1606 can communicatively link with the lead vehicle 1604 to receive operational command messages from the lead vehicle 1604. As a result, flow of the method 1800 can proceed to 1810. On the other hand, if the received vehicle identifier does not match the stored vehicle identifier, then the remote vehicle 1606 can determine that the remote vehicle 1606 cannot communicatively link with the lead vehicle 1604 to receive operational command messages from the lead vehicle 1604. Thus, flow of the method 1800 can proceed to 1814. The determination performed at 1808 can be performed onboard each of the remote vehicles 1606 without an operator being onboard the remote vehicles 1606. For example, after the stored vehicle identifier is provided to the remote vehicles 1606, the operator can return to the lead vehicle 1604 to cause the lead vehicle 1604 to communicate the link command message while the operator remains onboard the lead vehicle 1604 and/or does not go back onboard one or more of the remote vehicles 1606.

At 1810, a communication link between the remote vehicle 1606 and the lead vehicle 1604 is established. The examination of the link command message and the establishment of the communication link at 1808 and 1810 can be performed for each of the remote vehicles 1606 (or at least one or more of the remote vehicles 1606) that is included in the vehicle consist 1602. At 1416, the remote vehicle 1606 that is communicatively linked with the lead vehicle 1604 operates according to operational command messages communicated from the lead vehicle 1604. For example, the lead vehicle 1604 may broadcast operational command messages that include operational settings (e.g., throttle settings, brake settings, or the like) for the remote vehicles 1606 in the vehicle consist 1602. The operational command messages may be received by remote vehicles 1606 that are included in the vehicle consist 1602 and by other remote vehicles that are not included in the vehicle consist 1602. The remote vehicles 1606 that are in the vehicle consist 1602 are communicatively linked with the lead vehicle 1604 and use the operational settings in the received operational command messages to control movement of the remote vehicles 1606. The remote vehicles that are not in the vehicle consist 1602 are not communicatively linked with the lead vehicle 1604 and disregard the operational command messages.

In one embodiment, an operator onboard the lead vehicle 1604 may initiate a test message to verify that the remote vehicles 1606 are communicatively linked with the lead vehicle 1604 prior to the lead vehicle 1604 remotely controlling movement of the remote vehicles 1606. For example, the lead vehicle 1604 may reduce fluid pressure in a brake system of the vehicle system (e.g., reduce the air pressure in an air brake pipe). This reduction in fluid can propagate through one or more conduits to the brake pipes in the remote vehicles 1606. The remote vehicles 1606 can communicate the reduction in pressure in the brake pipes and/or the rate at which fluid (e.g., air) is flowing through the brake pipes to the lead vehicle 1604. The lead vehicle 1604 can use the communicated reduction in pressure and/or airflow from the remote vehicles 1606 as confirmation that the remote vehicles 1606 are communicatively linked with the lead vehicle 1604. If no such reduction in pressure and/or airflow from a remote vehicle 1606 is received at the lead vehicle 1604, then the lead vehicle 1604 can determine that the remote vehicle 1606 is not communicatively linked with the lead vehicle 1604. Alternatively, the test message may be initiated automatically, as described herein.

Returning to the description of the determination made at 1808, if the received vehicle identifier and the stored vehicle identifier do not represent the lead vehicle 1604 (e.g., if the received vehicle identifier does not match or otherwise correspond with the stored vehicle identifier), then flow of the method 1800 proceeds to 1814. At 1814, a communication link is not established between the remote vehicle (that received the link command message having the received vehicle identifier that does not match or otherwise correspond with the stored vehicle identifier) and the lead vehicle 1604. For example, because the remote vehicle is not in the vehicle consist 1602, the remote vehicle may have a different stored vehicle identifier than the vehicle identifier in the link command message. As a result, the remote vehicle 1606 is not communicatively linked with the lead vehicle 1604.

At 1816, the remote vehicle disregards operational command messages received from the lead vehicle 1604. For example, because the link command message did not include the vehicle identifier that matches the stored vehicle identifier, the remote vehicle disregards operational command messages received from the lead vehicle 1604.

As described herein, the method 1800 can reduce human error by reducing the number of times that the operator has to enter the identifying information into control units, memories, or the like, of the vehicles 1604, 1606. Human error of this type can result in communication link failures and additional time required to diagnose the failures and then to properly set up the vehicles 1604, 1606.

Figure 19:
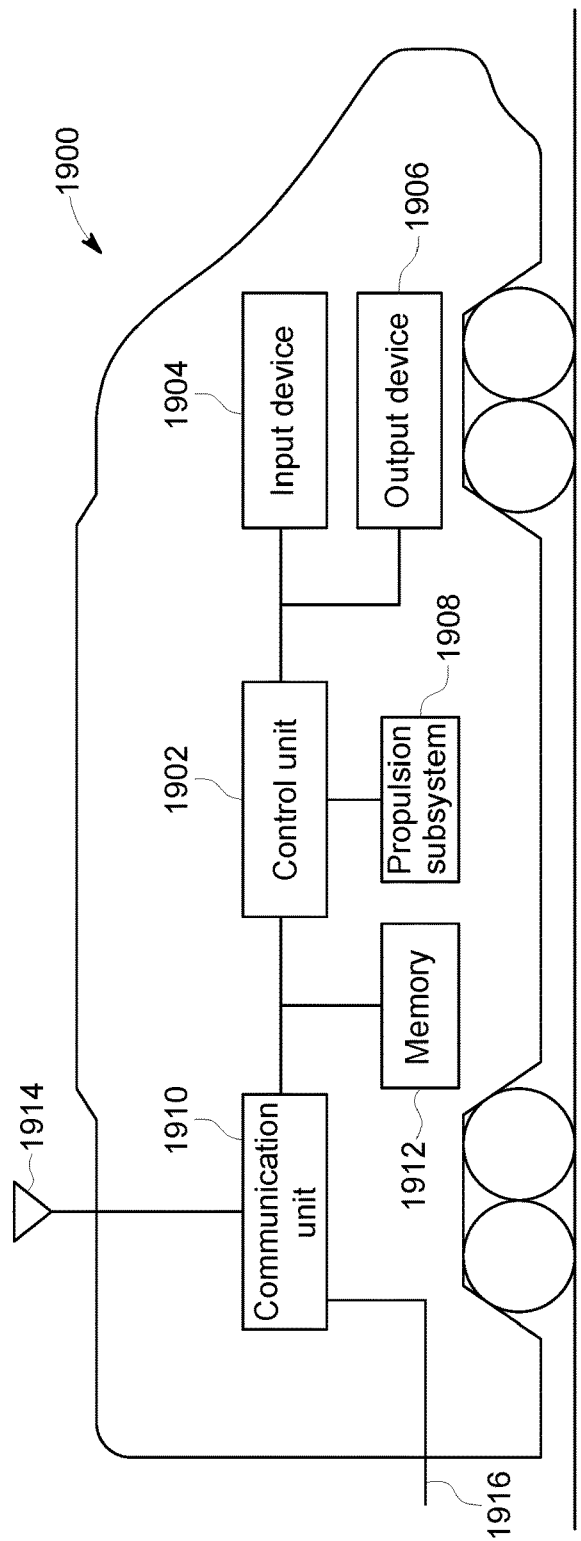
FIG. 19 is a schematic diagram of a propulsion-generating vehicle in accordance with one embodiment.

FIG. 19 is a schematic diagram of a propulsion-generating vehicle 1900 in accordance with one embodiment. The vehicle 1900 may represent one or more of the vehicles 1604, 1606 shown in FIG. 16. The vehicle 1900 includes a communication system that includes a control unit 1902 that controls operations of the vehicle 1900. The control unit 1902 can include or represent one or more hardware circuits or circuitry that include, are connected with, or that both include and are connected with one or more processors, controllers, or other hardware logic-based devices. The control unit 1902 is connected with an input device 1904 and an output device 1906. The control unit 1902 can receive manual input from an operator of the powered vehicle 1900 through the input device 1904, such as a touchscreen, keyboard, electronic mouse, microphone, or the like. For example, the control unit 1902 can receive manually input changes to the tractive effort, braking effort, speed, power output, and the like, from the input device 1904. The control unit 1902 can present information to the operator using the output device 1906, which can represent a display screen (e.g., touchscreen or other screen), speakers, printer, or the like. The control unit 1902 can be used by an operator to input information into the vehicle 1900, such as identifying information (e.g., stored vehicle identifiers, consist identifiers, orientations, or the like).

The control unit 1902 can compare identifying information received via a link command message with identifying information stored onboard the vehicle 1900 (e.g., in a memory 1912 described below). For example, in a remote vehicle 1606, the control unit 1902 can compare a vehicle identifier received in a link command message with the vehicle identifier of the remote vehicle 1606 to determine if the remote vehicle 1606 can communicatively link with the lead vehicle 1606. As another example, the control unit 1902 can compare a consist identifier received in a link command message with the consist identifier stored in the remote vehicle 1606 to determine if the remote vehicle 1606 can communicatively link with the lead vehicle 1606. As another example, the control unit 1902 can compare a vehicle identifier received in a link command message with the stored vehicle identifier of the lead vehicle 1606 that is stored onboard the remote vehicle 1606 to determine if the remote vehicle 1606 can communicatively link with the lead vehicle 1606.

If the identifying information matches the information stored onboard the remote vehicle (as described above), the control unit 1902 can establish a communication link with the lead vehicle 1606. For example, the control unit 1902 can begin receiving and operating according to operational command messages received from the lead vehicle 1604 via the communication unit 1910.

The control unit 1902 is connected with a propulsion subsystem 1908 of the powered vehicle 1900. The propulsion subsystem 1908 provides tractive effort and/or braking effort of the powered vehicle 1900. The propulsion subsystem 1908 may include or represent one or more engines, motors, alternators, generators, brakes, batteries, turbines, and the like, that operate to propel the powered vehicle 1900 under the manual or autonomous control that is implemented by the control unit 1900. For example, the control unit 1900 can generate control messages autonomously or based on manual input that is used to direct operations of the propulsion subsystem 1908.

The control unit 1902 also is connected with the communication unit 1910 and the memory 1912 of the communication system in the powered vehicle 1900. The memory 1912 can represent an onboard device that electronically and/or magnetically stores data. For example, the memory 1912 may represent a computer hard drive, random access memory, read-only memory, dynamic random access memory, an optical drive, or the like.

The communication unit 1910 includes or represents hardware and/or software that is used to communicate with other vehicles 1900 in the vehicle consist 1602. For example, the communication unit 1910 may include a transceiver 1914 and associated circuitry for wirelessly communicating (e.g., communicating and/or receiving) command messages described above. Additionally or alternatively, the communication unit 1910 include circuitry for communicating messages over a wired connection 1916, such as a multiple unit (eMU) line of the vehicle consist 1602 or another conductive pathway between or among the powered vehicles 1604, 1606, 1900 in the vehicle consist 1602. The control unit 1902 may control the communication unit 1910 by activating the communication unit 1910 (as described above). The communication unit 1910 can examine the messages that are received by the powered unit 1900 as described above. For example, the communication unit 1910 of a remote vehicle 1606 can examine received command messages to determine the directive sent by the lead vehicle 1604. The directive can be conveyed to the control unit 1902, which then implements the directive by creating control messages that are communicated to the propulsion subsystem 1908 for autonomous control or by presenting the directive to the operator on the output device 1906 for manual implementation of the directive. The communication unit 1910 can examine received messages sent by other vehicles 1604, 1606 to determine the identifying information in the messages. The communication unit 1910 can store the received vehicle identifiers and other information and statuses in the memory 1912.

In one embodiment, a method (e.g., for establishing a communication link between vehicles) includes receiving a link command message at a first remote vehicle in a vehicle consist having a lead vehicle and at least the first remote vehicle. The link command message can include identifying information representative of at least one of a designated vehicle consist and/or one or more designated remote vehicles. The method also can include comparing, onboard the first remote vehicle, the identifying information of the link command message with one or more of a stored consist identifier or a stored vehicle identifier stored onboard the first remote vehicle and establishing a communication link between the lead vehicle and the first remote vehicle responsive to the identifying information of the link command message matching the one or more of the stored consist identifier or the stored vehicle identifier.

In one aspect, the identifying information can include one or more of a unique vehicle identifier of the first remote vehicle or a unique consist identifier of the vehicle consist.

In one aspect, the identifying information in the link command message can include both the vehicle identifier and the consist identifier. The communication link can be established responsive to both the vehicle identifier in the link command message matching the stored vehicle identifier and the consist identifier matching the stored consist identifier.

In one aspect, the method also can include controlling movement of the first remote vehicle based on an operational command message received at the first remote vehicle from the lead vehicle over the communication link that is established where, prior to establishing the communication link, the first remote vehicle disregards the operational command message received from the lead vehicle.

In one aspect, the link command message also can include an orientation identification of the first remote vehicle relative to the lead vehicle.

In one aspect, the vehicle consist can include the lead vehicle and the at least the first remote vehicle mechanically separate from each other during remote control of movement of the at least the first remote vehicle by the lead vehicle.

In one aspect, the link command message can be communicated from the lead vehicle.

In another embodiment, a system (e.g., a communication system) includes a remote communication unit and a control unit. The remote communication unit can be configured to receive a link command message at a first remote vehicle in a vehicle consist having a lead vehicle and at least the first remote vehicle. The link command message can include identifying information representative of at least one of a designated vehicle consist and/or one or more designated remote vehicles. The control unit can be configured to be disposed onboard the first remote vehicle and to compare the identifying information of the link command message with one or more of a stored consist identifier and/or a stored vehicle identifier stored onboard the first remote vehicle. The control unit also can be configured to establish a communication link between the lead vehicle and the first remote vehicle responsive to the identifying information of the link command message matching the one or more of the stored consist identifier or the stored vehicle identifier.

In one aspect, the identifying information can include one or more of a unique vehicle identifier of the first remote vehicle or a unique consist identifier of the vehicle consist.

In one aspect, the identifying information in the link command message can include both the vehicle identifier and the consist identifier. The control unit can be configured to establish the communication link responsive to both the vehicle identifier in the link command message matching the stored vehicle identifier and the consist identifier matching the stored consist identifier.

In one aspect, the control unit can be configured to control movement of the first remote vehicle based on an operational command message received at the first remote vehicle from the lead vehicle over the communication link. Prior to establishing the communication link, the control unit can disregard the operational command message received from the lead vehicle.

In one aspect, the link command message also can include an orientation identification of the first remote vehicle relative to the lead vehicle.

In one aspect, the vehicle consist can include the lead vehicle and the at least the first remote vehicle mechanically separate from each other during remote control of movement of the at least the first remote by the lead vehicle.

In one aspect, the communication unit can be configured to receive the link command message from the lead vehicle.

In another embodiment, a system (e.g., a communication system) includes a control unit and a remote communication unit. The control unit can be configured to be disposed onboard a remote vehicle in a vehicle consist having a first lead vehicle and at least the remote vehicle. The control unit also can be configured to obtain a lead vehicle identifier representative of the first lead vehicle. The remote communication unit can be configured to be disposed onboard the remote vehicle and to receive a link command message that includes identifying information representative of a designated lead vehicle. The control unit can be configured to compare the identifying information of the link command message with the lead vehicle identifier and to establish a communication link between the first lead vehicle and the remote vehicle responsive to the identifying information of the link command message matching the lead vehicle identifier.

In one aspect, the lead vehicle identifier can be a unique vehicle identifier of the first lead vehicle.

In one aspect, the control unit can be configured to control movement of the remote vehicle based on an operational command message received at the remote vehicle from the first lead vehicle over the communication link that is established. Prior to establishing the communication link, the control unit can be configured to disregard the operational command message received from the first lead vehicle.

In one aspect, the link command message also can include an orientation identification of the remote vehicle relative to the first lead vehicle.

In one aspect, the vehicle consist can include the first lead vehicle and the at least the remote vehicle mechanically coupled with each other.

In another embodiment, a system (e.g., a communication system) includes a communication unit and a control unit. The communication unit can be configured to be disposed on one of onboard a lead vehicle of a vehicle consist having the lead vehicle and plural remote vehicles or off-board the vehicle consist. The control unit can be configured to be disposed on said one of onboard the lead vehicle or off-board the vehicle consist and to control the communication unit to transmit plural link command messages to the plural remote vehicles. Each of the link command messages can include identifying information representative of at least one of a designated vehicle consist and/or one or more designated remote vehicles. The control unit also can be configured to automatically establish one or more communication links with the remote vehicles responsive to the identifying information in the link command messages matching one or more of a stored consist identifier and/or a stored vehicle identifier stored onboard the remote vehicles.

Additional embodiments of the subject matter described herein relate to determining the order of vehicles in a system, for example, autonomously determining the order of propulsion-generating units in a vehicle consist.

One or more embodiments of the inventive subject matter described herein relate to methods and systems for communicating data in a vehicle system. The vehicle system may include a plurality of vehicles that are mechanically coupled or linked together (directly or indirectly) and communicatively coupled to each other. Each of the vehicles may have a corresponding vehicle network. One or more characteristics of messages sent between particular vehicles of the vehicle system may be measured or otherwise identified and used to determine distance information for various vehicle pairs throughout the consist (e.g., information corresponding to distance between two vehicles). The distance information may then be used to determine the order of the vehicles along a length of the consist.

Multiple unit (MU) cable connections between powered rail vehicles may carry signals for throttle, dynamic brake, direction, and the like. Particular vehicles may include identification numbers or labels that may be used to communicate specific individual messages to a corresponding desired vehicle. However, such communication systems may not include ordering information identifying the position of the particular vehicle within a consist. For example, a message may be communicated for receipt by a particular target vehicle (e.g., by overlaying a digital MU path over one or more wires of a MU cable, such as Ethernet over MU (eMU)) that provides for messages to be specific for a given vehicle.

A vehicle system may include one or more powered vehicles (or powered units) and one or more non-powered vehicles (or non-powered units). In certain embodiments, the vehicle system is a rail vehicle system that includes one or more locomotives and, optionally, one or more rail cars. In other embodiments, however, the vehicle system may include non-rail type vehicles, including off-highway vehicles (e.g., vehicles that are not designed or allowed by law or regulation to travel on public roads, highways, and the like), automobiles, marine vessels, and the like. In some cases, at least a plurality of the vehicles in a vehicle system may each include a separate vehicle network.

The data communicated between the vehicles may be network data. In some embodiments, "network data" includes data packets that are configured in a designated packet format. For example, data may be packaged into a data packet that includes a set of data bits that are arranged to form a control portion and a payload portion. The control portion of the data bits may correspond to addresses (e.g., source, destination), error detection codes (e.g., checksums), and sequencing information (e.g., timing information). The control portion may be found in packet headers and trailers of the corresponding data packet. The payload portion of the data bits may correspond to the information that was requested and/or is used by the vehicle system for a designated purpose, such as for making operational decisions and/or for controlling operations (e.g., tractive efforts, braking efforts, and the like) of the vehicle system. The payload portion may include operating data. Operating data may include different types of data from various components of a vehicle system that are used to control operation of the vehicle system. For example, the operating data may include information from sensors that indicates a performance level or state of a component of the vehicle system. For instance, fuel sensors may be configured to transmit signals that are indicative of a current fuel level or current fuel efficiency. In rail vehicle systems, sensors coupled to the engine or motors may transmit data that indicates a notch (or throttle) level of the rail vehicle system. Sensors may also be coupled to various elements of mechanical systems (e.g., motors, engines, braking systems) and transmit signals indicating when a corresponding element is properly operating or has failed. Operating data may also include information from data radios and global positioning system (GPS) units. GPS units may transmit information describing or indicating a position of the vehicle system. Data radios may transmit information regarding one or more different vehicles of the vehicle system. In various embodiments, the payload portion may be configured (e.g., sized) to determine a message characteristic, such as a rate of communication between two vehicles of a consist. In some embodiments, the payload portion of a packet may not include operating information, but instead be used solely for determining a communication characteristic, such as a rate of communication.

With respect to the network data, the data packets may be packaged and communicated in accordance with a designated communications protocol. The designated communications protocol may include predetermined rules and formats for exchanging data packets between nodes or computing systems. Various communications protocols may be used for embodiments described herein including, but not limited to, an industry standard communications protocol, a proprietary communications protocol, and/or an open-source or publicly available communications protocol. In some embodiments, the data packets are packaged and communicated according to an Internet-layer type protocol for packet-switched internetworking. For example, the data packets may be packaged and communicated in accordance with Internet Protocol version 6 (IPv6) or in accordance with Internet Protocol version 4 (IPv4). Alternatively or additionally, the data packets may be packaged and/or communicated in accordance with another IP protocol version or another protocol. Network data may be generally configured for the Internet protocol suite, which may be referred to as TCP/IP due to the Internet protocol suite including the Transmission Control Protocol (TCP) and Internet Protocol (IP). Network data may also be configured according to the Session Initiated Protocol (SIP). Other communications protocols, however, exist and may be used by alternative embodiments.

At least one technical effect of various embodiments described herein may include improved tailoring of commands for individual vehicles of a consist. For example, the use of ordering information may be used to tailor commands based on the position of a vehicle within a consist. Another technical effect may include improved redundancy or robustness of information collection or sensing. For example, the use of ordering information may be used to identify vehicles particularly well suited to supplement or replace information collected onboard a given vehicle, such as vehicles that are adjacent or nearby the given vehicle. Another technical effect may include providing a convenient technique for retro-fitting existing vehicles to determine vehicle ordering information.

In embodiments of the present inventive subject matter, message communication characteristics may be determined for paths or tunnels communicatively connecting vehicle pairs of a consist. In some embodiments, a rate of communication may be determined for communications between each pair of vehicles in a consist. For example, for a consist including vehicles A, B, and C, communication rates may be determined for each pairing (e.g., a first communication rate between vehicles A and B, a second communication rate between vehicles A and C, a third communication rate between vehicles B and C). In some embodiments, rates may be determined in both directions (e.g., a rate for communications directed to determine, at the first vehicle and a separately determined rate for communications from B to A). The message characteristic information may then be compared to determine distances between particular vehicles, and used, in combination with information identifying the forward most vehicle of the consist, to determine an order of vehicles in the consist.

In some embodiments, to address potential uncertainty due to transient fluctuations in one or more communication rates, average communication rates (or other message characteristic information) may be determined. Additionally or alternatively, message characteristic information may be determined using messages sent substantially simultaneously (e.g., messages sent at or near the same point in time or over essentially the same period of time) or concurrently (e.g., messages sent over overlapping time periods). In some embodiments, plural vehicles of a consist may determine ordering information (e.g., information describing, depicting or corresponding to an order of vehicles or to distances of vehicles relative to the vehicle at which the determination is made), and communicate the determined ordering information to a lead or otherwise designated vehicle, with the lead or otherwise designated vehicle using the information provided by the other vehicles to determine an overall order of vehicles in the consist. In some embodiments, the order determination described herein may be used as an initial determination of order. In some embodiments, the order determination may be used to check, confirm, or correct an order previously specified, for example, via operator input, or an order provided by a stored file or record.

The determined ordering may be used, for example, to fine tune operational commands to individual vehicles in a consist based on the particular order of the vehicles within a consist. For example, when a portion of a consist has crested a grade, but other vehicles are still ascending the grade, the vehicles located toward the front of the consist may be given reduced tractive effort commands (or increased braking commands) and/or the vehicles located toward the rear of the consist may be given increased tractive effort commands.

The determined ordering may also be utilized to improve redundancy or robustness of a measurement, determination, or operation of a consist. For example, in one example scenario, positioning information of a lead vehicle in a consist may typically be determined via a GPS detection unit disposed onboard the lead vehicle. If the GPS detection unit onboard the lead vehicle malfunctions or otherwise becomes unavailable, the determined ordering may be used to identify the closest vehicle to the lead vehicle and use positioning information from a GPS unit disposed onboard the closest vehicle to determine the position of the lead vehicle (for example, using the position of the closest vehicle as a rough approximation of the position of the lead vehicle, or, as another example, by applying an offset to the position of the closes vehicle to determine the position of the lead vehicle).

FIG. 10 illustrates a schematic view of a communication and control system 2000 for a vehicle consist 2002 in accordance with an embodiment. The vehicle consist 2002 may include plural vehicles, such as powered units. The vehicle consist 2002 of the depicted embodiment includes a total of "n" powered vehicles, identified in FIG. 1 as a first vehicle 2010, a second vehicle 2020, a third vehicle 2030, and an $n^{th}$ vehicle 2040. The vehicle consist may be ordered in a direction of travel 2005, with the vehicles identified as $1^{st}$, $2^{nd}$, $3^{rd}$, $4^{th}$ . . . $n^{th}$ along the direction of travel 2005. In the illustrated embodiment, the first vehicle 2010 is the forward most vehicle along the direction of travel 2005 and the $n^{th}$ vehicle 2040 is the rearward most vehicle along the direction of travel 2005. In the illustrated embodiment, the first vehicle 2010 is configured as a logical lead powered unit, and the other depicted vehicles 2020, 2030, 2040 are configured as logical trail powered units that receive control commands from the first vehicle 2010. In other embodiments, the logical lead powered unit may not necessarily be disposed in a forward most position in the direction of travel 2005. The vehicles 2010, 2020, 2030, 2040 may be propulsion-generating vehicles. The vehicles 2010, 2020, 2030, 2040 in some embodiments are rail vehicles, such as powered rail vehicles or locomotives. Messages or commands from the lead powered unit may be transmitted to the trail powered units to control one or more operations of the trail powered units. In the illustrated embodiment, the vehicles joined are joined by a communication path 2004. For example, the vehicles may be joined by a multiple unit (MU) line, so that the communication path 2004 physically extends through the vehicles of the consist. Messages or packets may be sent along virtual paths or tunnels so that a given message may be just communicated between a pair of vehicles instead of to all vehicles in a consist. Other communication paths (e.g., wireless) may be employed in various alternate embodiments.

The first vehicle 2010 includes a first communication module 2012, a first ordering determination module 2014, a memory 2016, a first control module 2018, and a propulsion module 2019. The memory 2016 may be accessed or utilized by one or more aspects of the first vehicle 2010, such as the first ordering determination module 2014 or the first control module 2018. The first control module 2018 is configured to develop and/or determine control messages for operational aspects of the first vehicle 2010, such as the propulsion module 2019. The propulsion module 2019 is configured to propel the vehicle 2010 along a route, such as a railroad track, road, trail, waterway, etc. The propulsion module 2019 may include, for example, wheels and drive assemblies, as well as braking components or systems, such as dynamic braking components or systems. In some embodiments, for example, where the first vehicle 2010 is configured as the lead vehicle of the consist 2002, the first control module 2018 may be configured to determine or develop control message for operational aspects of other vehicles of the consist. The first control module 2018 may be configured to develop a trip plan corresponding to a series of propulsion commands to be performed by each of the vehicles 2010, 2020, 2030, 2040 to perform a mission.

Figure 20:
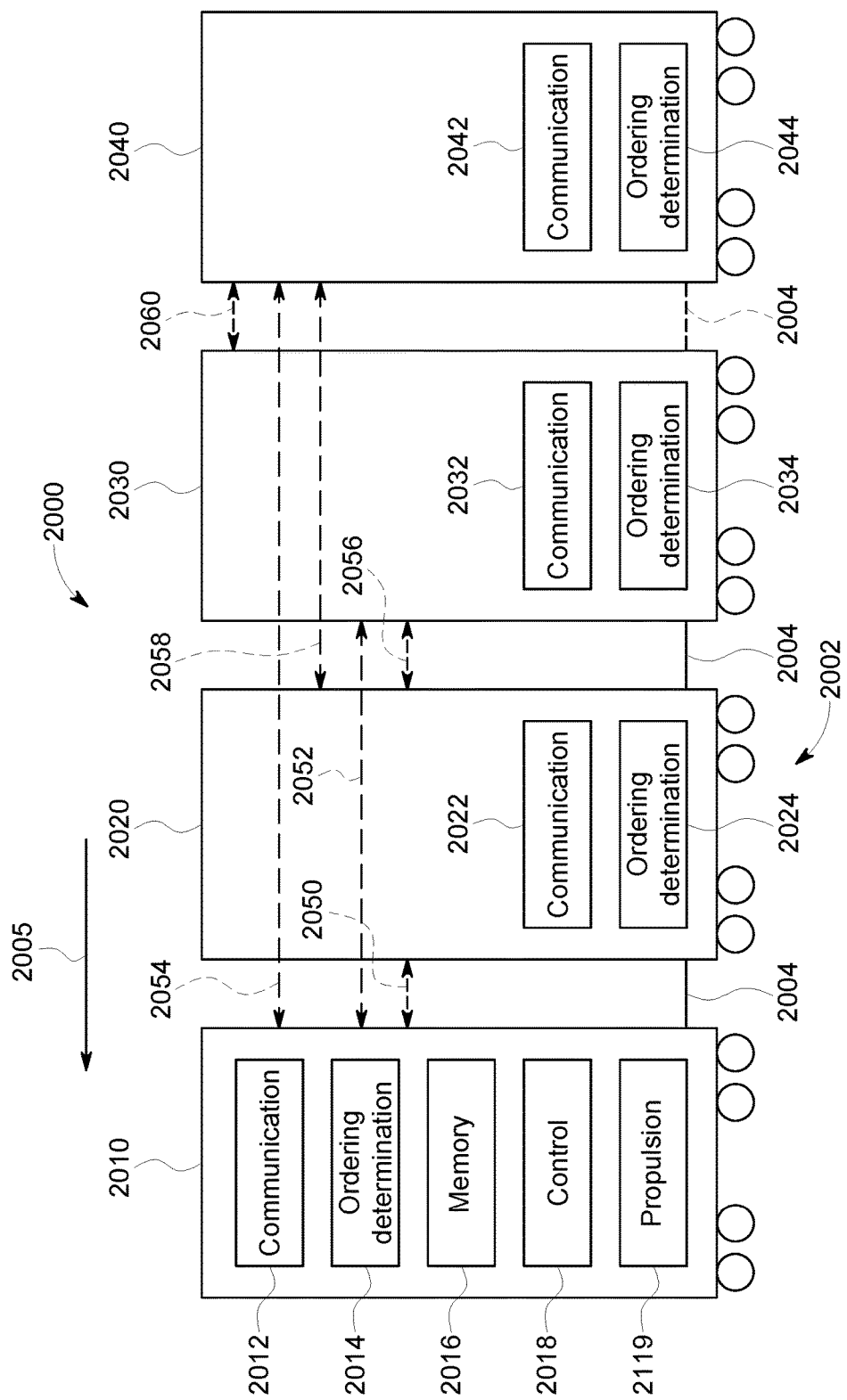
FIG. 20 is a schematic diagram of a communication and control system for a vehicle consist, according to an embodiment.

As depicted in FIG. 20, the first communication module 2012 is configured to be disposed on-board the first vehicle 2010. Also, the first communication module 2012 is configured to send and receive information to and from other vehicles of the consist 2002. The first communication module 2012 may be configured to communicate individual messages with plural vehicles (e.g., second vehicle 2020, third vehicle 2030, $n^{th}$ vehicle 2040) of the consist 2002. The individual messages may be targeted for communication with respective individual vehicles of the vehicle consist. For example, the first communication module 2012 may be configured as a router/transceiver configured to send packets of information via modulated signals sent over one or more channels of a MU line. The messages may be sent via Ethernet over MU (eMU), with each message including a control portion such as a header portion and a payload portion, with the header portion specifying a vehicle to which the message is targeted. Thus, a first header may designate a packet for communication between the first vehicle 2010 and the second vehicle 2020, a second header may designate a packet for communication between the first vehicle 2010 and the third vehicle 2030, a third header may designate a packet for communication between the second vehicle 2020 and the third vehicle 2030, and the like. Only communication modules disposed onboard the particular vehicle(s) identified in a header may de-modulate or otherwise analyze a given packet, with the communication modules of other vehicles not identified in the header of the given packet ignoring or disregarding the packet. These messages may be understood as being sent via tunnels, with each tunnel connecting a distinct pair of vehicles.

In FIG. 20, a number of tunnels communicatively linking distinct pairs of powered units are depicted as dashed lines. The tunnels may be understood as virtual tunnels connecting distinct pairs of powered units, as one or more of the tunnels may physically be included as part of single line joining the powered units, such as the communication path 2004 (e.g., a MU line). In the illustrated embodiment, a tunnel 2050 communicatively links the first vehicle 2002010 and the second vehicle 2020, a tunnel 2052 communicatively links the first vehicle 2002010 and the third vehicle 2030, a tunnel 2054 communicatively links the first vehicle 2002010 and the $n^{th}$ vehicle 2040, a tunnel 2056 communicatively links the second vehicle 2020 and the third vehicle 2030, a tunnel 2058 communicatively links the second vehicle 2020 and the $n^{th}$ vehicle 2040, and a tunnel 2060 communicatively links the third vehicle 2030 and the $n^{th}$ vehicle 2040. Additional tunnels may be used to communicatively link additional powered units.

For example, the first communication module 2012 may be configured to develop and send messages via the appropriate tunnels including individual propulsion commands (e.g., as a portion of a payload portion of a packet) to the second vehicle 2020, the third vehicle 2030, and the $n^{th}$ vehicle 2040, and to receive specific individual status messages from the second vehicle 2020, the third vehicle 2030, and the $n^{th}$ vehicle 2040. Information from the status messages may be used to determine a future command to at least one of the second vehicle 2020, the third vehicle 2030, and the nth vehicle 2040, to revise a trip plan, or the like.

The first communication module 2012 may also be configured to send messages that have been configured or developed specifically for measuring or determining message characteristic information, and to determine a characteristic (e.g., rate) for the various tunnels through which the first communication module 2012 is configured to transmit or receive messages (e.g., tunnels 2050, 2052, 2054). Message characteristic information may be understood as information corresponding to one or more characteristics of the transmission of messages, and not necessarily the content of the messages themselves. For example, message characteristic information may include information regarding the time consumed by the sending or receiving of a message, a communication rate at which information may be transmitted between a pair of vehicles in a consist, or the like. The communication rate may correspond to a rate negotiated between routers of a pair of vehicles. As another example, message characteristic information may include information corresponding to signal quality metrics, such as signal to noise ratio (SNR).

A message may be configured or developed specifically for measuring or determining message characteristic information, for example, by being configured to have an amount or volume of data that is relatively large (e.g., an amount at or near the limit of data that may be sent through a given tunnel in a relatively short amount of time). For example, a message or messages at or near the limit of amount of data a particular tunnel may accommodate over a given time period may be sent through the tunnel, and the amount of time required to transmit and receive the data and/or a communication rate through the given tunnel may be determined. As another example, messages sent to different vehicles from a given vehicle may be configured to be substantially the same size or contain substantially the same number of bits or amount of data to help provide uniformity in the determination of message characteristic information. In some embodiments, a characteristic (such as rate) may be measured during the transmission of messages that are configured for operational use by one or more units of a vehicle system, for example messages that contain commands for tractive efforts or status information. In some embodiments, a characteristic (such as rate) may be measured during the transmission of messages that are configured for operational use, but have been modified. For example, a message containing a command for a tractive effort, or, as another example, status information, may be modified so that the message is larger than necessary to convey the command or status information, with the increased size of the message configured to improve the measurement of a characteristic (such as rate).

Data communication rates along one or more tunnels may not be constant and may vary for a variety of reasons over relatively short time increments, thereby providing a potential source of error when determining a communication rate for a given tunnel, as well as when comparing relative values of rates determined for different tunnels. Thus, in some embodiments, messages (e.g., messages configured to determine a rate (or other characteristic)) may be sent substantially simultaneously along plural tunnels. Further, larger messages and/or plural messages (e.g., repeated messages configured to determine a rate) may be sent to determine an average rate collected over a large enough time period to help minimize or reduce the effect of any transient changes in rate.

The first ordering determination module 2014 is configured to be disposed onboard the first vehicle 2010. The first ordering determination module 2014 is configured to determine an order of plural vehicles in the consist 2002 using message characteristic information obtained via the first communication module 2012. The message characteristic information, as also described above, corresponds to a transmission characteristic of individual messages. The transmission characteristic of a message represents one or more parameters of the transmission of the message, as opposed to the contents of the message, in one embodiment. For example, a communication rate at which messages are communicated between vehicles may be determined as a transmission characteristic using individual messages sent between each pairs of vehicle, and the communication rates used to determine the order of the vehicles in the consist 2002. As another example, the signal-to-noise ratios of messages that are communicated between vehicles may be determined as a transmission characteristic using individual messages sent between each pairs of vehicle, and the signal-to-noise ratios used to determine the order of the vehicles in the consist 2002.

In one example scenario, the first communication module 2012 may send messages to each of the other vehicles of the consist 2002 depicted in FIG. 20. Thus, the first communication module sends a first message to the second vehicle 2010 via tunnel 2050, a second message to the third vehicle 2030 via tunnel 2052, and a third message to the $n^{th}$ vehicle 2040 via tunnel 2054. The first communication module 2012 then determines message characteristic information (e.g., communication rate, signal quality metric, or the like) for each of the individual messages sent to the particular vehicles of the consist 2002.

For example, the first communication module 2012 may determine a communication rate along each tunnel. The closer two vehicles (or two communication modules are), the higher the rate of communication will be. Closer vehicles may be able to negotiate faster rates of communication due to higher signal-to-noise ratios and/or shorter propagation paths than more distantly located vehicles. Thus, the first communication module 2012 may determine that the rate of communication between the first vehicle 2010 and the second vehicle 2020 is higher than the rate of communication between the first vehicle 2010 and the third vehicle 2030, and that the rate of communication between the first vehicle 2010 and the third vehicle 2030 is higher than the rate of communication between the first vehicle 2010 and the $n^{th}$ vehicle 2040. Additionally or alternatively, the first communication module 2012 may compare the signal-to-noise ratios of the messages. For example, the messages communicated between closer vehicles may have greater signal-to-noise ratios than the vehicles that are spaced apart by longer distances. The first ordering determination module 2014 may then determine distance information, using the message characteristic information corresponding to the communication rates between the various vehicles and the first vehicle 2010. Continuing the example described above, the first ordering determination module 2014 may determine that the second vehicle 2020 is closer to the first vehicle 2010 than are the third vehicle 2030 and the nth vehicle 2040 (using the higher or faster rate of communication between the first vehicle 2010 and the second vehicle 2020 compared to the rates of communication between the first vehicle 2010 and the other vehicles), determine that the third vehicle 2030 is farther from the first vehicle 2010 than the second vehicle 2020 but closer than the nth vehicle 2040 is to the first vehicle 2010, and determine that the nth vehicle 2040 is farther from the first vehicle 2010 than are the other vehicles. In some embodiments, the first communication module 2012 may determine or develop the distance information and communicate the distance information to the first ordering determination module 2014.

The first ordering determination module 2014 may be configured to determine the order of the vehicles in the consist using the distance information along with lead information. The lead information may designate, indicate, or identify the lead vehicle of a consist, or the forward most vehicle of a consist. As one example, a lead vehicle may be identified as a source of one or more air brake commands. For instance, the first ordering determination module 2014 (or other module in communication with the first ordering determination module 2014) may be configured to note from which vehicle an air braking command originates and identify that particular vehicle as the lead vehicle. Alternatively or additionally, as another example, the lead or forward most vehicle (in some embodiments, the lead vehicle may not be the forward most vehicle) may be identified using configuration information provided by a trip planner or other control aspect of the consist.

The first ordering determination module 2014 may be configured to use the distance information and/or the message characteristic information, as well as the lead information, to determine the order of the vehicles in the consist 2002. For example, continuing the example scenario described above, the first ordering determination module 2014 may determine from the lead information that the first vehicle 2010 is the lead vehicle and the forward most vehicle of the consist 2002. Then, because the first vehicle 2010 is forward most and the second vehicle 2020 is closest to the first vehicle 2010, the first ordering module 2014 may determine that the second vehicle 2020 is the second vehicle from the front. Also, because the third vehicle 2030 is the next closest vehicle, then the first ordering determination module 2014 may determine that the third vehicle 2030 is the third vehicle from the front, and so on until all the vehicles have been ordered.

In some circumstances, for example where there is substantial variability in communication rates, or, as another example, where a consist is long enough so that communication rates and/or signal-to-noise ratios for messages communicated between one vehicle and relatively distant vehicles may be substantially similar, a determination module may use distance or ordering information from additional vehicles to supplement all or a portion of the ordering or distance information determined onboard a lead vehicle.

In some embodiments, the first ordering determination module 2014 may be configured to use at least one of distance or ordering information determined or developed at trail powered units (e.g., second vehicle 2020, third vehicle 2030, $n^{th}$ vehicle 2040) to determine an order of vehicles in the consist 2002. For example, plural vehicles (e.g., each powered unit of a consist) may send messages (e.g., from an associated communications module via a series of tunnels) to other vehicles (e.g., each other powered unit of a consist) or otherwise determine a communication rate or other message characteristic information, with each such vehicle having an ordering determination module disposed thereon and configured to determine distance and/or ordering information for each other vehicle relative to itself. The distance information (or ordering information) may then be sent to a single vehicle (e.g., a lead or forward most vehicle) for analysis and determination of the overall order of the consist. In some embodiments, the lead vehicle may receive distance information from plural trail vehicles and arbitrate between any inconsistent findings. In some embodiments, the lead vehicle may preferentially use information from a vehicle that is closer to the vehicle or vehicles in question, or may use information having better signal quality metrics associated therewith.

In one example scenario, a consist may include ten serially connected powered units. Distance information from two of the vehicles, for example, the second forward most unit and the rearward most unit, may conflict regarding the relative ordering or placement of two or more other units, for example, the eighth and ninth forward most units (or, put another way, the second and third rearward most units). An ordering determination module onboard a lead unit may then arbitrate between the conflicting information. For example, the ordering determination module may use information from a vehicle deemed to be closer to the vehicles in question. For example, if based on distance information, the ordering determination module determines that one of the reporting vehicles is closer to the vehicles in question, then the information or ordering provided or indicated by the closer vehicle may be used. As another example, information may be used from a vehicle reporting a higher communication rate with the vehicles in question. As one more example, the trail vehicles may provide signal quality information along with the distance information, and the ordering determination module may use the information provided by the vehicle reporting better signal quality metrics with the vehicles in question. For example, in the above example scenario, the tenth vehicle may report higher communication rates with the vehicles in question (the eighth and ninth vehicles), and the ordering determination module may preferentially use the information provided by the tenth vehicle over information provided by the second vehicle with respect to the ordering of the eighth and ninth vehicles. In some embodiments, information from plural vehicles may be weighted or averaged to determine ordering of the vehicles in a consist.

In some embodiments, the order determination module 2014 may be configured to determine an order using message characteristic information obtained or determined via messages sent from a communication module of a single vehicle (e.g., a lead vehicle). For example, messages sent from a lead vehicle may be used to determine communication rates between the lead vehicle and each trail powered unit. If the resulting message characteristic information is of a sufficient quality or provides a sufficient level of confidence, then the order determined using the information obtained may be used to determine the order of vehicles in the consist. However, if the information does not provide a satisfactory level of confidence (e.g., if signal metric quality does not reach a threshold level, if relative communication rates or other message characteristic information for two or more trail powered units are not substantially different or are within a threshold difference level, or the like), then supplemental techniques may be employed to provide a higher amount or quality of information. For example, communication rates may be determined simultaneously, communication rates may be determined over longer period of times and/or using more measurements to provide average communication rates, distance and/or ordering information may be determined at multiple vehicles, or the like.

Once the order of the vehicles in the consist is known, the ordering information may be used in operating the consist 2002. For example, previously determined tractive efforts of a trip plan may be modified or fine-tuned based on the ordering information. In some embodiments, throttle or braking commands may be altered based upon a positioning of vehicles relative to a crest or sag using a determined order of vehicles in a consists.

As indicated above, some or all the trail vehicles of the consist 2002 may be configured to communicate with a lead vehicle, for example along paths (e.g., tunnels configured for communication between discrete pairs of vehicles). For example, each trail powered unit of a consist may have a defined individual communicative path linking the trail powered unit with the lead powered unit of the consist. Each trail powered unit may also have a plurality of defined individual communicative paths linking the trail powered unit with each other trail powered unit of the consist. The trail vehicles may also be configured to determine message characteristic information, either acting alone or in cooperation with one or more other vehicles. Further, the trail vehicles may be configured to determine ordering or distance information of other vehicles in the consist.

In the illustrated embodiment, the second vehicle 2020 is configured as a trail powered unit, and includes a second communication module 2022, a second ordering determination module 2024, and a memory associated therewith (not shown). The second vehicle 2020 may also include a control module (not shown) configured to provide commands (e.g., commands received from a lead control module or commands created responsive to messages received from a lead control module) to operational aspects of the second vehicle 2020, such as a propulsion module (not shown). The memory may be accessed or utilized by one or more aspects of the second vehicle 2020, such as the second ordering determination module 2024 or a control module.

As depicted in FIG. 20, the second communication module 2022 is configured to be disposed on-board the second vehicle 2020. The second communication module 2020 may be configured to send and receive information to and from other vehicles of the consist 2002. The second communication module 2020 may be configured to communicate individual messages with plural vehicles (e.g., first vehicle 2010, third vehicle 2030, $n^{th}$ vehicle 2040) of the consist 2002. The individual messages may be targeted for communication with respective individual vehicles of the vehicle consist. For example, the second communication module 2020 may be configured as a router/transceiver configured to send packets of information via modulated signals sent over one or more channels of a communication path (e.g., communication path 2004) such as an MU line. The messages may be sent via eMU, with each message including a header portion and a payload portion, with the header portion specifying a vehicle to which the message is targeted. Only communication modules disposed onboard the particle vehicle(s) identified in a header may de-modulate or otherwise analyze a given packet, with the communication modules of other vehicles not identified in the header of the given packet ignoring or disregarding the packet. These messages may be understood as being sent via tunnels, with each tunnel connecting a distinct pair of vehicles.

Similar in certain respects to the first communication module 2012, the second communication module 2022 may also be configured to send messages that have been configured or developed specifically for measuring or determining message characteristic information, and to determine a characteristic (e.g., rate) for the various tunnels through which the second communication module 2022 is configured to transmit or receive messages (e.g., tunnels 2050, 2056, 2058). For example, message characteristic information may include information regarding the time consumed by the sending or receiving a message between the second vehicle 2020 and a given vehicle, a rate at which information may be transmitted between the second vehicle 2020 and a given vehicle, or the like. A message sent via the second communication module 2022 may be configured or developed specifically for measuring or determining message characteristic information, for example, by being configured to have an amount or volume of data that is relatively large (e.g., an amount at or near the limit of data that may be sent through a given tunnel in a relatively short amount of time).

In some embodiments, the second communication module 2022 may determine a communication rate along each tunnel through which the second vehicle 2020 communicates with other vehicles. The second ordering determination module 2024 may then determine distance information, using the message characteristic information provided by the second communication module 2022, with the distance information corresponding to the communication rates between the various vehicles and the second vehicle 2020. The distance information (or ordering information) determined by the second ordering determination module 2024 may then be forwarded to the first ordering determination module 2014, with the first ordering determination module 2014 using distance information determined locally at the various vehicles of the consist to determine the order of vehicles in the consist, for example to supplement distance information determined for the first vehicle 2002010 relative to the other vehicles in the consist.

The third vehicle 2030 and the $n^{th}$ vehicle 2040 in the illustrated embodiment are configured substantially similarly in many general respects to the second vehicle 2020. For example, in the illustrated embodiment, the third vehicle 2030 and the $n^{th}$ vehicle 2040 are configured as trail powered units. The third vehicle 2030 includes a third communication module 2032 and a third ordering determination module 2034, and the $n^{th}$ vehicle includes an $n^{th}$ communication module 2042 and an $n^{th}$ ordering determination module 2044. The third and $n^{th}$ vehicles 2030, 2040 may also each include a control module (not shown) configured to provide commands (e.g., commands received from a lead control module or commands created responsive to messages received from a lead control module) to operational aspects of the vehicle on which the control module is disposed, such as a propulsion module (not shown). Associated memories (not shown) may be accessed or utilized by one or more aspects of the vehicles. The communication modules and ordering determination modules of the third vehicle 2030 and the $n^{th}$ vehicle 2040 may be configured generally similar to the corresponding modules of the second vehicle 2020.

In a relatively simple example scenario, message characteristic information may be determined for separate paths or tunnels from a first to other vehicles of a consist, with determined distances from the first vehicle used to order the vehicles in the consist. In other example scenarios, distance or ordering information determined at additional vehicles may be used to supplement information determined relative to the first vehicle.

The table below depicts an example scenario illustrating determination of an order of a consist having three vehicles, in accordance with various embodiments. As shown in the table below, the example consist includes three vehicles, namely "A," "B," and "C."

| Path | Communication Time |
|------|-------------------|
| A to B | 42.9 Mbits/second |
| A to C | 14.8 Mbits/second |
| B to A | 26.5 Mbits/second |
| B to C | 29.4 Mbits/second |

In the example scenario, the above times were determined based on messages sent at different times. One or more of the paths above may be checked or confirmed utilizing rates determined using messages sent at the substantially same time. For example, a determining module may notice the difference between the paths A to B and A to C, and messages may be re-sent at substantially the same time to confirm that B and C are different distances from A (e.g., B is closer because A to B has the higher communication rate). For instance, utilizing messages sent substantially at the same time, the communication rate A to B may be determined as 26.0 Mbits/second and A to C may be determined as 10.4 Mbits/second, thereby confirming that B is closer to A than is C. In various embodiments, particularly where the number of vehicles in the consist becomes larger, averaged rates and/or the use of messages sent at substantially similar times may be used to improve resolution of relative distances from a plurality of vehicles to a given vehicle. It may also be noted that in the example table, the paths are considered to extend along a single direction, so that a separate rate is determined for messages for B to A than determined for A to B.

Returning to the example scenario depicted in the table, the communication rate from A to B is substantially higher than the communication rate from A to C. Thus, a determining module using the message characteristic information may determine that the distance from A to B is less than the distance from A to C. Similarly, it can be seen from the table that the communication rates from B to A and from B to C are quite similar. For example, a determining module may determine that two vehicles are equally distant from a third vehicle (e.g., disposed on opposite sides of the third vehicle) if the communication rates between the two vehicles and the third vehicles are substantially similar (e.g., within a threshold value or percentage). Thus, the determining module may determine that B is about the same distance from vehicles A and C.

Because it is thus determined that B is about the same distance from both A and C, and that A is closer to B than A is to C, the determining module may then determine that A and C are located on either end of B, or that B is interposed between A and C. If the identity of the lead or forward most vehicle is known, the order of the consist may be determined using the distance or ordering information along with the information identifying the lead vehicle. In the example scenario, A may be the lead or forward most vehicle. Thus, because it has already been determined that B is interposed between A and C, the order may be determined as A-B-C (from front to rear along a direction of travel).

The above example scenario is intended by way of example and illustration and not by way of limitation. For example, in other embodiments, alternative or additional message characteristic information (e.g., a signal quality metric such as SNR) may be employed. Different numbers of vehicles in consists (e.g., four, five, or more) may be present in various embodiments. In some embodiments, all the vehicles of a consist may be ordered, and in some embodiments, a limited subset of the vehicles of a consist may be ordered. Further, in some embodiments, a vehicle system may include plural consists, with some or all the consists independently determining the order of vehicles for that consist.

Figure 21:
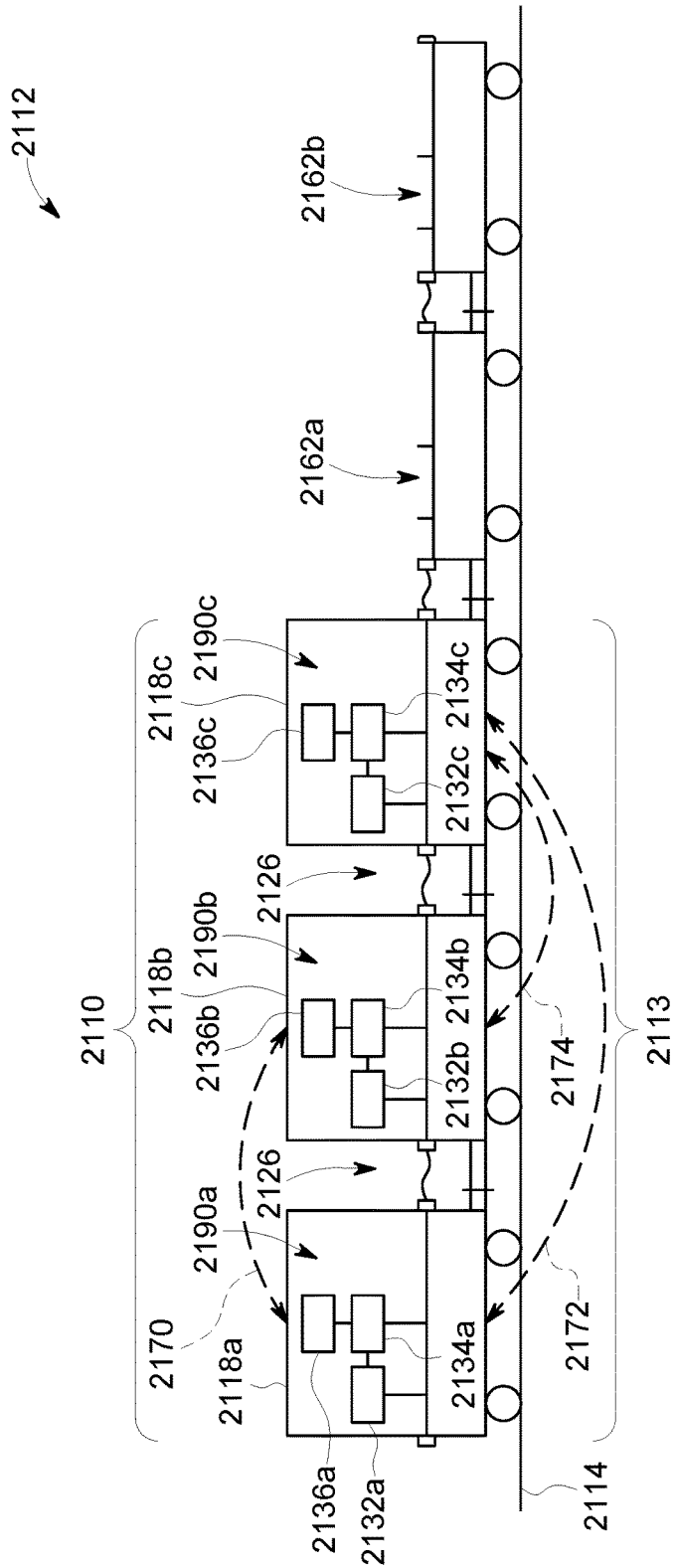
FIG. 21 is a schematic diagram of a communication system for communicating data in a vehicle consist, according to an embodiment.

FIG. 21 illustrates a system network (or communication system) 2110 of a vehicle system 2112 formed in accordance with one embodiment. The vehicle system includes a plurality of vehicles (or units) 2118a-2118c and 2162a, 2162b that are mechanically coupled to one another, and are configured to traverse a route 2114. The vehicle system of the illustrated embodiment corresponds to the table described above, with unit 2118a corresponding to "A," 2118b corresponding to "B," and 2118c corresponding to "C." In some embodiments, the vehicles may be rail vehicles (e.g., locomotives) and the route may include railroad tracks, roads, trails, waterways, etc. Alternatively, the vehicles may be automobiles, trucks, mining vehicles, or other vehicles. In some embodiments, the vehicle system includes one or more vehicle consists. Different vehicles of a vehicle consist may coordinate operations (e.g., tractive and braking efforts) with other vehicles in the consist to move the vehicle consist and, consequently, the vehicle system. The vehicle system may include only a single vehicle consist or a plurality of vehicle consists. For such embodiments that include multiple vehicle consists, each vehicle consist may coordinate operations with other vehicle consists to move the vehicle system. For example, individual consists may communicate with each other via a wireless communication system.

In the illustrated embodiment, the vehicle system is configured including a single vehicle consist that includes multiple vehicles or units. In other embodiments, however, the vehicle system may include a plurality of vehicle consists that are directly or indirectly linked to one another in the vehicle system. As shown, the vehicle system includes a plurality of powered vehicles 2118a-2118c. As used herein, a "powered vehicle" is a vehicle that is capable of self-propulsion. The vehicle system may also include non-powered vehicles (or units) 2162a, 2162b that do not provide propulsive efforts. In the illustrated embodiment, the non-powered vehicles 2162a, 2162b are rail cars used for cargo and/or carrying passengers. The term "powered," however, refers to the capability of the powered vehicles 2118a-2118c to propel themselves and not to whether the powered vehicles 2118a-2118c or the non-powered vehicles 2162a, 2162b receive energy (e.g., electric current) for one or more purposes. For example, the non-powered vehicles 2162a, 2162b may receive electric current to power one or more loads disposed on-board the non-powered vehicles 2162a, 2162b.

In some embodiments, the vehicle 2118a controls operation of the vehicles 2118b and 2118c and, as such, the vehicle 2118a may be referred to as a lead vehicle and the vehicles 2118b, 2118c may be referred to as trail vehicles. The vehicles 2118b, 2118c may or may not trail the vehicle 2118a when the vehicle system 2112 is in motion. In alternative embodiments, however, control of the different operations of the vehicle system may be distributed among a plurality of the vehicles. In the illustrated embodiment, each of the vehicles 2118a-2118c is adjacent to and mechanically coupled with another vehicle in the vehicle system such that each vehicle is directly or indirectly connected to the other vehicles. In one or more embodiments, the non-powered vehicles 2162a, 2162b may be positioned before, after, or between the powered vehicles 2118a-2118c.

Each of the vehicles 2118a, 2118b, 2118c may include a communication module 2134a-c (see description above) and an ordering determination module 2136a-c (see description above). In the illustrated embodiment, the communication modules are configured as router/transceiver units. In some embodiments, each of the vehicles 2118a, 2118b, 2118c may determine ordering or distance information corresponding to a distance or position of the other vehicles with respect to itself. The information determined locally at each vehicle may then be forwarded to a designated vehicle (e.g. lead vehicle 2118a), with the ordering determination module of the lead vehicle determining an order of the consist using the information provided.

The system network 2110 may include a plurality of sub-networks. For example, the system network 2110 may be a wide area network (WAN) and the sub-networks may be local area networks (LANs). In the illustrated embodiment, each of the vehicles 2118a-2118c includes a corresponding vehicle network 2190a-2190c, respectively. In some embodiments, the vehicle networks 2190a-2190c may constitute separate LANs that are part of a WAN (e.g., the system network 2110). Although not shown, the vehicles 2162a, 2162b may also include a vehicle network in alternative embodiments.

In some embodiments, the system network 2110 corresponds to a single vehicle consist (e.g., the vehicle consist 2113). The vehicle system 2112 may have a plurality of vehicle consists and, as such, the vehicle system 2112 may include a plurality of system networks. Accordingly, in some embodiments, a single vehicle system 2112 may include multiple WANs in which at least one of the WANs includes a plurality of vehicle networks (or LANs). In such embodiments, each of the vehicle consists may coordinate operations among the vehicles to move the vehicle system. The vehicle consists may also coordinate operations with one another to move the vehicle system.

Each of the vehicle networks 2190a-2190c may include a plurality of operational components 2132a-c that are communicatively coupled to the corresponding vehicle network. Each of the operational components may have a network address (e.g., IP address) within the corresponding vehicle network. The network address may be a static or designated address that is established or assigned by an industry or proprietary standard or the address may be a dynamic address designated by the system network 2110. Data may be transmitted between the different vehicles 2118a-2118c of the vehicle system 2112 or, more specifically, between the different vehicle networks 2190a-2190c. For example, data may be transmitted from the vehicle 2118a to the vehicle 2118b. In some embodiments, data transmitted within the vehicle networks 2190a-2190c (e.g., intra-network) is configured for one communications protocol, and data transmitted between the vehicle networks 2190a-2190c in the system network 2110 (e.g., inter-network) is configured for a different communications protocol. Further still, data transmitted between the various vehicle networks 2190a-2190c may be transmitted along multiple paths or tunnels.

In the illustrated embodiment, a first tunnel 2170 is defined between the vehicle 2118a and the vehicle 2118b. Also, a second tunnel 2172 is defined between the vehicle 2118a and the vehicle 2118c. Further, a third tunnel 2174 is defined between the vehicle 2118b and the vehicle 2118c.

The data sent via the tunnels may be transmitted over a communication channel or line, such as a multiple unit (MU) cable system 2126. The MU cable system 2126 may include an electrical bus that interconnects the lead powered vehicle 2118a and the remote powered vehicles 2118b, 2118c in the vehicle system 2112.

In some embodiments, a portion of the data may be transformed (e.g., modified, modulated, and/or converted) prior to transmission over the MU cable system 2126. For example, transformed network data may be data that is at least one of encapsulated or modulated. When data is encapsulated and/or modulated, the data may be changed from one form to a second, different form. Depending on the form, the data may be configured for transmission within a vehicle network or, separately, may be configured for transmission between vehicle networks. This transformed network data may be subsequently decapsulated (or translated) or demodulated such that the data is changed from the second form to the first form. In other embodiments, the data may be changed from the second form to a different, third form when the modified data is decapsulated or demodulated.

For various communication functions, the system network 2110 may include router transceiver units 2134a, 2134b, 2134c that are disposed on-board the vehicles 2118a, 2118b, 2118c, respectively, and are described in greater detail below. The router transceiver units 2134a, 2134b, 2134c may be communicatively coupled to operational components 2132a, 2132b, 2132c, respectively, which are also disposed on-board the respective vehicles, as well as to the ordering determination modules 2136a, 2136b, 2136c.

Figure 22:
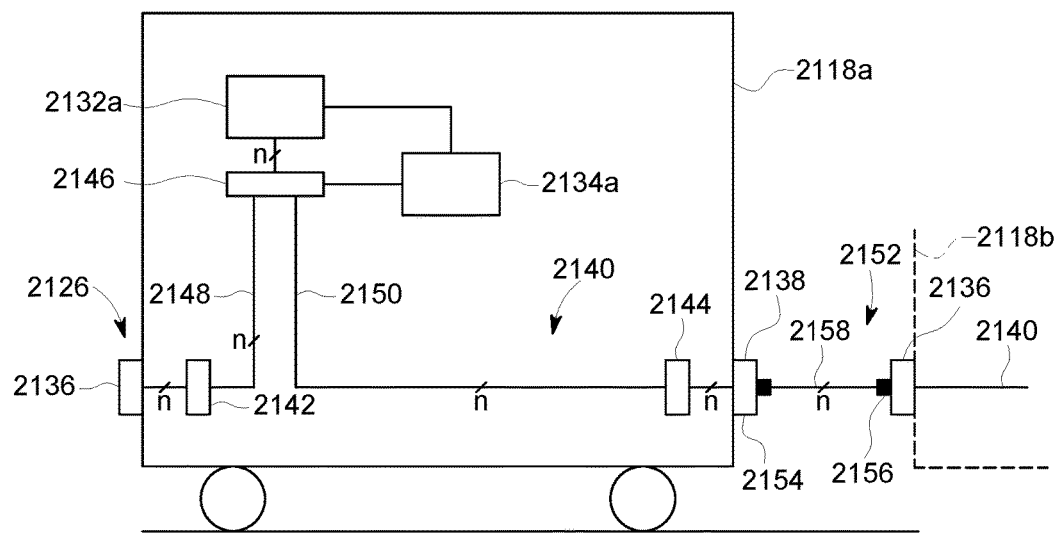
FIG. 22 is a schematic diagram of a multiple unit (MU) cable system in a vehicle, shown in the context of the system network of FIG. 21.

FIG. 22 shows aspects of the vehicle 2118a and the MU cable system 2126 in greater detail according to an embodiment. However, it should be noted that FIG. 22 illustrates one example of a powered vehicle and MU cable system and that other configurations may be possible. In some embodiments, the MU cable system 2126 may be an existing electrical bus interconnecting the vehicle 2118a and the vehicles 2118b, 2118c in the vehicle consist 2113 (see FIG. 21). In the illustrated embodiment, for each of the vehicles 2118a-2118c, the MU cable system 2126 comprises a first MU port 2136, a second MU port 2138, and an internal MU electrical system 2140 that connects the first port 2136 and the second port 2138 to one or more operational components 2132a of the vehicle 2118a. In the example embodiment depicted in FIG. 22, the internal MU electrical system 2140 comprises a first terminal board 2142 electrically connected to the first MU port 2136, a second terminal board 2144 electrically connected to the second MU port 2138, a central terminal board 2146, and first and second electrical conduit portions 2148, 2150 electrically connecting the central terminal board 2146 to the first terminal board 2142 and the second terminal board 2144, respectively. The one or more operational components 2132a of the vehicle 2118a may be electrically connected to the central terminal board 2146 and, thereby, to the MU cable system 2126 generally.

Figure 23:
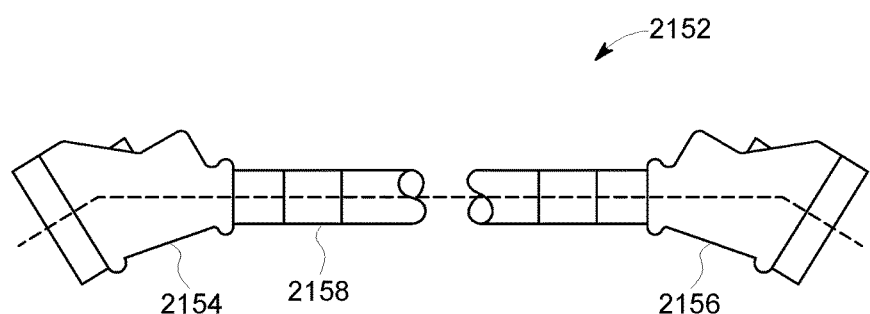
FIG. 23 is a schematic diagram of an MU cable jumper.

As shown in FIGS. 22 and 23, the MU cable system 2126 further comprises an MU cable jumper 2152. The jumper 2152 comprises first and second plug ends 2154, 2156 and a flexible cable portion 2158 electrically and mechanically connecting the plug ends together. The plug ends 2154, 2156 fit into the MU ports 2136, 2138. The MU cable jumper 2152 may be electrically symmetrical, meaning either plug end can be attached to either port. The MU cable jumper 2152 is used to electrically interconnect the internal MU electrical systems 2140 of the adjacent vehicles 2118a, 2118b. As shown in FIG. 22, for each adjacent pair of vehicles 2118a, 2118b, one plug end 2154 of an MU cable jumper 2152 is attached to the second MU port 2138 of the powered vehicle 2118a, and the other plug end 2156 of the MU cable jumper 2152 is attached to the first MU port 2136 of the powered vehicle 2118b. The flexible cable portion 2158 of the MU cable jumper 2152 extends between the two plug ends, providing a flexible electrical connection between the two vehicles 2118a, 2118b.

The cable portion 2158 (of the MU cable jumper 2152) may include a plurality of discrete electrical wires, while the conduit portions 2148, 2150 each include one or more discrete electrical wires and/or non-wire electrical pathways, such as conductive structural components of the vehicle, pathways through or including electrical or operational components, circuit board traces, or the like. Although certain elements in FIG. 3 are shown as including "n" discrete electrical pathways, it should be appreciated that the number of discrete pathways in each element may be different, i.e., "n" may be the same or different for each element.

In some embodiments, the plug ends 2154, 2156 may include a plurality of electrical pins, each of which fits into a corresponding electrical socket in an MU port. The number of pins and sockets may depend on the number of discrete electrical wires or channels extant in the internal electrical system 2140, MU cable jumper 2152, etc. In one example, each plug end 2154, 2156 is a twenty-seven-pin plug.

The central terminal board 2146, the first terminal board 2142, and the second terminal board 2144 may each comprise an insulating base (attached to the vehicle) on which terminals for wires or cables have been mounted. This may provide flexibility in terms of connecting different operational components to the MU cable system.

Depending on the type and configuration of the vehicle, the electrical conduit portions 2148, 2150 and MU cable jumpers 2152 may be configured in different manners, in terms of the number "n" ("n" is a real whole number equal to or greater than 1) and type of discrete electrical conduits. In one example, each conduit portion 2148, 2150 and the jumper cable portion 2158 include a plurality of discrete electrical wires, such as 12-14 gauge copper wires. For example, the MU cable system 2126 may include 27 wires (and corresponding pins) configured corresponding to a standard MU configuration.

Signals sent along one or more of the MU lines may be used to transmit information via conventional MU communication techniques, while modulated signals overlaid on one or more of the MU lines may be used to transmit information or messages via packets as described above. For example, messages used to determine message characteristic information (e.g., communication rates) may be sent using modulated signal overlaid on one or more of the MU lines.

As used herein, the term "MU cable system" refers to the entire MU cable system or any portion(s) thereof, e.g., terminal boards, ports, cable jumper, conduit portions, and the like. As should be appreciated, when two vehicles are connected via an MU cable jumper 2152, both the MU cable jumper 2152 and the internal MU electrical systems 2140 of the two vehicles together are part of the MU cable system. As subsequent vehicles are attached using additional MU cable jumpers 2152, those cable jumpers and the internal MU electrical systems 2140 of the subsequent vehicles also become part of the MU cable system.

Returning to FIG. 21, the system network 2110 may include the router transceiver units 2134a, 2134b, 2134c of the respective vehicles 2118a, 2118b, 2218c. The router transceiver units 2134a, 2134b, 2134c may be each communicatively coupled to the MU cable system 2126. The router transceiver units in the illustrated embodiment 2134a, 2134b, 2134c are configured to transmit and/or receive data in a standard MU format or other non-network data as well as data transmitted via a modulated signal over one or more wires or channels of a MU cable, such as via eMU, or other network data, over the MU cable system 2126. The router/transceiver units 2134a-2134c may be incorporated into, for example, a communication module (e.g. communication modules described above). In some embodiments, the router transceiver units 2134a, 2134b, 2134c are configured to change the data into a different form so that the data may be used by other operational components. For example, the router transceiver units 2134a, 2134b, 2134c may be configured to decapsulate or demodulate the data after the data is received.

Figure 24:
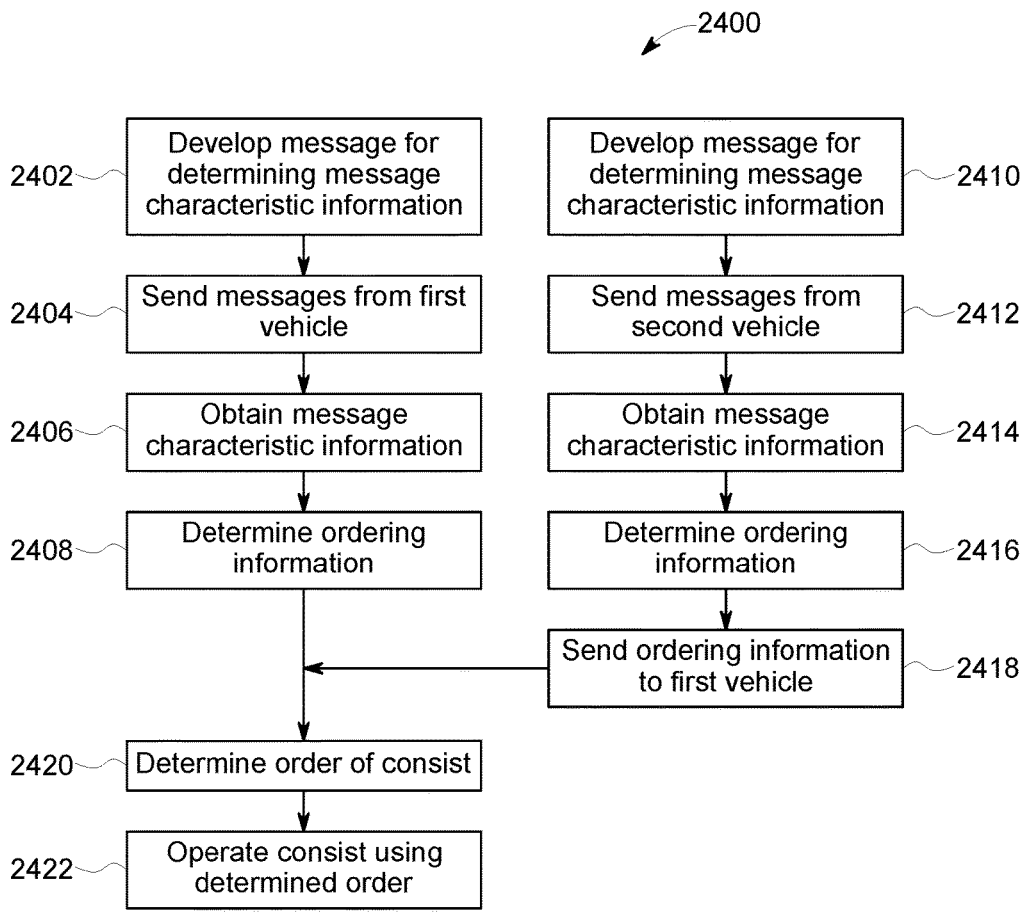
FIG. 24 illustrates a flowchart of a method for communicating between different vehicles of a vehicle system in accordance with one embodiment.

FIG. 24 illustrates a flowchart of a method 2400 for determining the order of vehicles of a vehicle system (e.g., powered units of a consist), in accordance with one embodiment. The method 2400 may be performed, for example, using certain components, equipment, structures, or other aspects of embodiments described above. In certain embodiments, certain steps may be added or omitted, certain steps may be performed simultaneously or concurrently with other steps, certain steps may be performed in different order, and certain steps may be performed more than once, for example, in an iterative fashion.

At 2402, a message for determining message characteristic information is developed. The message may be configured for determining message characteristic information, such as a communication rate. For example, the message may be configured to be of a sufficient size to reliably measure a communication rate via a tunnel between two vehicles over a given amount of time. In some embodiments, the message may include content to be utilized by a target or receiving vehicle during operation or traversal of a route, while in other embodiments the message may be configured solely for the purpose of determining a communication rate.

At 2404, messages are sent from a first vehicle of a consist (e.g., the lead vehicle of the consist) to other vehicles in the consist for which an ordering is desired. For example, a message may be sent to each other powered unit of the consist. In some embodiments, the messages may be sent via packets, where the payload portion of the packet is substantially similar for each packet, but where the header (or other control portion) of each packet is configured so that the particular packet is targeted to a single recipient vehicle. For example, the first vehicle of the consist may sent an individual packet (or message) to each powered unit of the consist via a virtual tunnel communicatively coupling the particular powered unit to the lead unit. The packets or messages may be send substantially simultaneously. In some embodiments, the packets may be sent at more than one time, for example, to determine an average communication rate. In some embodiments, the payload portion of the packets sent to each vehicle may be substantially similar, while in other embodiments, the payload portion of the packets sent may vary according to the vehicle to which the particular packet is sent.

At 2406, message characteristic information is obtained. Message characteristic information may be obtained describing a transmission characteristic between the first vehicle and each vehicle to which a message was sent at 2404. For example, a communication rate may be determined based on the amount of time each vehicle requires to receive and/or acknowledge the particular packet sent. As another example, the communication rate may be determined based on a rate negotiated between two vehicles responsive to the sending of a packet or message from one of the vehicles to the other. Additionally or alternatively, the message characteristic information may include signal quality metric information, such as SNR.

At 2408, ordering information is determined. The ordering information may include distance information. For example, the message characteristic information may be used to provide a ranking of each powered unit with respect to the first vehicle. For example, each vehicle may be ranked according to communication rate, with the vehicles having lower communication rates determined to be farther away from the first vehicle than the vehicles having higher communication rates.

At 2410, a message for determining message characteristic information is developed. The message may be configured for determining message characteristic information, such as a communication rate, and is configured to be sent by a second vehicle. The message may be substantially similar to the message determined at 2402. For example, the message may be configured to be of a sufficient size to reliably measure a communication rate via a tunnel between two vehicles over a given amount of time. In some embodiments, the message may include content to be utilized by a target or receiving vehicle during operation or traversal of a route, while in other embodiments the message may be configured solely for the purpose of determining a communication rate.

At 2412, messages are sent from the second vehicle of the consist to other vehicles in the consist for which an ordering is desired. For example, a message may be sent to each other powered unit of the consist. In some embodiments, the messages may be sent via packets, where the payload portion of the packet is substantially similar for each packet, but where the header of each packet is configured so that the particular packet is targeted to a single recipient vehicle. The packets or messages may be send substantially simultaneously. In some embodiments, the packets may be sent at more than one time, for example, to determine an average communication rate.

At 2414, message characteristic information is obtained. Message characteristic information may be obtained describing a transmission characteristic between the second vehicle and each vehicle to which a message was sent at 2412. For example, a communication rate may be determined based on the amount of time each vehicle requires to receive and/or acknowledge the particular packet sent. As another example, the communication rate may be determined based on a rate negotiated between two vehicles responsive to the sending of a packet or message from one of the vehicles to the other. Additionally or alternatively, the message characteristic information may include signal quality metric information, such as SNR.

At 2416, ordering information is determined. The ordering information may include distance information. For example, the message characteristic information may be used to provide a ranking of each powered unit with respect to the second vehicle. For example, each vehicle may be ranked according to communication rate, with the vehicles having lower communication rates determined to be farther away from the second vehicle than the vehicles having higher communication rates. In some embodiments, steps 2410-2416 may be performed at additional vehicles (e.g., each powered unit of a consist).

At 2418 ordering information determined locally at the second vehicle is sent to the first vehicle. In some embodiments, ordering information determined locally at additional vehicles may also be sent to the first vehicle. At 2420, the ordering information determined at the first and second vehicles (along with, in some embodiments, ordering information from other vehicles) is used to determine the order of vehicles in the consist. As described above, the information from various vehicles may be weighted or otherwise given preference to information from one or more other vehicles based on, for example, proximity to vehicles in question, or, as another example, signal quality metrics.

At 2422, the consist is operated using the determined order. For example, commands for tractive or braking efforts may be tailored based on the position of vehicles in a consist. In some embodiments, a trip plan originally developed without knowing the position of individual vehicles in the consist is revised to fine-tune braking or tractive effort commands based on the position of vehicles in the consist. For example, braking efforts of vehicles toward the front of a consist may be increased over a portion or portions of a mission performed by the consist.

Embodiments may also include computer readable media with instructions that are configured to direct a processor to execute or perform the various method operations described herein. Embodiments may also include powered vehicles including the various modules and/or components or vehicle networks described herein. Moreover, embodiments described herein may include vehicle consists that include the various modules and/or components, the vehicle networks, or the system networks described herein.

In one embodiment, a system is provided that includes a first communication module and a first ordering determination module. The first communication module is configured to be disposed onboard a first vehicle of a vehicle consist and to communicate individual messages that are targeted for communication with respective individual second vehicles of the vehicle consist. The first ordering determination module is configured to be disposed onboard the first vehicle of the vehicle consist, and to determine an order of the first vehicle and one or more of the second vehicles in the consist using message characteristic information. The message characteristic information corresponds to one or more transmission characteristics of the individual messages.

In another aspect, the second vehicles include a second vehicle and a third vehicle. The system further includes second and third communication modules configured to be respectively disposed onboard the second vehicle and the third vehicle. The second and third communication modules are configured to communicate with one another via an individual path configured to communicatively couple the second and third communication modules. The system also includes second and third ordering determination modules configured to be respectively associated with the second and third communication modules and respectively disposed onboard the second vehicle and the third vehicle. The second and third ordering determination modules are configured to determine respective distance information for the second vehicle and the third vehicle on which the second and third ordering determination modules are configured to be disposed, respectively, using information corresponding to a characteristic of communication between the second and third communication modules over the individual path.

In another aspect, the message characteristic information includes communication rate information corresponding to rates of communication of the individual messages. In some embodiments, the communication rate information includes averaged communication rate information. In some embodiments, the individual messages comprise messages configured specifically for measuring rates of communication. In some embodiments, the first ordering determination module is configured to determine distance information corresponding to the relative distance of a given vehicle from the first vehicle based on the relative rates of plural of the individual messages, wherein a vehicle with which the first communication module communicates with at a faster rate is determined to be relatively nearer to the first vehicle than a vehicle with which the first communication module communicates with at a slower rate.

In another aspect, the first communication module is communicatively coupled to plural of the second vehicles via a multiple unit (MU) line. In some embodiments, the first communication module is configured to communicate with the plural of the second vehicles via Ethernet over multiple unit (eMU) using modulated signals overlaid on the MU line.

In another aspect, at least some of the individual messages are sent substantially simultaneously.

In another embodiment, a method (e.g., a method for determining the order of plural vehicles in a consist) is provided that includes sending, from a first communication module disposed onboard a first vehicle of a vehicle consist, plural first individual messages to corresponding plural second vehicles of the vehicle consist. The method also includes determining first message characteristic information corresponding to the second vehicles receiving the first individual messages. The method also includes determining, at an ordering determination module disposed onboard the first vehicle, a vehicle order of the consist using the first message characteristic information.

In another aspect, the method includes sending, from a second communication module disposed onboard one of the second vehicles of the vehicle consist, plural second individual messages to at least some of the other second vehicles or the first vehicle. The method may also include determining second message characteristic information corresponding to the at least some of the other second vehicles or the first vehicle receiving the second individual messages from the second communication module. The method may further include determining, at the one of the second vehicles, using the second message characteristic information, distance information corresponding to distances of the at least some of the other second vehicles or the first vehicle receiving the second individual messages from the second communication module, wherein the vehicle order of the consist is determined at the first vehicle using the distance information.

In another aspect, the first message characteristic information includes communication rate information corresponding to rates of communication of the first individual messages. In some embodiments, the communication rate information includes averaged communication rate information.

In another aspect, the method may further include configuring the individual messages specifically for measuring rates of communication.

In another aspect, the method may include sending the individual messages to the plural second vehicles via Ethernet over multiple unit (eMU) using modulated signals overlaid on a multiple unit (MU) line.

In another aspect, at least some of the plural first individual messages are sent substantially simultaneously.

In another embodiment, a tangible and non-transitory computer readable medium is provided that includes one or more computer software modules configured to direct a processor to send, from a first communication module disposed onboard a first vehicle of a vehicle consist, plural first individual messages to corresponding plural second vehicles of the vehicle consist. The one or more computer software modules are also configured to direct the processor to determine first message characteristic information corresponding to the second vehicles receiving the first individual messages. The one or more computer software modules are also configured to direct the processor to determine, at the first vehicle, a vehicle order of the consist using the first message characteristic information.

In another aspect, the one or more computer software modules are also configured to direct the processor to send, from a second communication module disposed onboard one of the second vehicles of the vehicle consist, plural second individual messages to at least some of the other second vehicles or the first vehicle, to determine second message characteristic information corresponding to the at least some of the other second vehicles or the first vehicle receiving the second individual messages from the second communication module, and to determine, at the one of the second vehicles, using the second message characteristic information, distance information corresponding to distances of the at least some of the other second vehicles or the first vehicle receiving the second individual messages from the second communication module. The processor is directed to determine, at the first vehicle, the vehicle order of the consist using the distance information.

In another aspect, the first message characteristic information includes communication rate information corresponding to rates of communication of the first individual messages. In some embodiments, the communication rate information includes averaged communication rate information.

In another aspect, the individual messages include messages configured specifically for measuring rates of communication.

In another aspect, at least some of the plural first individual messages are sent substantially simultaneously.

In setting up the vehicles in the vehicle consist to allow for at least one vehicle (e.g., a lead vehicle) to remotely control operations of one or more other vehicles in the vehicle consist (e.g., remote vehicles), the orientation of the remote vehicles relative to the lead vehicle may be determined so that commands send from the lead vehicle to the remote vehicle are correctly implemented. For example, the orientation of a remote vehicle may be input into a control unit of the remote vehicle and/or a lead vehicle so that, when a command signal is received from the lead vehicle or communicated from the lead vehicle, the command signal is interpreted by the remote vehicle to cause the remote vehicle to act to move in the same direction as the lead vehicle. If the lead and remote vehicle are facing the same direction (e.g., facing a common direction), then the command signal may be interpreted by the remote vehicle to cause a propulsion system of the remote vehicle to attempt to move in the same direction as the lead vehicle. With respect to vehicles having wheels, this may involve the remote vehicle rotating wheels of the remote vehicle in the same rotational direction (e.g., clockwise or counter-clockwise) as the lead vehicle.

But, if the lead and remote vehicles are facing opposite directions, then the command signal may be interpreted differently to cause the propulsion system of the remote vehicle to attempt to move in the same direction as the lead vehicle. With respect to vehicles having wheels, this may involve the remote vehicle rotating wheels of the remote vehicle in the opposite rotational direction as the lead vehicle.

In one embodiment, the vehicle consist may be a DP vehicle consist, with the orientations of the remote vehicles being designated as "short hood forward" (e.g., the remote vehicle is facing forward along a direction of travel) or "long hood forward" (e.g., the remote vehicle is facing rearward away from the direction of travel). To properly control the direction of the remote vehicles, direction control logic may need to be configured at control units of the remote vehicles to represent which direction the remote vehicles are facing relative to the lead vehicle. In one aspect, the direction of air flow in brake pipes of remote vehicles during initialization of the vehicles for DP operations may be monitored to automatically determine and set the orientation of the remote vehicles in the control units based on the direction of air flow. During an initial release of an air brake system prior to a brake pipe test (where flow of the air through the brake pipe extending through the vehicle consist is examined to ensure that the brake pipe is continuous along the length of the vehicle consist), the lead vehicle feeds air to the vehicle consist (and remote vehicles) via the brake pipe. The direction that the air flows along the brake pipe and through the vehicles in the vehicle consist comes from the direction of the lead vehicle. The remote vehicles can have a directional air flow sensor installed in the brake pipe to monitor the direction of air flow in the brake pipe. When the lead vehicle initiates the air brake release in preparation for the brake pipe test, the remote vehicles can monitor the direction of air flow in the brake pipe. The direction of air flow that is detected in the brake pipe can then be used to define the direction that the remote vehicle is facing. This direction may be used to automatically configure a control unit of the remote vehicle, which uses the direction to implement commands received from the lead vehicle, as described above.

Figure 25:
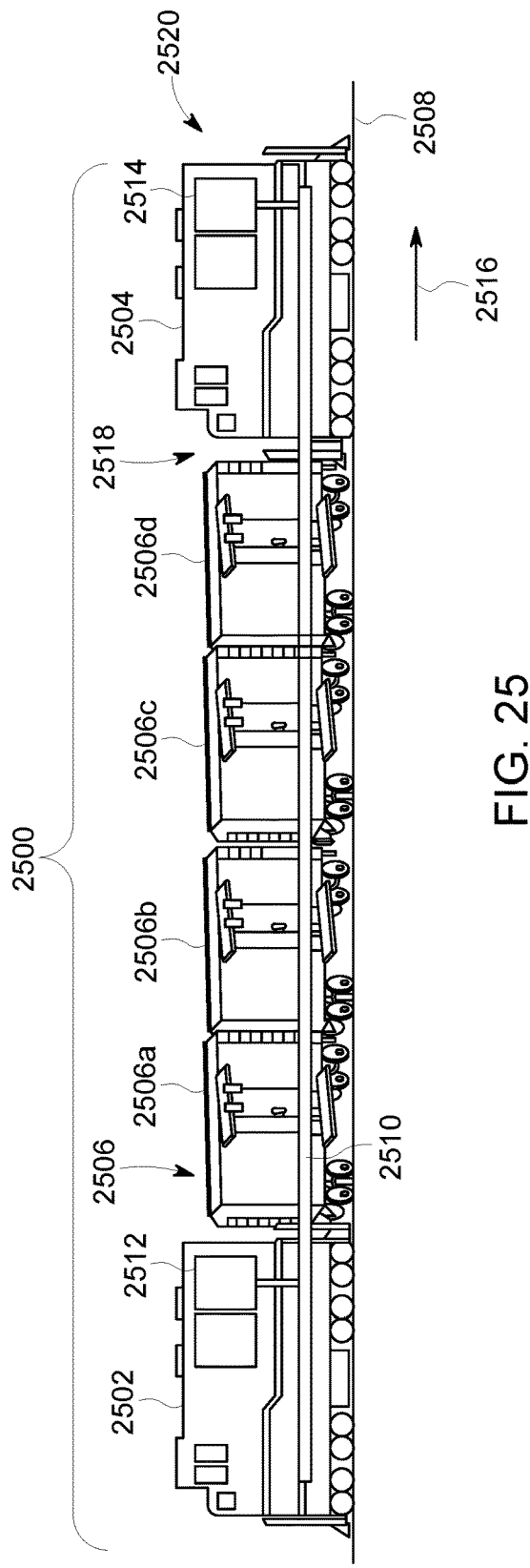
FIG. 25 is a schematic view of one embodiment of a vehicle consist.

FIG. 25 is a schematic view of one embodiment of a vehicle consist 2500. The illustrated vehicle consist 2500 includes propulsion-generating vehicles 2502, 2504 and non-propulsion-generating vehicles 2506 (e.g., vehicles 2506A-D) mechanically coupled with each other. The propulsion-generating vehicles 2502, 2504 are capable of self-propulsion while the non-propulsion-generating vehicles 2506 are not capable of self-propulsion. The propulsion-generating vehicles 2502, 2504 are shown as locomotives, the non-propulsion-generating vehicles 2506 are shown as rail cars, and the vehicle consist 2500 is shown as a train in the illustrated embodiment. Alternatively, the vehicles 2502, 2504 may represent other vehicles, such as automobiles, marine vessels, or the like, and the vehicle consist 2500 can represent a grouping or coupling of these other vehicles. The number and arrangement of the vehicles 2502, 2504, 2506 in the vehicle consist 2500 are provided as one example and are not intended as limitations on all embodiments of the inventive subject matter described herein.

The vehicles 2502, 2504 can be arranged in a distributed power (DP) arrangement. For example, the vehicles 2502, 2504 can include a lead vehicle 2502 that issues command messages to the other vehicles 2504, which are referred to herein as remote vehicles. The designations "lead" and "remote" are not intended to denote spatial locations of the vehicles 2502, 2504 in the vehicle consist 2500, but instead are used to indicate which vehicle 2502, 2504 is communicating (e.g., transmitting, broadcasting, or a combination of transmitting and broadcasting) operational command messages and which vehicles 2502, 2504 are being remotely controlled using the operational command messages. For example, the lead vehicle 2502 may or may not be disposed at the front end of the vehicle consist 2500 (e.g., along a direction of travel of the vehicle consist 2500). Additionally, the remote vehicle 2504 need not be separated from the lead vehicle 2502. For example, the remote vehicle 2504 may be directly coupled with the lead vehicle 2502 or may be separated from the lead vehicle 2502 by one or more other remote vehicles 2504 and/or vehicles 2506.

The operational command messages may include directives that direct operations of the remote vehicle 2504. These directives can include propulsion commands that direct propulsion systems of the remote vehicle 2504 to move in a designated location, at a designated speed, and/or power level, brake commands that direct the remote vehicles to apply brakes at a designated level, and/or other commands. The lead vehicle 2502 issues the command messages to coordinate the tractive efforts and/or braking efforts provided by the vehicles 2502, 2504 to propel the vehicle consist 2500 along a route 2508, such as a track, road, waterway, or the like.

The vehicle consist 2500 includes a fluid conduit 2510 extending along a length of the vehicle consist 2500. In one embodiment, the fluid conduit 2510 extends through at least parts of the propulsion-generating vehicles 2502, 2504. The fluid conduit 2510 can continuously extend through all the propulsion-generating vehicles 2502, 2504 in the vehicle consist 2500, or through less than all the propulsion-generating vehicles 2502, 2504. The fluid conduit 2510 can represent a brake pipe, such as an air brake pipe, or another conduit. For example, the fluid conduit 2510 can hold air that is stored in the conduit 2510 to prevent brake systems (described below) of the vehicles 2502, 2504 from engaging when the pressure of the air in the conduit 2510 is sufficiently large. But, when the pressure in the conduit 2510 falls below a designated threshold, the brake systems of the vehicles 2502, 2504 engage to slow or stop movement of the vehicle consist 2500. The fluid (e.g., air or other fluid) may be added to the conduit 2510 by a fluid source 2512. The fluid source 2512 may be a pump, reservoir, and/or the like, that supplies the fluid to the conduit 2510. The fluid source 25122512 is shown as being disposed onboard the lead vehicle 2502, but optionally may be disposed in another location of the vehicle consist 2500.

During set up of the vehicles 2502, 2504 for operation as the vehicle consist 2500, brake systems of the vehicle consist 2500 may be tested by reducing the fluid pressure in the conduit 2510 to see if the brake systems onboard the vehicles 2502, 2504 are engaged. The fluid source 2512 may then be activated to at least partially fill the conduit 2510 with fluid (e.g., air). As the conduit 2510 is at least partially filled with fluid, the fluid may flow from the fluid source 2512 along the length of the conduit 2510.

The flow of this fluid in the conduit 2510 may be sensed by one or more sensor assemblies 2514 in one or more of the remote vehicles 2504. The sensor assembly 2514 can detect which direction the fluid is flowing in the conduit 2510 within the remote vehicle 2504. Based on this direction, the remote vehicle 2504 can determine the orientation of the remote vehicle 2504. For example, in the illustrated embodiment, the sensor assembly 2514 can detect that the fluid is flowing in the conduit 2510 in a direction 2516 that points from a front end 2518 of the remote vehicle 2504 toward an opposite, back end 2520 of the remote vehicle 2504. A control unit (described below) of the remote vehicle 2504 can determine, based at least in part on this detected fluid flow, that the front end 2518 of the remote vehicle 2504 is facing the lead vehicle 2502 and/or that the back end 2520 of the remote vehicle 2504 is facing away from the lead vehicle 2502. The control unit of the remote vehicle 2504 may be programmed with the orientation of the lead vehicle 2502 (e.g., which direction the front end and/or back end of the lead vehicle 2502 is facing) so that the control unit can automatically determine the orientation of the remote vehicle 2504 relative to the lead vehicle 2502 based at least in part on the direction of fluid flow in the conduit 2510. In the illustrated embodiment, the control unit can determine that the lead vehicle 2502 and the remote vehicle 2504 are facing the same direction.

Figure 26:
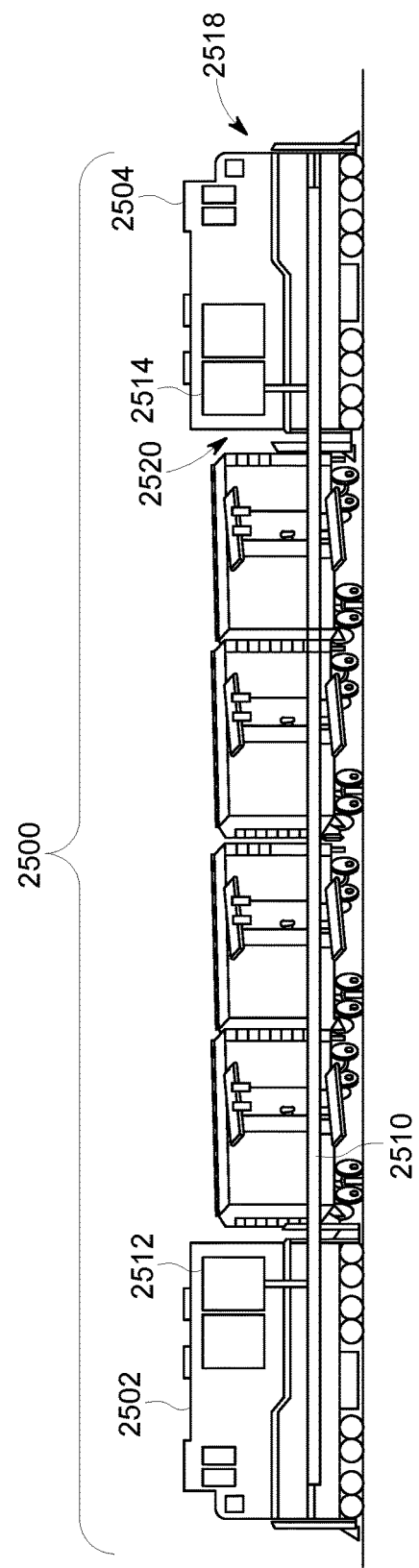
FIG. 26 is a schematic view of another embodiment of the vehicle consist shown in FIG. 25.

FIG. 26 is a schematic view of another embodiment of the vehicle consist 2500. In contrast to the embodiment shown in FIG. 25, the vehicle consist 2500 in FIG. 26 includes the remote vehicle 2504 facing in an opposite direction (e.g., away from the lead vehicle 2502). As the fluid source 2512 at least partially fills the conduit 2510 with fluid, the fluid may flow from the fluid source 2512 along the length of the conduit 2510 toward the remote vehicle 2504.

The flow of the fluid in the conduit 2510 is sensed by the sensor assembly 2514 in the remote vehicle 2504. Based on this direction, the remote vehicle 2504 can determine the orientation of the remote vehicle 2504. In the illustrated embodiment, the sensor assembly 2514 can detect that the fluid is flowing in the conduit 2510 in the direction 2516 that now points from the back end 2520 of the remote vehicle 2504 toward the front end 2518 of the remote vehicle 2504. While the fluid may flow in the same direction as in the embodiment shown in FIG. 25, because the remote vehicle 2504 is facing an opposite direction, the sensor assembly 2514 can determine that the flow of the fluid in the conduit 2510 is in an opposite direction in the remote vehicle 2504 when compared to the orientation shown in FIG. 25. The control unit of the remote vehicle 2504 may be programmed with the orientation of the lead vehicle 2502 so that the control unit can automatically determine that the lead vehicle 2502 and the remote vehicle 2504 are facing opposite directions.

Figure 27:
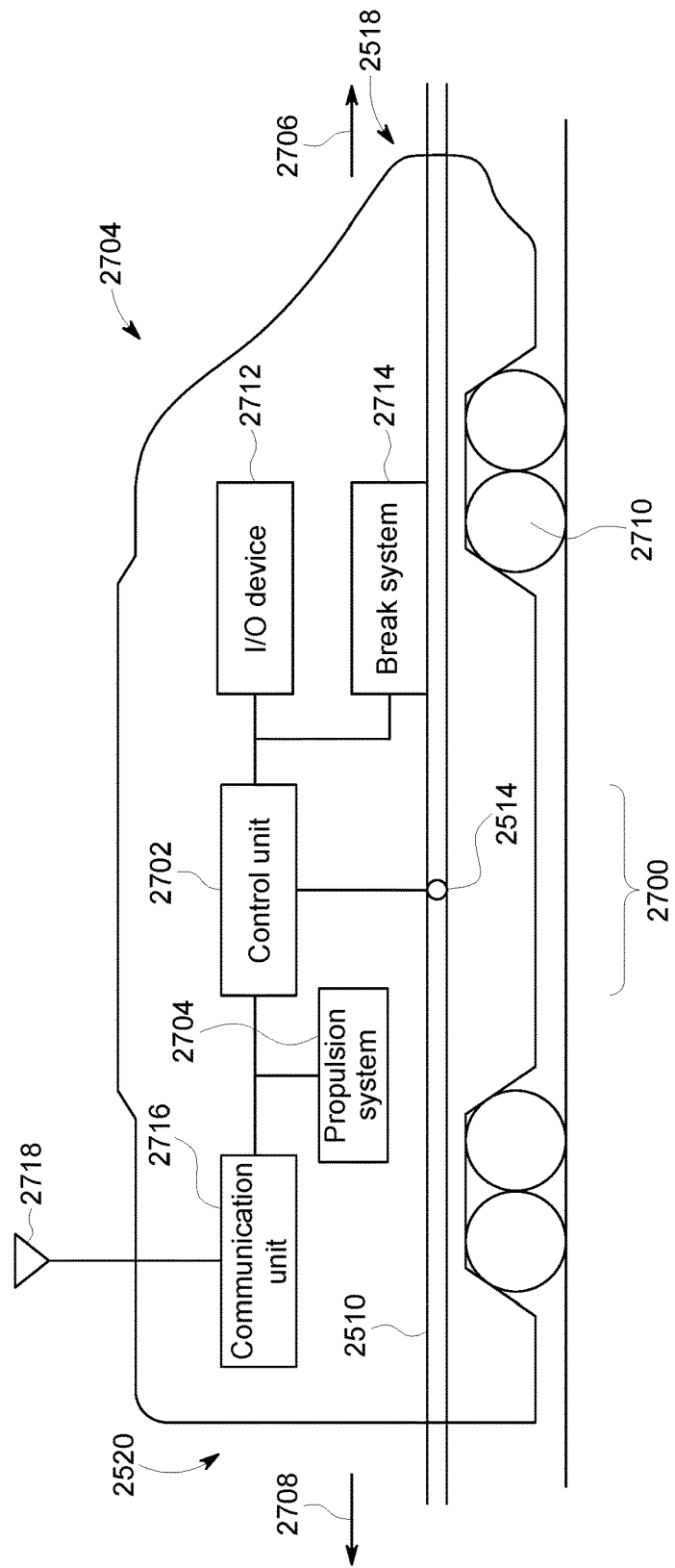
FIG. 27 is a schematic diagram of a remote vehicle shown in FIG. 25 in accordance with one embodiment.

FIG. 27 is a schematic diagram of the remote vehicle 2504 shown in FIG. 25 in accordance with one embodiment. The vehicle 2504 includes a monitoring system 2700 that determines the orientation of the vehicle 2504 relative to another vehicle 2502 (shown in FIG. 25) in the same vehicle consist 2500 (shown in FIG. 25) based at least in part on the direction of fluid flow in the fluid conduit 2510 extending into and/or through the vehicle 2504. The monitoring system 2700 includes the sensor assembly 2514 and a control unit 2702. The control unit 2702 can include or represent one or more hardware circuits or circuitry that include, are connected with, or that both include and are connected with one or more processors, controllers, or other hardware logic-based devices. The control unit 2702 can be used to control movement of the vehicle 2504, such as by receiving command signals from the lead vehicle 2502 and determining how to control a propulsion system 2704 to implement the command signals. For example, the control unit 2702 can receive a command signal that instructs the control unit 2702 to move the remote vehicle 2504 in a first direction 2706 or an opposite, second direction 2708. The control unit 2702 can refer to an orientation of the remote vehicle 2504 that is determined based on the direction of fluid flow in the conduit 2510 (as described above) and determine how to control the propulsion system 2704 to implement the command signal (e.g., how to cause the remote vehicle 2504 to move in the direction instructed by the command signal).

The propulsion system 2704 includes one or more engines, alternators, generators, batteries, transformers, motors (e.g., traction motors), gears, transmissions, axles, or the like, that work to generate movement of the vehicle 2504. The propulsion system 2704 is controlled by the control unit 2702 to move the vehicle 2504. In the illustrated embodiment, the propulsion system 2704 is operatively connected with wheels 2710 of the vehicle 2504 to rotate the wheels 2710 and cause movement of the vehicle 2504. Based on the command signal received at the remote vehicle 2504 and the orientation of the vehicle 2504, the control unit 2702 can determine how to instruct the propulsion system 2704 to move the vehicle 2504. For example, if the command signal instructs the vehicle 2504 to move in the direction 2706, then the control unit 2702 can refer to the orientation of the vehicle 2504 that is determined from the fluid flow in the conduit 2510 to determine if the front end 2518 is facing toward or away from the direction 2706 (and/or if the back end 2520 is facing toward or away from the direction 2706). In the illustrated embodiment, the control unit 2702 can control the propulsion system 2704 to rotate the wheels 2710 in a clockwise direction to move the vehicle 2504 in the direction 2706. But, if the command signal instructs the vehicle 2504 to move in the direction 2708, then the control unit 2702 can refer to the orientation of the vehicle 2504 to rotate the wheels 2710 in a counter-clockwise direction to move the vehicle 2504 in the direction 2708.

The sensor assembly 2514 can represent one or more sensors that generate output (e.g., one or more data signals) that is communicated to the control unit 2702 and that represents the direction in which fluid flows in the conduit 2510. In one aspect, the sensor assembly 2514 can represent one or more air flow meters, mass flow meters, or the like, that are disposed inside the conduit 2510 to detect a direction of the flow of the fluid in the conduit 2510. In another aspect, the sensor assembly 2514 can represent two or more sensors that measure characteristics of the fluid flowing in the conduit 2510 to determine the direction of fluid flow in the conduit 2510. For example, the sensor assembly 2514 can include two or more pressure transducers or other sensors that are sensitive to pressure in the conduit 2510. These transducers can be spaced apart sufficiently far that, as the fluid flows into the conduit 2510, a difference in pressure exists in the conduit 2510 between the locations of the transducers. This pressure differential can be output by the sensor assembly 2514 to the control unit 2702, and the control unit 2702 can examine the pressure differential to determine which direction the fluid is flowing in the conduit 2510. For example, the measured pressure may be larger upstream of the direction of fluid flow in the conduit 2510 than downstream of the direction of fluid flow.

In another embodiment, the sensor assembly 2514 represents one or more sensors disposed on the outside (e.g., exterior surface) of the conduit 2510. These sensors can monitor one or more characteristics of the conduit 2510, and changes in the one or more characteristics can be examined by the control unit 2702 to determine which direction the fluid is flowing in the conduit 2510. In one aspect, the one or more characteristics can include strain of the conduit 2510. The strain of the conduit 2510 can increase as the fluid is filling the conduit 2510. If the strain is larger in one section of the conduit 2510 than another, then the location of the larger strain relative to the location of the smaller strain (e.g., as measured by different sensors, such as strain gauges) can indicate the direction in which the fluid is flowing (e.g., flowing from the location of larger strain to the location of smaller strain).

In another aspect, the one or more characteristics can include temperatures of the conduit 2510. The temperature of the conduit 2510 can change as the fluid is filling the conduit 2510 and can be monitored by the sensor assembly 2514 (which can include thermocouples or other temperature-sensitive devices). Changes in the temperature can be compared with directions in which the fluid is flowing in the conduit 2510, and these changes and corresponding fluid flow directions can be stored in the control unit 2702 (or a memory that is accessible to the control unit 2702). The control unit 2702 can monitor the temperature changes detected by the sensor assembly 2514 and determine which direction the fluid is flowing in the conduit 2510 from the temperature changes.

In another aspect, the one or more characteristics can include sounds of the conduit 2510. The flow of fluid in the conduit 2510 can generate audible sounds that are detected by the sensor assembly 2514 (which can include microphones or other devices that are sensitive to sound). Sounds generated by the flow of fluid in the conduit 2510 can be previously examined, and these sounds and corresponding fluid flow directions can be stored in the control unit 2702 (or a memory that is accessible to the control unit 2702). The control unit 2702 can monitor the sounds detected by the sensor assembly 2514 and determine which direction the fluid is flowing in the conduit 2510 from the sounds.

The vehicle 2504 also includes one or more input and/or output devices 2712 ("I/O device" in FIG. 27). The control unit 2702 can receive manual input from an operator of the vehicle 2504 through the I/O device 2712, which may include a touchscreen, keyboard, electronic mouse, microphone, or the like. For example, the control unit 2702 can receive manually input changes to the tractive effort, braking effort, speed, power output, and the like, from the I/O device 2712. The control unit 2702 can present information to the operator using the I/O device 2712, which can include a display screen (e.g., touchscreen or other screen), speakers, printer, or the like.

The control unit 2702 can automatically input the orientation of the vehicle 2504 relative to the lead vehicle 2502 without operator intervention in one embodiment. For example, based on the direction of fluid flow in the conduit 2510, the control unit 2702 can determine the orientation of the vehicle 2504 and use this orientation to determine how to implement command messages received from the lead vehicle 2502 without operator intervention. Alternatively, the control unit 2702 can determine the orientation of the vehicle 2504 based on the direction of fluid flow and communicate the orientation to an onboard operator via the I/O device 2712 and/or to an operator disposed onboard the lead vehicle 2502 for confirmation of the orientation by the operator.

The control unit 2702 is operatively connected with a brake system 2714 of the vehicle 2504. The brake system 2714 can include and/or be fluidly coupled with the conduit 2510. As described above, changes in the fluid pressure in the conduit 2510 can engage or disengage the brake system 2714. The control unit 2702 also is operatively connected with a communication unit 2716. The communication unit 2716 includes or represents hardware and/or software that is used to communicate with other vehicles 2502 in the vehicle consist 2500. For example, the communication unit 2716 may include an antenna 2718, a transceiver, and/or associated circuitry for wirelessly communicating (e.g., communicating and/or receiving) command messages described above.

Figure 28:
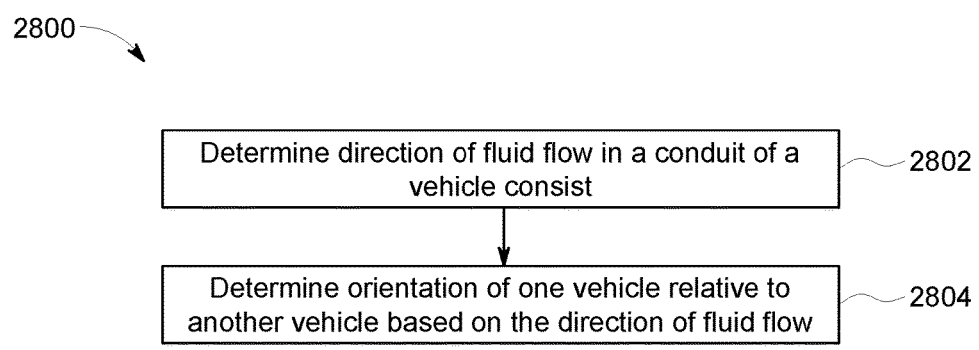
FIG. 28 illustrates a flowchart of a method for determining vehicle orientation according to one embodiment.

FIG. 28 illustrates a flowchart of a method 2800 for determining vehicle orientation according to one embodiment. The method 2800 can be performed by the monitoring system 2700 shown in FIG. 27. At 2802, a direction of fluid flowing in the conduit 2510 (shown in FIG. 25) of the vehicle consist 2500 (shown in FIG. 25) is determined. As described above, the direction of fluid flow can be measured in a location that is onboard the remote vehicle 2504 (shown in FIG. 25). Optionally, the direction of the fluid flow can be determined before the vehicle consist 2500 leaves to travel along the route 2508 (shown in FIG. 25). For example, the direction of the fluid flow can be determined while the vehicle consist 2500 is stationary. At 2804, the orientation of the remote vehicle 2504 relative to another vehicle (e.g., the lead vehicle 2502) is determined based at least in part on the direction of fluid flow. For example, the orientation can be determined as facing the same or opposite direction as the lead vehicle 2502.

As described above, this orientation can be used to determine how to implement command messages received by the lead vehicle 2502 to prevent the remote vehicle 2504 from working in an attempt to move the remote vehicle 2504 in an opposite direction as the lead vehicle 2502. Instead, the orientation can be used to ensure that the remote vehicle 2504 works to move the remote vehicle 2504 in the same direction as the lead vehicle 2502. In one embodiment, the vehicles 2502, 2504 may be communicatively linked with each other to allow the lead vehicle 2502 to remotely control movement of the remote vehicle 2504. The vehicles 2502, 2504 may be communicatively linked with each other using the orientation that is determined. For example, the vehicle 2504 may not accept command messages from the vehicle 2502 until the orientation of the vehicle 2504 is determined.

In one embodiment, a method (e.g., for determining an orientation of a vehicle) includes determining (with a sensor assembly disposed onboard a first vehicle that is included in a vehicle consist with a second vehicle) a direction in which a fluid flows within the first vehicle, and determining an orientation of the first vehicle relative to the second vehicle based at least in part on the direction in which the fluid flows within the first vehicle.

In one aspect, the fluid is in a brake system of the first vehicle.

In one aspect, determining the direction in which the fluid flows within the first vehicle occurs prior to the vehicle consist moving.

In one aspect, the orientation of the first vehicle represents whether the first vehicle and the second vehicle are facing a common direction or opposite directions.

In one aspect, the vehicle consist includes an air brake system that extends into the first vehicle and the second vehicle. Determining the direction in which the fluid flows can include determining the direction in which the fluid flows in the air brake system from the second vehicle to the first vehicle.

In one aspect, the method also includes communicatively linking the first vehicle with the second vehicle using the orientation that is determined so that the second vehicle can remotely control operation of the first vehicle.

In one aspect, determining the direction in which the fluid flows includes monitoring flow of the fluid using a sensor assembly that is disposed inside a brake pipe of the first vehicle.

In one aspect, determining the direction in which the fluid flows includes measuring one or more characteristics of a brake pipe of the first vehicle in a location that is external to the brake pipe and monitoring a change in the one or more characteristics of the brake pipe. The direction in which the fluid flows can be based at least in part on the change in the one or more characteristics of the brake pipe.

In one aspect, the one or more characteristics include at least one of strain, temperature, or sound.

In another embodiment, a system (e.g., a monitoring system) includes a sensor assembly and one or more processors. The sensor assembly is configured to generate an output representative of a direction in which a fluid flows within a first vehicle that is included in a vehicle consist with a second vehicle. The one or more processors are configured to determine an orientation of the first vehicle relative to the second vehicle based at least in part on the output generated by the sensor assembly.

In one aspect, the fluid is in a brake system of the first vehicle.

In one aspect, the one or more processors are configured to determine the direction in which the fluid flows within the first vehicle prior to the vehicle consist moving.

In one aspect, the one or more processors are configured to determine the orientation of the first vehicle as an indication of whether the first vehicle and the second vehicle are facing a common direction or opposite directions.

In one aspect, the vehicle consist includes an air brake system that extends into the first vehicle and the second vehicle. The one or more processors can be configured to determine the direction in which the fluid flows in the air brake system from the second vehicle to the first vehicle based on the output generated by the sensor assembly.

In one aspect, the one or more processors are configured to communicatively link the first vehicle with the second vehicle using the orientation that is determined so that the second vehicle can remotely control operation of the first vehicle.

In one aspect, the sensor assembly is configured to be disposed inside a brake pipe of the first vehicle and to generate the output based at least in part on the direction in which the fluid flows in the brake pipe.

In one aspect, the sensor assembly is configured to generate the output by measuring one or more characteristics of a brake pipe of the first vehicle in a location that is external to the brake pipe. The one or more processors can be configured to monitor the output generated by the sensor assembly for a change in the one or more characteristics of the brake pipe, wherein the one or more processors are configured to determine the direction in which the fluid flows based at least in part on the change in the one or more characteristics of the brake pipe.

In one aspect, the one or more characteristics include at least one of strain, temperature, or sound.

In another embodiment, another method (e.g., for determining an orientation of a vehicle) includes identifying a direction of air flow in an air brake pipe of a vehicle consist having a first vehicle and a second vehicle, and determining an orientation of the first vehicle relative to the second vehicle in the vehicle consist based at least in part on the direction of the air flow in the air brake pipe.

In one aspect, identifying the direction of air flow occurs onboard the first vehicle.

In another embodiment, a method comprises determining, with a sensor assembly disposed onboard a first vehicle that is included in a vehicle consist with a second vehicle, a direction in which a fluid flows within the first vehicle. The method further comprises determining an orientation of the first vehicle relative to the second vehicle based at least in part on the direction in which the fluid flows within the first vehicle. The first vehicle includes a first end, a distal second end, a first coupler located at the first end of the first vehicle and configured for selective coupling of the first vehicle to the second vehicle, and a second coupler located at the second end of the first vehicle and configured for selective coupling of the first vehicle to the second vehicle. (Selective coupling means the first and second ends of a vehicle are configured to be coupled to either of the first and second ends of another vehicle.) The second vehicle includes a first end, a distal second end, a third coupler located at the first end of the second vehicle and configured for selective coupling of the second vehicle to the first vehicle, and a fourth coupler located at the second end of the second vehicle and configured for selective coupling of the second vehicle to the first vehicle. The vehicle consist is operational for movement along a common direction of a route (e.g., along rails if the vehicle consist is a train or other rail vehicle consist) both when the first end of the second vehicle is coupled to the second end of the first vehicle such that the first end of the first vehicle and the first end of the second vehicle are facing in the common direction, and when the second end of the second vehicle is coupled to the second end of the first vehicle such that the first end of the first vehicle is facing in the common direction and the first end of the second vehicle is facing opposite the common direction. The orientation of the first vehicle that is determined relative to the second vehicle is whether the first end of the first vehicle and the first end of the second vehicle are facing in the common direction or whether the first end of the first vehicle is facing in the common direction and the first end of the second vehicle is facing opposite the common direction. That is, in instances where the orientation is unknown (e.g., unknown to a processor-based system configured to carry out the method), it is determined that the first end of the first vehicle and the first end of the second vehicle are facing in the common direction, when in actuality the vehicles are facing in the common direction, and it is determined that the first end of the first vehicle is facing in the common direction and the first end of the second vehicle is facing opposite the common direction, when in actuality that is the case. The fluid may be a brake system fluid, and in embodiments, the orientation is determined when the vehicles are not moving, e.g., are not moving yet but a control sequence has been initiated for the vehicles to commence moving at a future point in time.

In setting up the vehicles in the vehicle consist to allow for at least one vehicle (e.g., a lead vehicle) to remotely control operations of one or more other vehicles in the vehicle consist (e.g., remote vehicles), the orientation of the remote vehicles relative to the lead vehicle may be determined so that commands send from the lead vehicle to the remote vehicle are correctly implemented. For example, the orientation of a remote vehicle may be input into a control unit of the remote vehicle and/or a lead vehicle so that, when a command signal is received from the lead vehicle or communicated from the lead vehicle, the command signal is interpreted by the remote vehicle to cause the remote vehicle to act to move in the same direction as the lead vehicle. If the lead and remote vehicle are facing the same direction (e.g., facing a common direction), then the command signal may be interpreted by the remote vehicle to cause a propulsion system of the remote vehicle to attempt to move in the same direction as the lead vehicle. With respect to vehicles having wheels, this may involve the remote vehicle rotating wheels of the remote vehicle in the same rotational direction (e.g., clockwise or counter-clockwise) as the lead vehicle. But, if the lead and remote vehicles are facing opposite directions, then the command signal may be interpreted differently to cause the propulsion system of the remote vehicle to attempt to move in the same direction as the lead vehicle. With respect to vehicles having wheels, this may involve the remote vehicle rotating wheels of the remote vehicle in the opposite rotational direction as the lead vehicle.

In one embodiment, the vehicle consist may be a distributed power (DP) vehicle consist, with the orientations of the remote vehicles being designated as "short hood forward" (e.g., the remote vehicle is facing forward along a direction of travel) or "long hood forward" (e.g., the remote vehicle is facing rearward away from the direction of travel). In order to properly control the direction of the remote vehicles, direction control logic may need to be configured at control units of the remote vehicles to represent which direction the remote vehicles are facing relative to the lead vehicle. In one aspect, the direction of air flow in brake pipes of remote vehicles during initialization of the vehicles for DP operations may be monitored to automatically determine and set the orientation of the remote vehicles in the control units based on the direction of air flow. During an initial release of an air brake system prior to a brake pipe test (where flow of the air through the brake pipe extending through the vehicle consist is examined to ensure that the brake pipe is continuous along the length of the vehicle consist), the lead vehicle feeds air to the vehicle consist (and remote vehicles) via the brake pipe. The direction that the air flows along the brake pipe and through the vehicles in the vehicle consist comes from the direction of the lead vehicle. The remote vehicles can have a directional air flow sensor installed in the brake pipe to monitor the direction of air flow in the brake pipe. When the lead vehicle initiates the air brake release in preparation for the brake pipe test, the remote vehicles can monitor the direction of air flow in the brake pipe. The direction of air flow that is detected in the brake pipe can then be used to define the direction that the remote vehicle is facing. This direction may be used to automatically configure a control unit of the remote vehicle, which uses the direction to implement commands received from the lead vehicle, as described above.

FIG. 25 is a schematic view of one embodiment of a vehicle consist 2500. The illustrated vehicle consist 2500 includes propulsion-generating vehicles 2502, 2504 and non-propulsion-generating vehicles 2506 (e.g., vehicles 2506A-D) mechanically coupled with each other. The propulsion-generating vehicles 2502, 2504 are capable of self-propulsion while the non-propulsion-generating vehicles 2506 are not capable of self-propulsion. The propulsion-generating vehicles 2502, 2504 are shown as locomotives, the non-propulsion-generating vehicles 2506 are shown as rail cars, and the vehicle consist 2500 is shown as a train in the illustrated embodiment. Alternatively, the vehicles 2502, 2504 may represent other vehicles, such as automobiles, marine vessels, or the like, and the vehicle consist 2500 can represent a grouping or coupling of these other vehicles. The number and arrangement of the vehicles 2502, 2504, 2506 in the vehicle consist 2500 are provided as one example and are not intended as limitations on all embodiments of the inventive subject matter described herein.

The vehicles 2502, 2504 can be arranged in a distributed power (DP) arrangement. For example, the vehicles 2502, 2504 can include a lead vehicle 2502 that issues command messages to the other vehicles 2504, which are referred to herein as remote vehicles. The designations "lead" and "remote" are not intended to denote spatial locations of the vehicles 2502, 2504 in the vehicle consist 2500, but instead are used to indicate which vehicle 2502, 2504 is communicating (e.g., transmitting, broadcasting, or a combination of transmitting and broadcasting) operational command messages and which vehicles 2502, 2504 are being remotely controlled using the operational command messages. For example, the lead vehicle 2502 may or may not be disposed at the front end of the vehicle consist 2500 (e.g., along a direction of travel of the vehicle consist 2500). Additionally, the remote vehicle 2504 need not be separated from the lead vehicle 2502. For example, the remote vehicle 2504 may be directly coupled with the lead vehicle 2502 or may be separated from the lead vehicle 2502 by one or more other remote vehicles 2504 and/or vehicles 2506.

The operational command messages may include directives that direct operations of the remote vehicle 2504. These directives can include propulsion commands that direct propulsion systems of the remote vehicle 2504 to move in a designated location, at a designated speed, and/or power level, brake commands that direct the remote vehicles to apply brakes at a designated level, and/or other commands. The lead vehicle 2502 issues the command messages to coordinate the tractive efforts and/or braking efforts provided by the vehicles 2502, 2504 in order to propel the vehicle consist 2500 along a route 2508, such as a track, road, waterway, or the like.

The vehicle consist 2500 includes a fluid conduit 2510 extending along a length of the vehicle consist 2500. In one embodiment, the fluid conduit 2510 extends through at least parts of the propulsion-generating vehicles 2502, 2504. The fluid conduit 2510 can continuously extend through all the propulsion-generating vehicles 2502, 2504 in the vehicle consist 2500, or through less than all the propulsion-generating vehicles 2502, 2504. The fluid conduit 2510 can represent a brake pipe, such as an air brake pipe, or another conduit. For example, the fluid conduit 2510 can hold air that is stored in the conduit 2510 to prevent brake systems (described below) of the vehicles 2502, 2504 from engaging when the pressure of the air in the conduit 2510 is sufficiently large. But, when the pressure in the conduit 2510 falls below a designated threshold, the brake systems of the vehicles 2502, 2504 engage to slow or stop movement of the vehicle consist 2500. The fluid (e.g., air or other fluid) may be added to the conduit 2510 by a fluid source 2512. The fluid source 2512 may be a pump, reservoir, and/or the like, that supplies the fluid to the conduit 2510. The fluid source 25122512 is shown as being disposed onboard the lead vehicle 2502, but optionally may be disposed in another location of the vehicle consist 2500.

During set up of the vehicles 2502, 2504 for operation as the vehicle consist 2500, brake systems of the vehicle consist 2500 may be tested by reducing the fluid pressure in the conduit 2510 to see if the brake systems onboard the vehicles 2502, 2504 are engaged. The fluid source 2512 may then be activated to at least partially fill the conduit 2510 with fluid (e.g., air). As the conduit 2510 is at least partially filled with fluid, the fluid may flow from the fluid source 2512 along the length of the conduit 2510.

The flow of this fluid in the conduit 2510 may be sensed by one or more sensor assemblies 2514 in one or more of the remote vehicles 2504. The sensor assembly 2514 can detect which direction the fluid is flowing in the conduit 2510 within the remote vehicle 2504. Based on this direction, the remote vehicle 2504 can determine the orientation of the remote vehicle 2504. For example, in the illustrated embodiment, the sensor assembly 2514 can detect that the fluid is flowing in the conduit 2510 in a direction 2516 that points from a front end 2518 of the remote vehicle 2504 toward an opposite, back end 2520 of the remote vehicle 2504. A control unit (described below) of the remote vehicle 2504 can determine, based at least in part on this detected fluid flow, that the front end 2518 of the remote vehicle 2504 is facing the lead vehicle 2502 and/or that the back end 2520 of the remote vehicle 2504 is facing away from the lead vehicle 2502. The control unit of the remote vehicle 2504 may be programmed with the orientation of the lead vehicle 2502 (e.g., which direction the front end and/or back end of the lead vehicle 2502 is facing) so that the control unit can automatically determine the orientation of the remote vehicle 2504 relative to the lead vehicle 2502 based at least in part on the direction of fluid flow in the conduit 2510. In the illustrated embodiment, the control unit can determine that the lead vehicle 2502 and the remote vehicle 2504 are facing the same direction.

FIG. 26 is a schematic view of another embodiment of the vehicle consist 2500. In contrast to the embodiment shown in FIG. 25, the vehicle consist 2500 in FIG. 26 includes the remote vehicle 2504 facing in an opposite direction (e.g., away from the lead vehicle 2502). As the fluid source 2512 at least partially fills the conduit 2510 with fluid, the fluid may flow from the fluid source 2512 along the length of the conduit 2510 toward the remote vehicle 2504.

The flow of the fluid in the conduit 2510 is sensed by the sensor assembly 2514 in the remote vehicle 2504. Based on this direction, the remote vehicle 2504 can determine the orientation of the remote vehicle 2504. In the illustrated embodiment, the sensor assembly 2514 can detect that the fluid is flowing in the conduit 2510 in the direction 2516 that now points from the back end 2520 of the remote vehicle 2504 toward the front end 2518 of the remote vehicle 2504. While the fluid may flow in the same direction as in the embodiment shown in FIG. 25, because the remote vehicle 2504 is facing an opposite direction, the sensor assembly 2514 can determine that the flow of the fluid in the conduit 2510 is in an opposite direction in the remote vehicle 2504 when compared to the orientation shown in FIG. 25. The control unit of the remote vehicle 2504 may be programmed with the orientation of the lead vehicle 2502 so that the control unit can automatically determine that the lead vehicle 2502 and the remote vehicle 2504 are facing opposite directions.

FIG. 27 is a schematic diagram of the remote vehicle 2504 shown in FIG. 25 in accordance with one embodiment. The vehicle 2504 includes a monitoring system 2700 that determines the orientation of the vehicle 2504 relative to another vehicle 2502 (shown in FIG. 25) in the same vehicle consist 2500 (shown in FIG. 25) based at least in part on the direction of fluid flow in the fluid conduit 2510 extending into and/or through the vehicle 2504. The monitoring system 2700 includes the sensor assembly 2514 and a control unit 2702. The control unit 2702 can include or represent one or more hardware circuits or circuitry that include, are connected with, or that both include and are connected with one or more processors, controllers, or other hardware logic-based devices. The control unit 2702 can be used to control movement of the vehicle 2504, such as by receiving command signals from the lead vehicle 2502 and determining how to control a propulsion system 2704 to implement the command signals. For example, the control unit 2702 can receive a command signal that instructs the control unit 2702 to move the remote vehicle 2504 in a first direction 2706 or an opposite, second direction 2708. The control unit 2702 can refer to an orientation of the remote vehicle 2504 that is determined based on the direction of fluid flow in the conduit 2510 (as described above) and determine how to control the propulsion system 2704 to implement the command signal (e.g., how to cause the remote vehicle 2504 to move in the direction instructed by the command signal).

The propulsion system 2704 includes one or more engines, alternators, generators, batteries, transformers, motors (e.g., traction motors), gears, transmissions, axles, or the like, that work to generate movement of the vehicle 2504. The propulsion system 2704 is controlled by the control unit 2702 to move the vehicle 2504. In the illustrated embodiment, the propulsion system 2704 is operatively connected with wheels 2710 of the vehicle 2504 to rotate the wheels 2710 and cause movement of the vehicle 2504. Based on the command signal received at the remote vehicle 2504 and the orientation of the vehicle 2504, the control unit 2702 can determine how to instruct the propulsion system 2704 to move the vehicle 2504. For example, if the command signal instructs the vehicle 2504 to move in the direction 2706, then the control unit 2702 can refer to the orientation of the vehicle 2504 that is determined from the fluid flow in the conduit 2510 to determine if the front end 2518 is facing toward or away from the direction 2706 (and/or if the back end 2520 is facing toward or away from the direction 2706). In the illustrated embodiment, the control unit 2702 can control the propulsion system 2704 to rotate the wheels 2710 in a clockwise direction to move the vehicle 2504 in the direction 2706. But, if the command signal instructs the vehicle 2504 to move in the direction 2708, then the control unit 2702 can refer to the orientation of the vehicle 2504 to rotate the wheels 2710 in a counter-clockwise direction to move the vehicle 2504 in the direction 2708.

The sensor assembly 2514 can represent one or more sensors that generate output (e.g., one or more data signals) that is communicated to the control unit 2702 and that represents the direction in which fluid flows in the conduit 2510. In one aspect, the sensor assembly 2514 can represent one or more air flow meters, mass flow meters, or the like, that are disposed inside the conduit 2510 to detect a direction of the flow of the fluid in the conduit 2510. In another aspect, the sensor assembly 2514 can represent two or more sensors that measure characteristics of the fluid flowing in the conduit 2510 to determine the direction of fluid flow in the conduit 2510. For example, the sensor assembly 2514 can include two or more pressure transducers or other sensors that are sensitive to pressure in the conduit 2510. These transducers can be spaced apart sufficiently far that, as the fluid flows into the conduit 2510, a difference in pressure exists in the conduit 2510 between the locations of the transducers. This pressure differential can be output by the sensor assembly 2514 to the control unit 2702, and the control unit 2702 can examine the pressure differential to determine which direction the fluid is flowing in the conduit 2510. For example, the measured pressure may be larger upstream of the direction of fluid flow in the conduit 2510 than downstream of the direction of fluid flow.

In another embodiment, the sensor assembly 2514 represents one or more sensors disposed on the outside (e.g., exterior surface) of the conduit 2510. These sensors can monitor one or more characteristics of the conduit 2510, and changes in the one or more characteristics can be examined by the control unit 2702 to determine which direction the fluid is flowing in the conduit 2510. In one aspect, the one or more characteristics can include strain of the conduit 2510. The strain of the conduit 2510 can increase as the fluid is filling the conduit 2510. If the strain is larger in one section of the conduit 2510 than another, then the location of the larger strain relative to the location of the smaller strain (e.g., as measured by different sensors, such as strain gauges) can indicate the direction in which the fluid is flowing (e.g., flowing from the location of larger strain to the location of smaller strain).

In another aspect, the one or more characteristics can include temperatures of the conduit 2510. The temperature of the conduit 2510 can change as the fluid is filling the conduit 2510 and can be monitored by the sensor assembly 2514 (which can include thermocouples or other temperature-sensitive devices). Changes in the temperature can be compared with directions in which the fluid is flowing in the conduit 2510, and these changes and corresponding fluid flow directions can be stored in the control unit 2702 (or a memory that is accessible to the control unit 2702). The control unit 2702 can monitor the temperature changes detected by the sensor assembly 2514 and determine which direction the fluid is flowing in the conduit 2510 from the temperature changes.

In another aspect, the one or more characteristics can include sounds of the conduit 2510. The flow of fluid in the conduit 2510 can generate audible sounds that are detected by the sensor assembly 2514 (which can include microphones or other devices that are sensitive to sound). Sounds generated by the flow of fluid in the conduit 2510 can be previously examined, and these sounds and corresponding fluid flow directions can be stored in the control unit 2702 (or a memory that is accessible to the control unit 2702). The control unit 2702 can monitor the sounds detected by the sensor assembly 2514 and determine which direction the fluid is flowing in the conduit 2510 from the sounds.

The vehicle 2504 also includes one or more input and/or output devices 2712 ("I/O device" in FIG. 27). The control unit 2702 can receive manual input from an operator of the vehicle 2504 through the I/O device 2712, which may include a touchscreen, keyboard, electronic mouse, microphone, or the like. For example, the control unit 2702 can receive manually input changes to the tractive effort, braking effort, speed, power output, and the like, from the I/O device 2712. The control unit 2702 can present information to the operator using the I/O device 2712, which can include a display screen (e.g., touchscreen or other screen), speakers, printer, or the like.

The control unit 2702 can automatically input the orientation of the vehicle 2504 relative to the lead vehicle 2502 without operator intervention in one embodiment. For example, based on the direction of fluid flow in the conduit 2510, the control unit 2702 can determine the orientation of the vehicle 2504 and use this orientation to determine how to implement command messages received from the lead vehicle 2502 without operator intervention. Alternatively, the control unit 2702 can determine the orientation of the vehicle 2504 based on the direction of fluid flow and communicate the orientation to an onboard operator via the I/O device 2712 and/or to an operator disposed onboard the lead vehicle 2502 for confirmation of the orientation by the operator.

The control unit 2702 is operatively connected with a brake system 2714 of the vehicle 2504. The brake system 2714 can include and/or be fluidly coupled with the conduit 2510. As described above, changes in the fluid pressure in the conduit 2510 can engage or disengage the brake system 2714. The control unit 2702 also is operatively connected with a communication unit 2716. The communication unit 2716 includes or represents hardware and/or software that is used to communicate with other vehicles 2502 in the vehicle consist 2500. For example, the communication unit 2716 may include an antenna 2718, a transceiver, and/or associated circuitry for wirelessly communicating (e.g., communicating and/or receiving) command messages described above.

FIG. 28 illustrates a flowchart of a method 2800 for determining vehicle orientation according to one embodiment. The method 2800 can be performed by the monitoring system 2700 shown in FIG. 27. At 2802, a direction of fluid flowing in the conduit 2510 (shown in FIG. 25) of the vehicle consist 2500 (shown in FIG. 25) is determined. As described above, the direction of fluid flow can be measured in a location that is onboard the remote vehicle 2504 (shown in FIG. 25). Optionally, the direction of the fluid flow can be determined before the vehicle consist 2500 leaves to travel along the route 2508 (shown in FIG. 25). For example, the direction of the fluid flow can be determined while the vehicle consist 2500 is stationary. At 2804, the orientation of the remote vehicle 2504 relative to another vehicle (e.g., the lead vehicle 2502) is determined based at least in part on the direction of fluid flow. For example, the orientation can be determined as facing the same or opposite direction as the lead vehicle 2502.

As described above, this orientation can be used to determine how to implement command messages received by the lead vehicle 2502 to prevent the remote vehicle 2504 from working in an attempt to move the remote vehicle 2504 in an opposite direction as the lead vehicle 2502. Instead, the orientation can be used to ensure that the remote vehicle 2504 works to move the remote vehicle 2504 in the same direction as the lead vehicle 2502. In one embodiment, the vehicles 2502, 2504 may be communicatively linked with each other to allow the lead vehicle 2502 to remotely control movement of the remote vehicle 2504. The vehicles 2502, 2504 may be communicatively linked with each other using the orientation that is determined. For example, the vehicle 2504 may not accept command messages from the vehicle 2502 until the orientation of the vehicle 2504 is determined.

In one embodiment, a method (e.g., for determining an orientation of a vehicle) includes determining (with a sensor assembly disposed onboard a first vehicle that is included in a vehicle consist with a second vehicle) a direction in which a fluid flows within the first vehicle, and determining an orientation of the first vehicle relative to the second vehicle based at least in part on the direction in which the fluid flows within the first vehicle.

In one aspect, the fluid is in a brake system of the first vehicle.

In one aspect, determining the direction in which the fluid flows within the first vehicle occurs prior to the vehicle consist moving.

In one aspect, the orientation of the first vehicle represents whether the first vehicle and the second vehicle are facing a common direction or opposite directions.

In one aspect, the vehicle consist includes an air brake system that extends into the first vehicle and the second vehicle. Determining the direction in which the fluid flows can include determining the direction in which the fluid flows in the air brake system from the second vehicle to the first vehicle.

In one aspect, the method also includes communicatively linking the first vehicle with the second vehicle using the orientation that is determined so that the second vehicle can remotely control operation of the first vehicle.

In one aspect, determining the direction in which the fluid flows includes monitoring flow of the fluid using a sensor assembly that is disposed inside a brake pipe of the first vehicle.

In one aspect, determining the direction in which the fluid flows includes measuring one or more characteristics of a brake pipe of the first vehicle in a location that is external to the brake pipe and monitoring a change in the one or more characteristics of the brake pipe. The direction in which the fluid flows can be based at least in part on the change in the one or more characteristics of the brake pipe.

In one aspect, the one or more characteristics include at least one of strain, temperature, or sound.

In another embodiment, a system (e.g., a monitoring system) includes a sensor assembly and one or more processors. The sensor assembly is configured to generate an output representative of a direction in which a fluid flows within a first vehicle that is included in a vehicle consist with a second vehicle. The one or more processors are configured to determine an orientation of the first vehicle relative to the second vehicle based at least in part on the output generated by the sensor assembly.

In one aspect, the fluid is in a brake system of the first vehicle.

In one aspect, the one or more processors are configured to determine the direction in which the fluid flows within the first vehicle prior to the vehicle consist moving.

In one aspect, the one or more processors are configured to determine the orientation of the first vehicle as an indication of whether the first vehicle and the second vehicle are facing a common direction or opposite directions.

In one aspect, the vehicle consist includes an air brake system that extends into the first vehicle and the second vehicle. The one or more processors can be configured to determine the direction in which the fluid flows in the air brake system from the second vehicle to the first vehicle based on the output generated by the sensor assembly.

In one aspect, the one or more processors are configured to communicatively link the first vehicle with the second vehicle using the orientation that is determined so that the second vehicle can remotely control operation of the first vehicle.

In one aspect, the sensor assembly is configured to be disposed inside a brake pipe of the first vehicle and to generate the output based at least in part on the direction in which the fluid flows in the brake pipe.

In one aspect, the sensor assembly is configured to generate the output by measuring one or more characteristics of a brake pipe of the first vehicle in a location that is external to the brake pipe. The one or more processors can be configured to monitor the output generated by the sensor assembly for a change in the one or more characteristics of the brake pipe, wherein the one or more processors are configured to determine the direction in which the fluid flows based at least in part on the change in the one or more characteristics of the brake pipe.

In one aspect, the one or more characteristics include at least one of strain, temperature, or sound.

In another embodiment, another method (e.g., for determining an orientation of a vehicle) includes identifying a direction of air flow in an air brake pipe of a vehicle consist having a first vehicle and a second vehicle, and determining an orientation of the first vehicle relative to the second vehicle in the vehicle consist based at least in part on the direction of the air flow in the air brake pipe.

In one aspect, identifying the direction of air flow occurs onboard the first vehicle.

In another embodiment, a method comprises determining, with a sensor assembly disposed onboard a first vehicle that is included in a vehicle consist with a second vehicle, a direction in which a fluid flows within the first vehicle. The method further comprises determining an orientation of the first vehicle relative to the second vehicle based at least in part on the direction in which the fluid flows within the first vehicle. The first vehicle includes a first end, a distal second end, a first coupler located at the first end of the first vehicle and configured for selective coupling of the first vehicle to the second vehicle, and a second coupler located at the second end of the first vehicle and configured for selective coupling of the first vehicle to the second vehicle. (Selective coupling means the first and second ends of a vehicle are configured to be coupled to either of the first and second ends of another vehicle.) The second vehicle includes a first end, a distal second end, a third coupler located at the first end of the second vehicle and configured for selective coupling of the second vehicle to the first vehicle, and a fourth coupler located at the second end of the second vehicle and configured for selective coupling of the second vehicle to the first vehicle. The vehicle consist is operational for movement along a common direction of a route (e.g., along rails if the vehicle consist is a train or other rail vehicle consist) both when the first end of the second vehicle is coupled to the second end of the first vehicle such that the first end of the first vehicle and the first end of the second vehicle are facing in the common direction, and when the second end of the second vehicle is coupled to the second end of the first vehicle such that the first end of the first vehicle is facing in the common direction and the first end of the second vehicle is facing opposite the common direction. The orientation of the first vehicle that is determined relative to the second vehicle is whether the first end of the first vehicle and the first end of the second vehicle are facing in the common direction or whether the first end of the first vehicle is facing in the common direction and the first end of the second vehicle is facing opposite the common direction. That is, in instances where the orientation is unknown (e.g., unknown to a processor-based system configured to carry out the method), it is determined that the first end of the first vehicle and the first end of the second vehicle are facing in the common direction, when in actuality the vehicles are facing in the common direction, and it is determined that the first end of the first vehicle is facing in the common direction and the first end of the second vehicle is facing opposite the common direction, when in actuality that is the case. The fluid may be a brake system fluid, and in embodiments, the orientation is determined when the vehicles are not moving, e.g., are not moving yet but a control sequence has been initiated for the vehicles to commence moving at a future point in time.

One or more embodiments of the inventive subject matter relate to communication systems and methods for a vehicle consist comprising a plurality of vehicles. For example, according to one aspect, subsequent to the vehicles being linked in a data network, a first vehicle of the plurality of vehicles is designated as a network lead vehicle of the data network. As noted above, "network lead vehicle" means a vehicle in the consist that is primarily responsible for controlling operations of the data network in the consist, for example, "network lead rail vehicle" (e.g., network lead locomotive) refers to a locomotive or other rail vehicle in the consist that is primarily responsible for controlling operations of the data network in the consist. Further, a second vehicle of the plurality of vehicles is designated as a network trail vehicle of the data network. As also noted above, "network trail vehicle" means a vehicle in the consist that is subordinate to the network lead vehicle in regards to one or more aspects of data network operation, for example "network trail rail vehicle" (e.g., network trail locomotive) refers to a locomotive or other rail vehicle in the consist that is subordinate to the network lead rail vehicle in regards to one or more aspects of data network operation. Network data is communicated between the plurality of vehicles based at least in part on the first vehicle designated as the network lead vehicle and the second vehicle designated as the network trail vehicle. Thus, in the case of locomotives in a rail vehicle consist (for example), embodiments of the inventive subject matter establish an operative communication network across the consist through which the locomotives may effectively communicate with one another, including managing services and devices deployed on locomotives across the consist.

Reference will be made below in detail to example embodiments of the inventive subject matter, examples of which are illustrated in the accompanying drawings. Wherever possible, the same reference numerals used throughout the drawings refer to the same or like parts. Although example embodiments of the inventive subject matter are described with respect to trains, locomotives, and other rail vehicles, embodiments of the inventive subject matter are also applicable for use with vehicles generally, such as off-highway vehicles, agricultural vehicles, and/or transportation vehicles, each of which may be included in a vehicle consist. As noted above, a vehicle consist (e.g., locomotive consist) is a group of vehicles (e.g., locomotives) that are mechanically coupled or linked together to travel along a route, with each vehicle in the consist being adjacent to one or more other vehicles in the consist.

Figure 29:
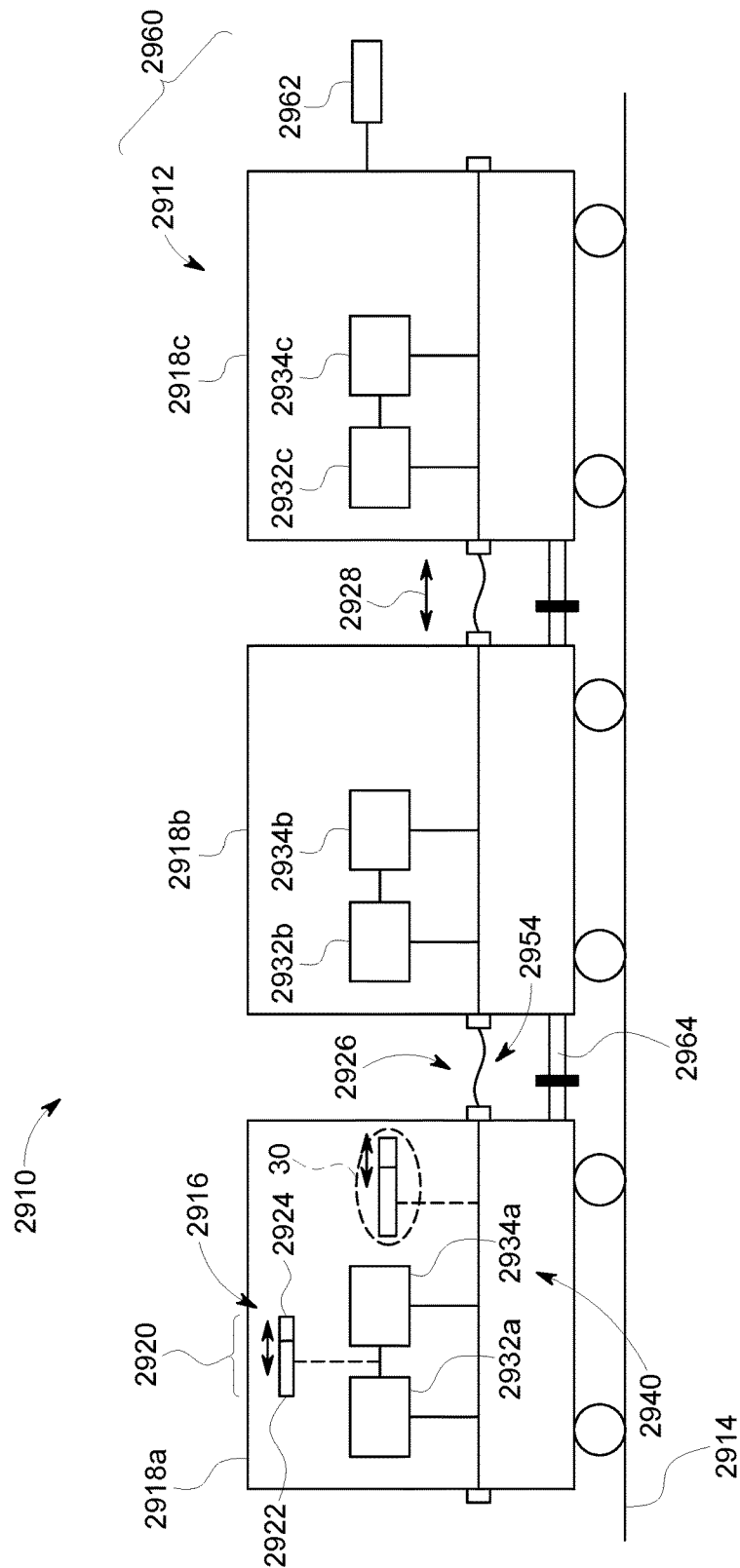
FIG. 29 is a schematic diagram of a communication system for communicating data in a vehicle consist, according to one embodiment.

With reference to FIG. 29, an example communication system 2910 for communicating data in a vehicle consist 2912 is shown. The consist 2912 may be configured to travel along a route 2914, for example. In the system 2910, network data 2916 is transmitted from one vehicle 2918a in the consist 2912 (e.g., a lead vehicle 2918a) to one or more other vehicles 2918b, 2918c in the consist (e.g., a trail vehicle 2918b and/or 2918c). Each vehicle 2918a-2918c is adjacent to and mechanically coupled with another vehicle in the consist 2912 such that all vehicles in the consist are connected (directly or indirectly by way of one or more non-propulsion-generating vehicles). Network data 2916 is data that is packaged in packet form, meaning a data packet that comprises a set of associated data bits 2920, e.g., Ethernet-formatted data packets. (Each data packet may include a data field 2922 and a network address or other address 2924 uniquely or otherwise associated with a computer unit or other electronic component in the consist 2912.) The network data 2916 is transmitted over a locomotive multiple unit (MU) cable bus 2926. The MU cable bus 2926 is an existing electrical bus interconnecting the lead vehicle 2918a and the trail vehicles 2918b, 2918c in the consist. The MU cable bus 2926 is used in the consist 2912 for transferring non-network control information 2928 between vehicles in the consist. Non-network control information 2928 is data or other information, used in the vehicle consist for control purposes, which is not packet data. In another aspect, non-network control information 2928 is not packet data, and does not include recipient network addresses.

One example of an MU cable bus is shown in more detail and described in connection with FIGS. 22 and 23.

As indicated in FIG. 29, the vehicle consist 2912 may be part of a larger vehicle system 2960 that includes the vehicle consist 2912, a plurality of non-propulsion-generating vehicles 2962, and possibly additional vehicles or vehicle consists (not shown). Each propulsion-generating vehicle 2918a-2918c in the consist 2912 is mechanically coupled to at least one other, adjacent vehicle in the consist 2912, through a coupler 2964. The non-propulsion-generating vehicles 2962 are similarly mechanically coupled together and to the locomotive consist to form a series of linked vehicles. Alternatively, two or more of the vehicles in the vehicle system and/or vehicle consist may not be mechanically linked (directly or indirectly) with each other, but may be logically coupled with each other. For example, these vehicles may not be mechanically connected, but may communicate with each other to coordinate the movements of the vehicles with each other so that the vehicles travel together along the route. The non-network control information may be used for vehicle control purposes or for other control purposes in the train 2960.

The communication system 2910 may comprise respective router transceiver units 2934a, 2934b, 2934c positioned in the lead vehicle 2918a and each of the trail vehicles 2918b, 2918c in the vehicle consist 2912. The router transceiver units 2934a, 2934b, 2934c are each electrically coupled to the MU cable bus 2926. The router transceiver units 2934a, 2934b, 2934c are configured to transmit and/or receive network data 2916 over the MU cable bus 2926.

The communications system 2910 shown in FIG. 29 is intended to be illustrative of a communications system that may be utilized in connection with the embodiments of the inventive subject matter disclosed below. While this Ethernet over MU communications system (that utilizes an existing MU cable bus that interconnects the lead vehicle and the trail vehicles) may be utilized in connection with the embodiments of the inventive subject matter described below, the embodiments are not limited to use with an Ethernet over MU system. The embodiments of the inventive subject matter described below may also be employed and utilized in connection with a wireless communications system, such as one using radio equipment to facilitate communication between vehicles in the consist. Additionally, the embodiments described below may also be used with a communication system that utilizes dedicated network cables between the linked vehicles in a consist.

Figure 30:
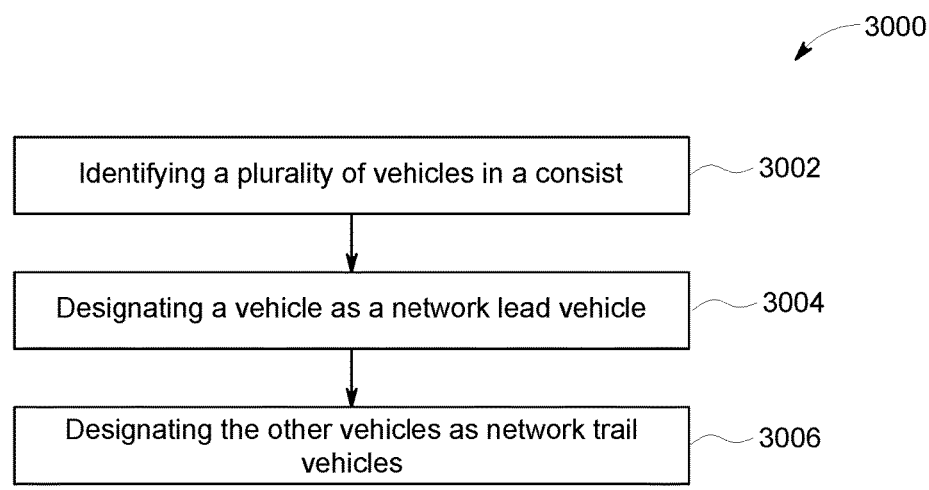
FIG. 30 is a flowchart illustrating an example method for establishing a network across a plurality of vehicles in a consist, according to one embodiment.

Embodiments of the inventive subject matter relate to a system and method for determining the network lead vehicle among a plurality of vehicles in a consist. In an embodiment, the vehicles may be locomotives, although the system and method may also be used in connection with other vehicles and non-rail vehicles. FIG. 30 illustrates an example method 3000 for establishing a network across a plurality of vehicles in a consist, according to one embodiment of the inventive subject matter.

In embodiments, a network lead vehicle is designated to configure all the services for a respective data network of the vehicles in the consist, and may be responsible for signal/traffic coordination for various devices on board each vehicle. In an embodiment, when a vehicle is by itself such that there are no other vehicles in communication with the vehicle in a vehicle system or other vehicle consist, the vehicle is designated as the network lead vehicle. As the network lead vehicle, the vehicle establishes a set of services and operations that the vehicle is capable of performing and manages this "network" of a single vehicle. The set of services established and managed by the vehicle may include conventional available devices, for example, 220 MHz radio gear and components for communication purposes and global positioning system and components, as well as horns, lights and other indicators and systems utilized during operation of the consist.

In another embodiment, the consist may include more than one vehicle that is capable of functioning as the network lead vehicle. As shown in FIG. 30, the method includes, at 3002, identifying a plurality of vehicles in the consist. In such an instance, the vehicles may be mechanically or logically coupled and in communication with one another, such as being linked through a multiple unit cable. If there is more than one "lead" vehicle, however, such as if a single network lead vehicle has not been designated, then a network conflict may arise which could cause network traffic and packets to be missed because of a trail vehicle attempting to find a lead vehicle or a lead vehicle trying to find a trail vehicle.

Accordingly, in consists containing more than one vehicle that is capable as functioning as a network lead vehicle, a determination is made as to which of the vehicles in the consist will be designated, and serve as, the network lead vehicle of the data network for the consist, at 3004.

In an embodiment, the network lead vehicle may be determined by one or more vehicle parameters or characteristics. In one embodiment, the parameter may be one or more positions of one or more of the vehicles in the consist. For example, the first vehicle in the consist may be designated the network lead vehicle of the data network based on the position of the vehicle at the head of the consist (relative to a direction of movement or scheduled movement of the consist). After designating a network lead vehicle, the remaining vehicles in the consist are designated network trail vehicles, at step 3006. In an embodiment, the operations of designating the network lead and trail vehicles may be carried out automatically subsequent or responsive to the vehicles being linked to establish the data network. In an embodiment, designating a vehicle as a network lead vehicle includes configuring the vehicle for operations as the network lead vehicle and communicating status information indicative of this designation as network lead to the other vehicles in the consist, and configuring the other vehicles in the consist as network trail vehicles.

In another embodiment, the lead network vehicle may be designated based on a temporal sequence of addition to the consist. If a data network already exists and has a designated network lead vehicle, other vehicles that are subsequently added to the consist may automatically be designated as trail vehicles.

In yet another embodiment, the network lead vehicle may be designated based upon movement of the vehicles in the consist, such as a global positioning system or otherwise determined direction of movement of the consist. In one embodiment, a vehicle may be designated as the network lead vehicle based on the vehicle being a leading vehicle of the consist in a designated direction of travel of the consist.

In other embodiments, the network lead vehicle may be designated after the consist begins moving based upon an algorithm. In this embodiment, global positioning system information (e.g., direction and speed), wheel speed information, vehicle engineer handle direction information and/or switch settings for lead/trail or headlight configuration may be utilized by the vehicles to determine and then designate lead and trail vehicles in the consist. In an embodiment, a wheel speed sensor may be utilized to detect and relay wheel speed to at least one available device, such as a controller, onboard at least one of the vehicles. The sensor may also be configured to sense a direction of the vehicle. With respect to engineer handle direction, e.g., handle position, in an embodiment, if the handle is in the forward position and the vehicle is travelling above a threshold speed, then the position of the locomotives from a global positioning system unit (e.g., receiver) can determine the front, middle and rear of the consist. Given this information, an algorithm can then determine and designate a lead vehicle and one or more trail vehicles.

In another embodiment, the vehicles within the consist, once linked to establish a data network, may communicate setup data to one another. One vehicle in the consist may then be designated as the network lead vehicle in the data network and other vehicles designated as network trail vehicles based on the setup data. Communication of the setup data may be carried out automatically subsequent or responsive to the vehicles being linked. In the event that another vehicle is subsequently added to the consist, setup data may be communicated between the added vehicle and a first vehicle in the consist (which may have been previously designated as network lead vehicle). Based upon the setup data, the added vehicle may be designated as an additional network trail vehicle. Alternatively, the added vehicle may be designated as the network lead vehicle in conjunction with designating the first vehicle as a network trail vehicle of the data network.

Once the vehicles have been linked to establish a data network, and lead and trail vehicles of the data network have been designated, network data may be communicated between the vehicles based at least in part on the one vehicle designated as the network lead vehicle and one or more other vehicles designated as network trail vehicles, as described hereinafter. As alluded to above, designating a single vehicle to serve as the network lead vehicle is important from a controls perspective. In an embodiment, the designated network lead vehicle may configure services available to entities in the data network and coordinate data traffic in the data network. The network lead vehicle may store, create and update the master routing tables relating to services of the respective vehicles in the consist and is also capable of transitioning services from one vehicle to another, such as from the network lead vehicle to one of the trail vehicles. In addition, the network trail vehicles may request overall network information from the network lead vehicle.

Moreover, by knowing the network lead vehicle, network services can be managed across the consist and traffic may be sent to lead or trail vehicles in the consist. For example, in an embodiment, a device on the network lead vehicle may want to utilize a radio on a trail vehicle because the radio on the lead vehicle is broken or otherwise non-functional. By recognizing that the radio of the lead vehicle is non-functional, and that a trail vehicle has a functioning radio, the network lead vehicle can route radio traffic to the functioning radio on board the trail vehicle to maintain desired functionality. In addition, the lead vehicle may update the master routing tables such that all radio traffic is routed to the functioning radio, as opposed to the currently non-functioning radio on board the lead vehicle.

In an embodiment, the consist data network is established and the network lead vehicle is automatically designated through the communication of the vehicles, as described above. Upon being placed in communication with one another, such as through a MU cable bus, dedicated network cables, through wireless communications, etc., the vehicles determine, according to a predetermined set of commands and in view of one or more vehicle parameters, as described above, which vehicle will be designated the network lead vehicle and which will then be designated trail vehicles.

Figure 31:
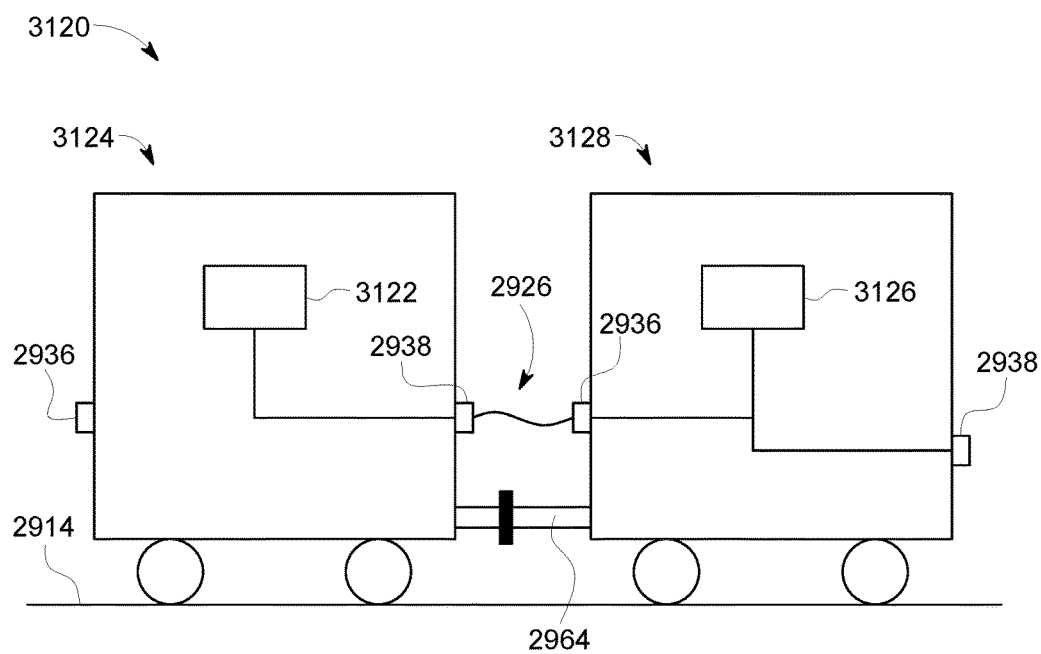
FIG. 31 is a schematic diagram of a system for establishing a network across a plurality of vehicles in a consist, according to one embodiment.

FIG. 31 is a schematic diagram of a system 3120 for establishing a network across a plurality of vehicles in a consist, according to an embodiment of the inventive subject matter. As shown therein, the system includes an electronic component such as a first controller unit 3122 positioned in a first vehicle 3124 in the consist, and a second electronic component such as a second controller 3126 unit positioned in a second vehicle 3128 in the consist and in communication with the first controller unit 29122922 in the first vehicle 3124. The first vehicle 3124 is adjacent to and mechanically coupled with the second vehicle 3128 though a coupler 2964, as described above. The first controller 3122 and second controller 3126 are configured to designate the network lead vehicle and network trail vehicle (s) according to at least one parameter of the vehicles in the consist, as described above.

In connection with this, the first controller 3122 is configured to designate one of the vehicles in the data network of the consist as a network lead vehicle of the data network and to designate all other vehicles in the consist as network trail vehicles of the data network. Moreover, the first controller unit is further configured to control communications of network data between the lead vehicle and trail vehicles based at least in part on the network lead vehicle and network trail vehicle designations. In connection with designating network lead and trail vehicles based on at least one parameter of the vehicles, the at least one parameter may be one or more of a position of a first vehicle relative to one or more other vehicles in the consist, a sequence of vehicles added to the consist, or an identification of which vehicle in the consist is a leading vehicle of the consist in a designated direction of travel.

In another embodiment, the first controller unit 3122 is configured to automatically control communication setup data between the first vehicle 3124 and one or more second vehicles 3128 after establishment of the data network in the consist. In addition, the first controller unit 3122 may designate the network lead vehicle and trail vehicle(s) based at least in part on the setup data. In an embodiment, information of the parameter (e.g., sequence of the vehicles added to the consist, or the like) may be included in the setup data.

Once network lead and trail vehicles are designated (regardless of the exact way such designations are effected) the first controller 3122 is adapted to configure services available to entities in the data network and to coordinate data traffic in the data network.

Figure 32:
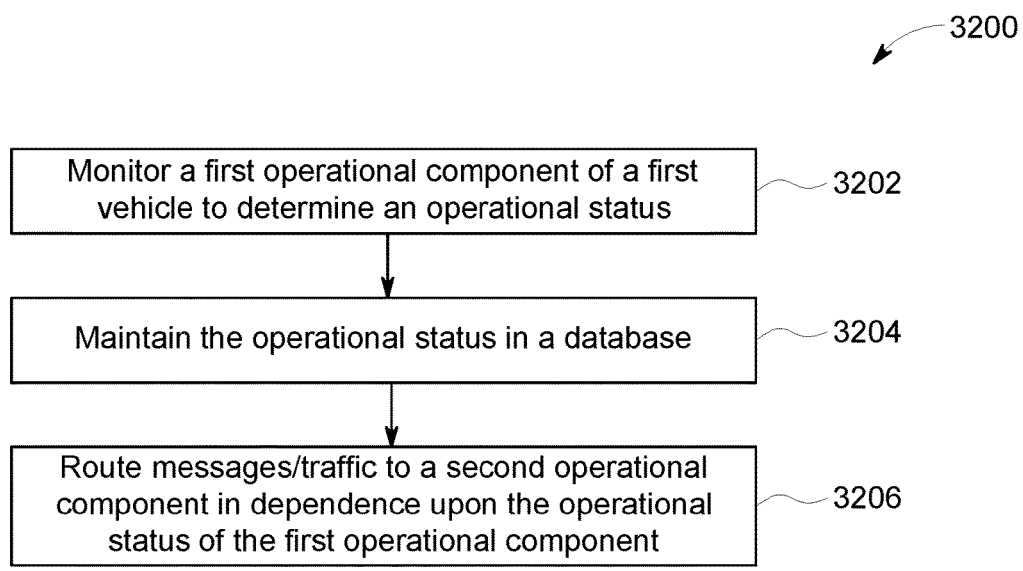
FIG. 32 is a flowchart illustrating an example method for managing network services among a plurality of networked vehicles in a consist, according to one embodiment.
Figure 33:
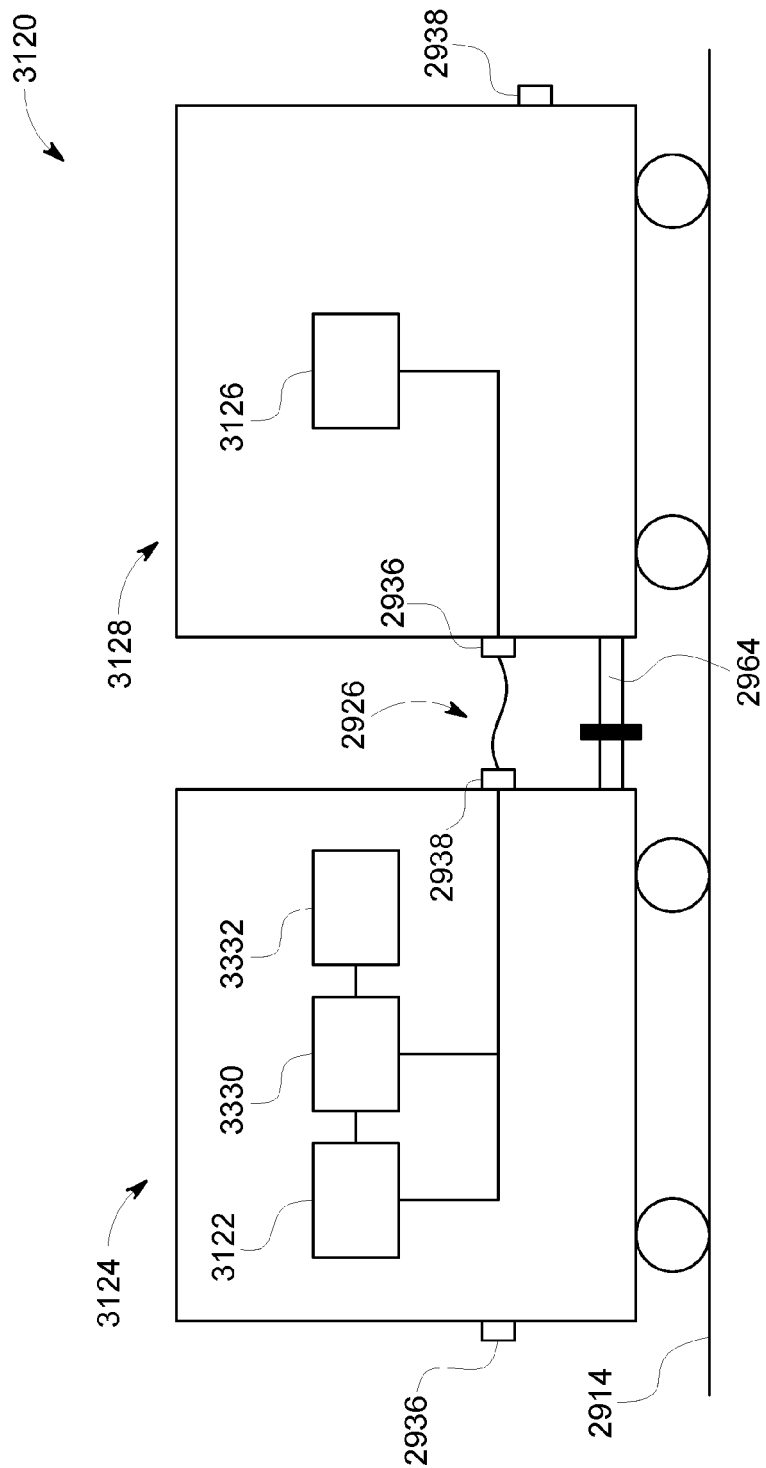
FIG. 33 is a schematic diagram of a system for managing network services among vehicles in a consist, according to one embodiment.

As shown in FIGS. 32 and 33, embodiments of the inventive subject matter also relate to a system and method for managing network services and devices among a plurality of vehicles in a consist. FIG. 32 illustrates an example method 3200 for managing network services among a plurality of networked vehicles in a consist, according to an embodiment of the inventive subject matter.

As described above, a vehicle consist includes a plurality of vehicles that are mechanically coupled or linked together to travel along a route and which are in communication with one another such that the vehicles function together as a single unit on a network. As further described above, the vehicles may be in communication with one another wirelessly, through dedicated network cables, through an MU cable bus interconnecting adjacent vehicles in the consist, etc. In this manner, the on-board available devices of the vehicles may be linked together as a computer data network such that the devices of the vehicles can communicate with one another. (As noted elsewhere herein, device refers to an electronic equipment, and service refers to a function performable by the electronic equipment. An available service or device refers to a service or device that is operably connected for potentially using network data communicated in the data network, not necessarily that the service or device is currently operational for doing so.)

In an embodiment, a vehicle consist includes a plurality of vehicles, each having one or more available devices configured for deployment thereon. The plurality of vehicles includes a lead vehicle, as described above, and at least one trail vehicle. Upon joining the vehicles together in the consist, in an embodiment, a database of services and devices available across all the networked vehicles in the consist is constructed, to avoid conflicts in routing data in the network. In an embodiment, the database is a part of at least one available device (e.g., a monitoring device and/or signal transmitting device) of the lead vehicle and is accessible by at least one of the trail vehicles. The database may also be referred to as a master service list or routing list. Additional devices or services may be registered/listed in the database as the devices or services are joined to the network, including the services and devices/available devices of the lead vehicle.

In an embodiment, the operability of available devices/ devices and services may be automatically determined based on port scan and/or network traffic to/from that component/ device, at 3202. One of the available devices on the lead vehicle, such as a monitoring device (e.g., controller) and associated database, may orchestrate a periodic scan of available devices (and new devices) to maintain the master service and routing list, at 3204. Scanning may include determining available services. Remote router transceiver units, for example, may be utilized to coordinate available services with the monitoring device. In this respect, trail vehicles do not need to know anything about the broad consist network, IP addresses of other vehicles in the consist, etc., but instead simply maintain a list of available services and/or devices thereon which can be communicated to the lead vehicle of the consist for compilation in the master device/service list.

Once the routing list/master service list is constructed, various threads of software, known as agents, can provide the information contained in the list to the devices across the consist, assist the devices in the routing of messages, and/or provide complete failover control of message routing to trail vehicles, as described herein. As noted above, the lead vehicle (or another designated vehicle) in the consist gathers and maintains the list of available services/devices and is capable of delegating services to trail vehicles (or other delegate vehicles) in the consist.

In an embodiment, the consist also includes a failover mechanism. An available device on the lead vehicle (or other designated vehicle of the consist), such as the monitoring device (e.g., controller), may also determine, in addition to the services and devices available across all the vehicles, which devices can or cannot be failed over to working devices. In an embodiment, a list of the devices that can/ cannot be failed over can be constructed and maintained by the lead vehicle (or other designated vehicle of the consist) by any of device type, IP address range, or configuration file setup.

In operation, if a device is designated as a device that can be failed over, then message traffic may be routed according to a routing algorithm (executed by the monitoring device and/or signal transmitting device) to a substantially equivalent device on another vehicle for processing, such as at 3206. In an embodiment, the routing algorithm may use a method, such as SNMP, to periodically scan to determine if a device is still operational. If the device is operational, then data/messages/traffic will continue to be delivered to the device and the device will be listed with the master service list that the device is operational as a candidate that can receive messages/data/traffic from another vehicle. As will be readily appreciated, such an operational status also means that the device is also available to receive another device's failover messages. For example, if a 220 MHz radio fails on the lead locomotive, the traffic may be automatically routed to a 220 MHz radio on a trailing vehicle to maintain functionality for the consist as a whole.

In connection with the system described above, at any point in time, a device on a vehicle of the consist can request data/messages/traffic to be routed to an off-board vehicle (e.g., to another vehicle in the consist). The system (e.g., monitoring device and/or signal transmitting unit) can coordinate that traffic so that traffic is routed between the vehicles, delivered, and then any response routed back again.

With certain systems, such as Ethernet over MU systems, any traffic that comes into the Ethernet port of the consist is sent to all the other Ethernet over MU devices, whether desired or not. In contrast to this, the inventive subject matter only routes traffic that is destined for another vehicle, instead of all traffic.

FIG. 7 is a schematic diagram of a system 3120 for managing network services among vehicles in a consist. The consist includes a first available device 3122 positioned in a first vehicle 3124 in the consist, and a second available device 3126 positioned in a second vehicle 3128 in the consist. The first and second available devices 3122, 3126 are substantially equivalent in function. The system comprises a monitoring device 3330 configured for deployment on one of the vehicles in the consist and to communicate with the first and second available devices 3122, 3126. The monitoring device is further configured to determine respective operational statuses of the first and second available devices 3122, 3126. The system further comprises a signal transmitting device 3332 configured to communicate with the first and second available devices 3122, 3126 and configured to route data traffic to one of the first available device 3122 or the second available device 3126 when the monitoring unit 3330 determines that the other of the first available device or the second available device is in a failure state. As described above, in an embodiment, the monitoring unit and the signal transmitting device may be a controller or a computer.

Figure 34:
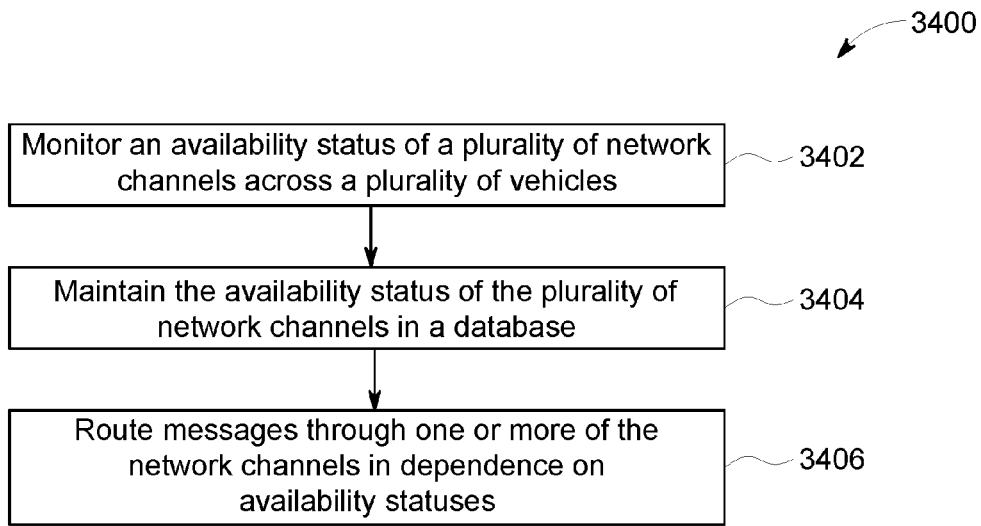
FIG. 34 is a flowchart illustrating an example method for managing a high-availability network for a vehicle consist, according to one embodiment.
Figure 35:
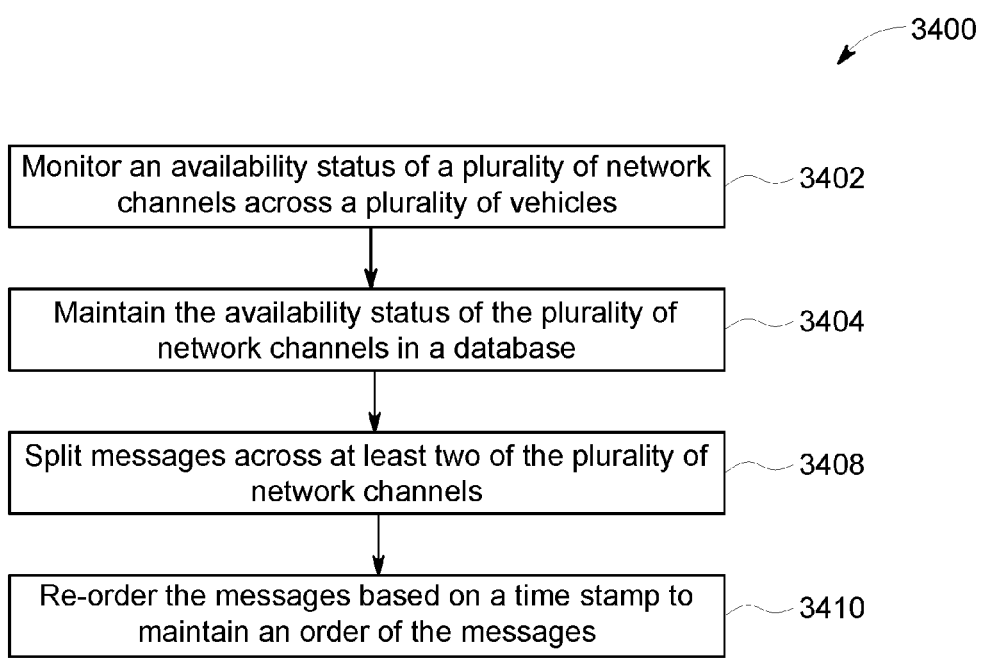
FIG. 35 is a flowchart illustrating an example method for managing a high-availability network for a vehicle consist, according to another embodiment.
Figure 36:
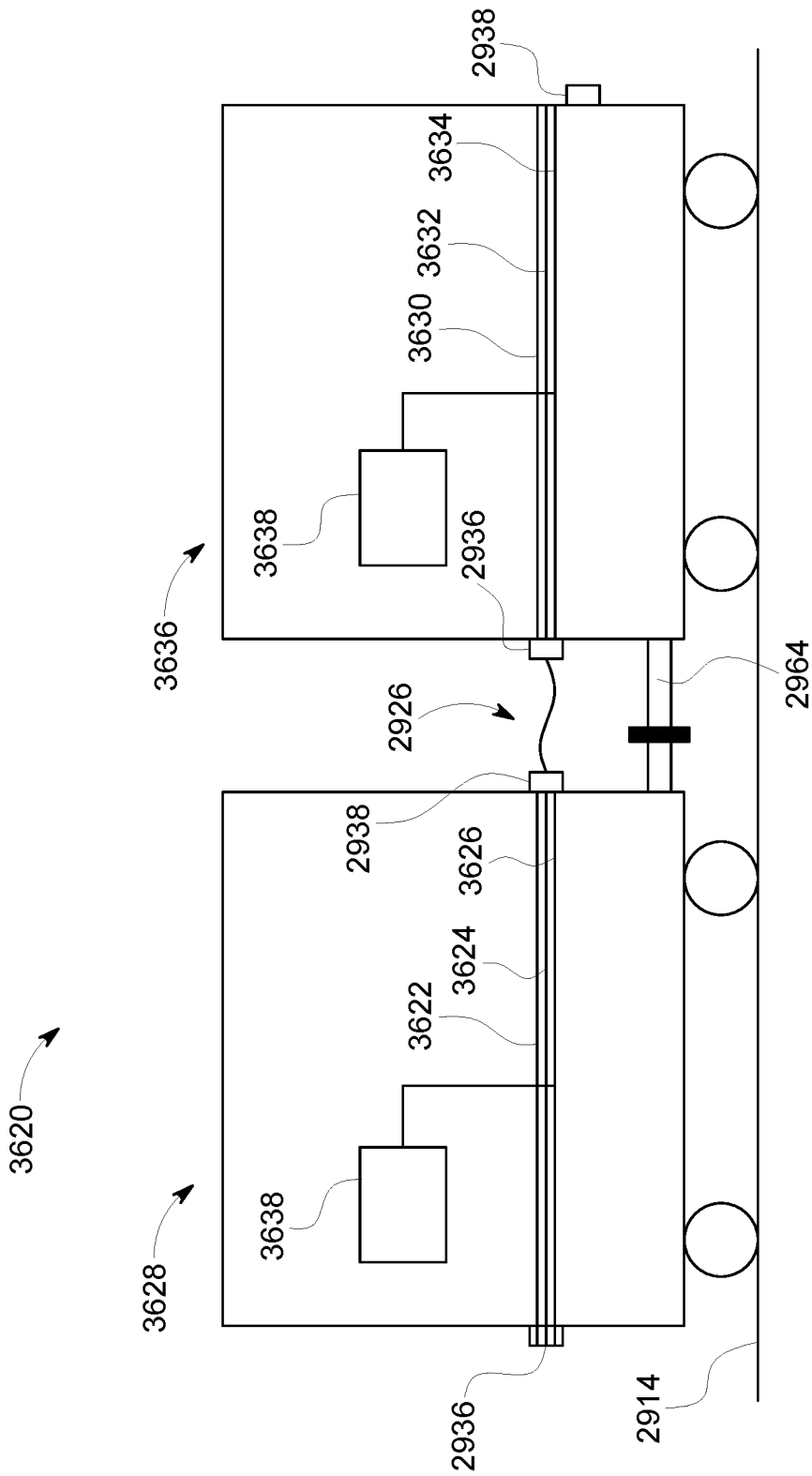
FIG. 36 is a schematic diagram of a system for managing a high-availability network for a vehicle consist, according to one embodiment.

Yet other embodiments of the inventive subject matter relate to a high-availability data network for a vehicle consist, and a method for creating and maintaining the same. FIGS. 34 and 35 illustrate example methods for managing a high-availability network for a vehicle consist. In an embodiment, multiple networks are first created by any one or more of separate physical pathways (e.g., separate trainline wires or other separate cables/conductors), different network keys that allows traffic separation but network coordination between transmissions, and/or utilization of different encryption technologies so the networks are separate but such that there is no coordination of traffic between devices. In an embodiment, once the hardware (e.g., Ethernet bridges such as Ethernet over MU router transceiver units) for the network is established, then the network is configured to use the different network keys or different encryption technologies to create the high-availability network. In another embodiment, the high-availability network may be constructed by running separate Ethernet bridge (e.g., Ethernet over MU) lines adjacent one another.

In connection with the above, in an embodiment, the inventive subject matter relates to a method for determining which types of networks are available such that traffic can be routed to the correct vehicles in the consist. Similar to the embodiment described above, at least one electronic component monitors an operational status of the network channels of each vehicle in the consist, such as at 3402. The lead vehicle (or another designated vehicle) maintains a database/routing list of what networks/channels are available and operational across each vehicle in the consist and which are non-operational, such as at 3404, so that traffic can be routed across the consist, at 3406, to desired vehicles accordingly, as described hereinafter.

First, if a vehicle is present that has only one available network or network channel, e.g., the network channel is not redundant, then communications/traffic that are sent and received by the devices on such vehicle occurs on this network or network channel. Accordingly, because the routing list knows that the device on this vehicle only has a single available network or network channel, this network or channel is automatically selected for any traffic to that vehicle/device.

In an embodiment, for vehicles that have more than one available channel/network, the traffic to devices on such vehicles, or across such vehicles, may be split across both paths, at 3408, and re-ordered at 3410, based on time stamp so that no out of order messaging occurs.

In another embodiment, the system may be configured such that messages/traffic are always sent across a primary network or network channel(s), with status check messages between network communication devices (e.g., router transceiver units) to check the integrity of a secondary network or network channel(s) so that messages/traffic may be switched over to the secondary network or network channel(s) with a high degree of confidence that the secondary network is available.

In an embodiment, management of the high-availability network involves keeping track of the communications networks/network channel(s) that are available across each vehicle in the consist, from both a configuration and operation standpoint. If vehicle does not have a high-availability option, e.g., only a single network/network channel is operational, then traffic will always be routed down that particular channel, as described above. In contrast, if a vehicle does have another network/network channel, an available device will periodically check for the operability of the alternate network or channel, as well as notify the lead vehicle (or other designated vehicle of the consist, e.g., network lead vehicle) of the success or failure (operability or non-operability) of that channel. Traffic that may appear back at the source over the other channel(s) accidentally may also be filtered out of the overall traffic that is supposed to be received, by analyzing the packets' routing information.

FIG. 3610 is a schematic diagram of a system 3620 for managing network services among vehicles in a consist. As shown therein, the system 3620 includes a first plurality of communication channels (or networks), e.g., channels 3622, 3624, 3626, associated with a first vehicle 3628, a second plurality of communication channels (or networks), e.g., channels 3630, 3632, 3634 associated with a second vehicle 3636, and a routing unit 3638 configured to communicate over the first and second pluralities of communication channels (3622, 3624, 3626 and 3630, 3632, 3634). The routing unit 3638 is configured for routing a message through at least one of the first plurality of communication channels 3622, 3624, 3626 of the first vehicle 3628 or at least one of the second plurality of channels 3630, 3632, 3634 of the second locomotive 3636 in dependence upon respective operational statuses of the first and second pluralities of communication channels (3622, 3624, 3626 and 3630, 3632, 3634).

Figure 37:
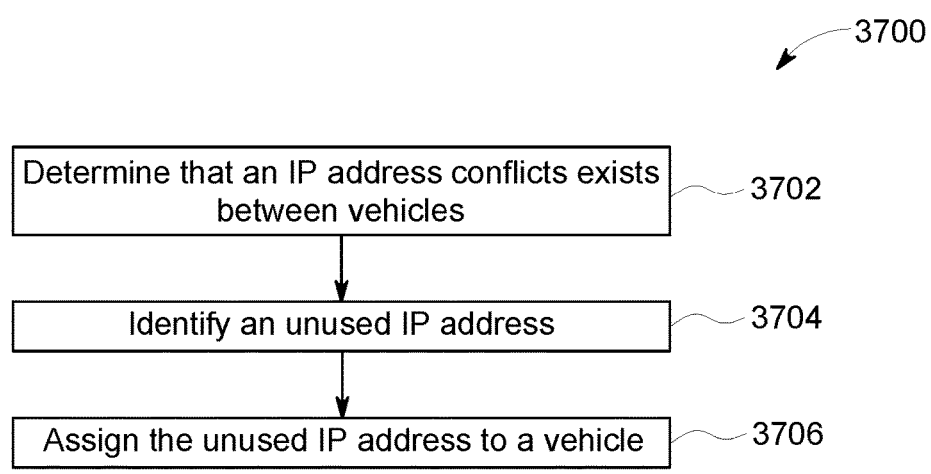
FIG. 37 is a flowchart illustrating an example method for resolving a conflict between IP addresses of vehicles in a consist, in accordance with one embodiment.

As shown in FIGS. 37 and 38, other embodiments of the inventive subject matter to relate to a method and system for handling IP addressing (or other network addressing) between multiple vehicle networks or multiple vehicles in a consist having the same IP address or other network address. As will be readily appreciated, when a vehicle is connected to another vehicle, it is possible that the vehicles will have the same IP address (static or dynamic). In order to have vehicles with the same IP address co-exist on the same network, in one or more embodiments, an IP address configuration method is utilized to resolve the conflict.

In an embodiment, a method for configuring IP addresses for vehicles in a consist includes utilizing fixed but configurable IP addresses so that the vehicles can all be on the same subnet (e.g., WAN-type subnet). This will allow for communications between vehicles as long as the communications are routed to the same subnet. In the method, for the last octet of the IP address, a vehicle will use a MAC address entry (e.g., fixed) to translate and determine the last octet. For example, a MAC address of xx-xx-xx-xx-10 would correspond to using an IP address of xxx.xxx.xxx.16. In another embodiment, the vehicle system ID may be utilized, however, conflicts may still manifest. Accordingly, in order to resolve duplicates in vehicle system ID items, a customer number may be used.

In any event, it is possible that IP address conflicts between vehicles in a consist may still be encountered. Accordingly, the inventive subject matter also relates to a method for resolving a conflict between IP addresses of vehicles. FIG. 37 illustrates an example method 3700 for resolving a conflict between IP addresses of vehicles in a consist. The method includes the steps of determining that a first vehicle in the consist has an IP address that is the same as the IP address of a second vehicle in the consist (at 3702), identifying an unused IP address (at 3704), and assigning the unused IP address to either the first vehicle or the second vehicle (at 3706). An unused IP address may be identified by listening for an unused IP address on the channel.

In another embodiment, the conflict may be resolved by using a different MAC address entry for the IP address determination in event of a conflict for the conflicting vehicles. In another embodiment, the IP address conflict may be resolved by using signal level or any other dynamic but specific factor in determining a difference between the Ethernet over MU units so a decision can be made as to which vehicle should move to another IP address.

FIG. 38 is a schematic diagram of a system 3820 for resolving a conflict between IP addresses of vehicles in a consist. As shown therein, the system includes a conflict determination module 3822 configured for deployment on and/or in communication with a first locomotive 3824 having a first IP address and a second vehicle 3826 having a second IP address, and configured to determine that the first IP address is the same as the second IP address and a controller 3828 configured for deployment on at least one of the first vehicle 3824 and the second vehicle 3826 and further configured for identifying an unused IP address. The controller 3828 or other available device can assign the unused IP address to one of the first vehicle 3824 and the second vehicle 3826. In an embodiment, the controller 3828 may function as the conflict determination module 3822.

An embodiment relates to a communication method for a consist comprising a plurality of vehicles. The method comprises linking the plurality of vehicles to establish a data network. For example, linking may include communicating over a communications path established between the vehicles, according to established protocols, in a manner that is designated for establishing the data network. The method further comprises designating a first vehicle of the plurality of vehicles as a network lead vehicle of the data network. The method further comprises designating a second vehicle of the plurality of vehicles as a network trail vehicle of the data network. The method further comprises communicating network data between the plurality of vehicles based at least in part on the first vehicle designated as the network lead vehicle and the second vehicle designated as the network trail vehicle.

In another embodiment, the method further comprises controlling operations of at least one of the plurality of vehicles based on the network data that is communicated.

In another embodiment, the method further comprises designating all vehicles of the plurality of vehicles other than the first vehicle as network trail vehicles and communicating the network data between the plurality of vehicles based at least in part on said all vehicles of the plurality of vehicles other than the first vehicle designated as the network trail vehicles.

In another embodiment of the method, the first vehicle is designated as the network lead vehicle based on one or more positions of one or more of the vehicles in the consist.

In another embodiment of the method, the first vehicle is designated as the network lead vehicle based on the first vehicle being a leading vehicle of the consist in a designated direction of travel of the consist.

In another embodiment of the method, the first vehicle is designated as the network lead vehicle based on a sequence of vehicles added to the consist.

In another embodiment of the method, the steps of designating the first vehicle as the network lead vehicle and designating the second vehicle as the network trail vehicle are carried out automatically after the plurality of vehicles being linked to establish the data network.

In another embodiment of the method, the step of designating the first vehicle as the network lead vehicle comprises configuring the first vehicle for operations as the network lead vehicle and communicating status information indicative of the first vehicle designated as the network lead vehicle to the second vehicle, and configuring the second vehicle for operations as the network trail vehicle.

In another embodiment, the method further comprises the first vehicle, responsive to the designation of the first vehicle as the network lead vehicle, at least one of configuring plural services available to entities in the data network or coordinating data traffic in the data network.

In another embodiment of the method, configuring the plural services comprises at least one of storing, creating, or updating at least one master routing table of the services.

In another embodiment, the method further comprises the first vehicle transitioning services between the plurality of vehicles.

In another embodiment, the method further comprises the first and second vehicles communicating setup data to one another. The first vehicle is designated as the network lead vehicle and the second is designated as the network trail vehicle based at least in part on the setup data. The step of communicating the setup data is carried out automatically after the plurality of vehicles being linked to establish the data network.

In another embodiment, the method further comprises, after a third vehicle being added to the consist: communicating setup data at least between the third vehicle and the first vehicle; and based on the setup data, either: designating the third vehicle as an additional network trail vehicle of the data network; or designating the third vehicle as the network lead vehicle in conjunction with designating the first vehicle as an additional network trail vehicle of the data network.

In an embodiment where the vehicles are rail vehicles (e.g., locomotives) in a rail vehicle consist, a communication method comprises linking the plurality of rail vehicles (e.g., locomotives) to establish a data network. The method further comprises designating a first rail vehicle (e.g., a first locomotive) of the plurality of rail vehicles (e.g., locomotives) as a network lead rail vehicle (e.g., network lead locomotive) of the data network. The method further comprises designating a second rail vehicle (e.g., a second locomotive) of the plurality of locomotives or other rail vehicles as a network trail rail vehicle (e.g., network trail locomotive) of the data network. The method further comprises communicating network data between the plurality of rail vehicles (e.g., locomotives) based at least in part on the first rail vehicle (e.g., first locomotive) designated as the network lead rail vehicle (e.g., network lead locomotive) and the second rail vehicle (e.g., second locomotive) designated as the network trail rail vehicle (e.g., network trail locomotive).

In another embodiment, the method further comprises controlling operations of at least one of the plurality of rail vehicles (e.g., locomotives) based on the network data that is communicated.

In another embodiment, the method further comprises designating all rail vehicles (e.g., locomotives) of the plurality of rail vehicles (e.g., locomotives) other than the first rail vehicle (e.g., first locomotive) as network trail rail vehicles (e.g., network trail locomotives) and communicating the network data between the plurality of rail vehicles (e.g., locomotives) based at least in part on said all rail vehicles (e.g., locomotives) of the plurality of rail vehicles (e.g., locomotives) other than the first rail vehicle (e.g., first locomotive) designated as the network trail rail vehicles (e.g., network trail locomotives).

In another embodiment of the method, the first rail vehicle (e.g., first locomotive) is designated as the network lead rail vehicle (e.g., network lead locomotive) based on one or more positions of one or more of the rail vehicles (e.g., locomotives) in the consist.

In another embodiment of the method, the first rail vehicle (e.g., first locomotive) is designated as the network lead rail vehicle (e.g., network lead locomotive) based on the first rail vehicle (e.g., first locomotive) being a leading rail vehicle (e.g., leading locomotive) of the consist in a designated direction of travel of the consist.

In another embodiment of the method, the first rail vehicle (e.g., first locomotive) is designated as the network lead rail vehicle (e.g., network lead locomotive) based on a sequence of rail vehicles (e.g., locomotives) added to the consist.

In another embodiment of the method, the steps of designating the first rail vehicle (e.g., first locomotive) as network lead rail vehicle (e.g., network lead locomotive) and designating the second rail vehicle (e.g., second locomotive) as the network trail rail vehicle (e.g., network trail locomotive) are carried out automatically subsequent to the plurality of rail vehicles (e.g., locomotives) being linked to establish the data network.

In another embodiment of the method, the step of designating the first rail vehicle (e.g., first locomotive) as the network lead rail vehicle (e.g., network lead locomotive) comprises configuring the first rail vehicle (e.g., first locomotive) for operations as the network lead rail vehicle (e.g., network lead locomotive) and communicating status information indicative of the first rail vehicle (e.g., first locomotive) designated as the network lead rail vehicle (e.g., network lead locomotive) to the second rail vehicle (e.g., second locomotive), and configuring the second rail vehicle (e.g., second locomotive) for operations as the network trail rail vehicle (e.g., network trail locomotive).

In another embodiment, the method further comprises the first rail vehicle (e.g., first locomotive), responsive to the designation of the first rail vehicle (e.g., first locomotive) as the network lead rail vehicle (e.g., network lead locomotive), at least one of configuring plural services available to entities in the data network or coordinating data traffic in the data network. In another embodiment of the method, configuring the plural services comprises at least one of storing, creating, or updating at least one master routing table of the services.

In another embodiment, the method further comprises the first rail vehicle (e.g., first locomotive) controlling transitioning services between the plurality of rail vehicles (e.g., locomotives).

In another embodiment, the method further comprises the first and second rail vehicles (e.g., first and second locomotives) communicating setup data to one another. The first rail vehicle (e.g., first locomotive) is designated as the network lead rail vehicle (e.g., network lead locomotive) and the second is designated as the network trail rail vehicle (e.g., network trail locomotive) based at least in part on the setup data. The step of communicating the setup data is carried out automatically subsequent to the plurality of rail vehicles (e.g., locomotives) being linked to establish the data network.

In another embodiment, the method further comprises, subsequent to a third locomotive or other rail vehicle being added to the consist: communicating setup data at least between the third locomotive (or other rail vehicle) and the first rail vehicle (e.g., first locomotive); and based on the setup data, either: designating the third locomotive (or other rail vehicle) as an additional network trail rail vehicle (e.g., additional network trail locomotive) of the data network; or designating the third locomotive (or other rail vehicle) as the network lead rail vehicle (e.g., network lead locomotive) in conjunction with designating the first rail vehicle (e.g., first locomotive) as an additional network trail rail vehicle (e.g., additional network trail locomotive) of the data network.

Another embodiment relates to a communication system (e.g., for a vehicle consist) comprising a first controller unit configured for operative coupling in a first vehicle. The first controller unit is configured, when the first vehicle is linked with one or more second vehicles in a data network of a consist, to designate one of the first vehicle or one of the one or more second vehicles as a network lead vehicle of the data network and to designate all other vehicles in the consist as network trail vehicles of the data network. The first controller unit is further configured to control communications of network data between the first vehicle and the one or more second vehicles based at least in part on the network lead vehicle and network trail vehicle designations.

In another embodiment of the communication system, the first controller unit is configured to designate the network lead vehicle and the network trail vehicles according to at least one parameter of the consist. The at least one parameter comprises one or more of a position of the first vehicle relative to the one or more second vehicles in the consist, a sequence of vehicles added to the consist, or an identification of which vehicle in the consist is a leading vehicle of the consist in a designated direction of travel.

In another embodiment of the communication system, the first controller unit is configured to automatically control communication of setup data between the first vehicle and the one or more second vehicles subsequent to establishment of the data network in the consist. The first controller unit is configured to designate the network lead vehicle and the network trail vehicles based at least in part on the setup data. In another embodiment of the communication system, the first controller unit is configured to designate the network lead vehicle and the network trail vehicles according to at least one parameter of the consist. Further, information of the parameter is included in the setup data, and the at least one parameter comprises one or more of a position of the first vehicle relative to the one or more second vehicles in the consist, a sequence of vehicles added to the consist, or an identification of which vehicle in the consist is a leading vehicle of the consist in a designated direction of travel.

In another embodiment of the communication system, the first controller is configured, when the first vehicle is designated as the network lead vehicle, to at least one of configure plural services available to entities in the data network or coordinate data traffic in the data network.

Another embodiment relates to a communication system (e.g., for a train or other rail vehicle consist) comprising a first controller unit configured for operative coupling in a first rail vehicle (e.g., a first locomotive). The first controller unit is configured, when the first rail vehicle (e.g., first locomotive) is linked with one or more second rail vehicles (e.g., one or more second locomotives) in a data network of a consist, to designate one of the first rail vehicle (e.g., first locomotive) or one of the one or more second rail vehicles (e.g., one of the one or more second locomotives) as a network lead rail vehicle (e.g., network lead locomotive) of the data network and to designate all other rail vehicles (e.g., locomotives) in the consist as network trail rail vehicles (e.g., network trail locomotives) of the data network. The first controller unit is further configured to control communications of network data between the first rail vehicle (e.g., first locomotive) and the one or more second rail vehicles (e.g., one or more second locomotives) based at least in part on the network lead rail vehicle (e.g., network lead locomotive) and network trail rail vehicle (e.g., network trail locomotive) designations.

In another embodiment of the communication system, the first controller unit is configured to designate the network lead rail vehicle (e.g., network lead locomotive) and the network trail rail vehicles (e.g., network trail locomotives) according to at least one parameter of the consist. The at least one parameter comprises one or more of a position of the first rail vehicle (e.g., first locomotive) relative to the one or more second rail vehicles (e.g., one or more second locomotives) in the consist, a sequence of rail vehicles (e.g., locomotives) added to the consist, or an identification of which locomotive or other rail vehicle in the consist is a leading locomotive or other rail vehicle of the consist in a designated direction of travel.

In another embodiment of the communication system, the first controller unit is configured to automatically control communication of setup data between the first rail vehicle (e.g., first locomotive) and the one or more second rail vehicles (e.g., one or more second locomotives) after establishment of the data network in the consist. The first controller unit is configured to designate the network lead rail vehicle (e.g., network lead locomotive) and the network trail rail vehicles (e.g., network trail locomotives) based at least in part on the setup data. In another embodiment of the communication system, the first controller unit is configured to designate the network lead rail vehicle (e.g., network lead locomotive) and the network trail rail vehicles (e.g., network trail locomotives) according to at least one parameter of the consist. Further, information of the parameter is included in the setup data, and the at least one parameter comprises one or more of a position of the first rail vehicle (e.g., first locomotive) relative to the one or more second rail vehicles (e.g., one or more second locomotives) in the consist, a sequence of rail vehicles (e.g., locomotives) added to the consist, or an identification of which locomotive or other rail vehicle in the consist is a leading locomotive or other rail vehicle of the consist in a designated direction of travel.

In another embodiment of the communication system, the first controller is configured, when the first rail vehicle (e.g., first locomotive) is designated as the network lead rail vehicle (e.g., network lead locomotive), to at least one of: configure plural services available to entities in the data network or coordinate data traffic in the data network.

In another embodiment of a communication system, the communication system comprises a first controller unit configured for operative coupling in a first vehicle. The first controller unit is configured, when the first vehicle is linked with one or more second vehicles in a data network of a consist, to enter a first designated mode of operation responsive to communications between the first vehicle and the one or more second vehicles for selecting the first vehicle to operate in the first designated mode of operation and the one or more second vehicles to operate in a different, second designated mode of operation. The first controller unit is further configured, when in the first designated mode of operation, to at least one of: coordinate data traffic in the data network of the consist; and/or configure and manage services available to plural entities of the data network of the consist.

In another embodiment of a communication system, the communication system comprises a first controller unit configured for operative coupling in a first locomotive or other first rail vehicle. The first controller unit is configured, when the first locomotive (or other first rail vehicle) is linked with one or more second vehicles (e.g., one or more second locomotives) in a data network of a consist, to enter a first designated mode of operation responsive to communications between the first locomotive (or other first rail vehicle) and the one or more second rail vehicles (e.g., one or more second locomotives) for selecting the first rail vehicle (e.g., first locomotive) to operate in the first designated mode of operation and the one or more second rail vehicles (e.g., one or more second locomotives) to operate in a different, second designated mode of operation. The first controller unit is further configured, when in the first designated mode of operation, to at least one of: coordinate data traffic in the data network of the consist; and/or configure and manage services available to plural entities of the data network of the consist.

In an embodiment, a method for communications in a vehicle consist (e.g., a locomotive or other rail vehicle consist) comprises determining that a first vehicle in the vehicle consist (e.g., a first locomotive or other first rail vehicle) has a network address (e.g., a first IP address) that is the same as a network address (e.g., a second IP address) of a second vehicle in the vehicle consist (e.g., a second locomotive or other second rail vehicle). The method further comprises identifying a first unused network address (e.g., generating, calculating, determining, or the like), and communicating signals for assignment of the first unused network address to one of the first vehicle or the second vehicle. By referring to a vehicle having a network address, this includes: the vehicle itself having the network address associated with the vehicle; and/or that a component of the vehicle capable of network communications has the network address assigned, determined, or otherwise associated with it.

In another embodiment, the method further comprises assigning the network address of the first vehicle and/or the network address of the second vehicle based on a first MAC (media access control) address associated with a data network of the vehicle consist. (In other words, according to one aspect, the first and second network addresses may be initially generated based on the first MAC address.) The unused network address is identified based on a different, second MAC address associated with the data network.

In another embodiment, the method further comprises identifying a second unused network address based on the second MAC address, and communicating second signals for assignment of the second unused network address to the other of the one of the first vehicle or the second vehicle (i.e., to whichever of the vehicles was not assigned the first unused network address).

In another embodiment, the method further comprises determining a difference between dynamic (i.e., changing or changeable) operational states of network equipment (e.g., signal levels) of the first vehicle and network equipment of the second vehicle. The first unused network address is determined based at least in part on the difference that is determined.

In another embodiment, the method further comprises determining a difference between dynamic operational states of network equipment of the first vehicle and network equipment of the second vehicle, wherein the first vehicle or the second vehicle to which the first unused network address is assigned is selected based at least in part on the difference that is determined.

In another embodiment, the method further comprises assigning the network address of the first vehicle and/or the network address of the second vehicle based at least in part on at least one vehicle identifier associated with at least one of the first vehicle or the second vehicle. For example, the vehicle identifiers may be locomotive road numbers, automobile VIN's, fleet numbers, license plate numbers, or the like.

In another embodiment, the method further comprises communicating data to the first vehicle and/or to the second vehicle based on the first unused network address assigned to the first vehicle or the second vehicle and on the network address of the other of the first vehicle or the second vehicle.

In another embodiment, the method further comprises controlling the vehicle consist for movement along a route based on the data that is communicated to the first vehicle and/or the second vehicle.

In another embodiment, the first unused network address that is assigned to the first vehicle or the second vehicle and the network address of the other of the first vehicle or the second vehicle are associated with a same subnet (e.g., WAN-type subnet) of a data network of the vehicle consist.

In another embodiment, the first unused network address is identified by listening to a channel of a data network of the vehicle consist (e.g., processing incoming data indicative that the unused network address is available).

In another embodiment, a method for communications in a vehicle consist (e.g., a locomotive or other rail vehicle consist) comprises determining (e.g., calculating, identifying, allocating, or the like) a first network address (e.g., a first IP address) for a first vehicle in the vehicle consist (e.g., a first locomotive or other first rail vehicle) and a second network address (e.g., a second IP address) for a second vehicle in the vehicle consist (e.g., a second locomotive or other second rail vehicle). The first vehicle and the second vehicle are linked in a data network. The method further comprises identifying a conflict between the first network address and the second network address. For example, the conflict might be that the first network address is the same as the second network address. Responsive to identifying the conflict, the method further comprises selecting the first vehicle for network address re-assignment (i.e., one of the first vehicle or the second vehicle is selected, and in this example, the first vehicle is selected). The method further comprises determining a third network address that is not in conflict with the second network address of the second vehicle, and assigning the third network address to the first vehicle in place of the first network address. Data is communicated in the data network based at least in part on the second network address and the third network address.

In another embodiment, the first network address and the second network address are determined based on a first MAC address associated with the data network. The third network address is determined based on a different, second MAC address associated with the data network.

In another embodiment, the method further comprises identifying a fourth network address based on the second MAC address, and assigning the fourth network address to the second vehicle in place of the second network address.

In another embodiment, the method further comprises determining at least one of the first network address, the second network address, or the third network address based at least in part on at least one vehicle identifier associated with at least one of the first vehicle or the second vehicle.

In another embodiment, the method further comprises controlling the vehicle consist for movement along a route based on the data that is communicated.

In another embodiment, a method for communications in a vehicle consist (e.g., a locomotive or other rail vehicle consist) comprises determining that a first vehicle in the vehicle consist (e.g., a first locomotive or other first rail vehicle) has a first network address that is the same as a second network address of a second vehicle in the vehicle consist (e.g., a second locomotive or other second rail vehicle). The first vehicle and the second vehicle are linked in a network. The method further comprises identifying an unused network address of the network, and communicating signals for assignment of the unused network address to one of the first vehicle or the second vehicle.

In another embodiment of the method, the determining step is automatically carried out responsive to when the first and second vehicles are linked and communicate to establish the network.

In another embodiment, the method further comprises, at the one of the first vehicle or the second vehicle to which the signals are communicated, using the unused network address in place of the first network address or the second network address, as applicable, for communications in the network.

In another embodiment, a method for communications in a vehicle consist (e.g., a locomotive or other rail vehicle consist) comprises generating first and second network addresses for first and second vehicles in the consist, respectively, based on at least one of vehicle identifiers respectively associated with the first and second vehicles and/or a first MAC address associated with a data network. (The vehicles of the vehicle consist are linked to form the data network, for data communications with the consist.) The method further comprises, if the first and second network addresses are the same: generating third and fourth network addresses for the first and second vehicles, respectively, based on a different, second MAC address associated with the data network (e.g., the third and fourth network addresses are used in place of the first and second network addresses); and/or determining a third network address that is different from the first and second network addresses, and assigning the third network address to the first vehicle or to the second vehicle.

Another embodiment relates to a system for communications in a vehicle consist (e.g., a locomotive or other rail vehicle consist). The system comprises a conflict determination module configured for communication with a first vehicle (e.g., a first locomotive or other first rail vehicle) having a first network address (e.g., a first IP address) and a second vehicle (e.g., a second locomotive or other second rail vehicle) having a second network address (e.g., a second IP address). The conflict determination module is further configured to determine if the first network address is the same as the second network address. The system further comprises a control module configured for deployment on at least one of the first vehicle or the second vehicle and further configured to identify an unused network address. The control module is configured to assign the unused network address to one of the first vehicle or the second vehicle if the conflict determination module determines that the first network address is the same as the second network address.

In another embodiment of the system, the conflict determination module and the control module are integrated into a single unit.

In another embodiment of the system, the unused network address is identified (e.g., determined, generated, or the like) and/or assigned at least in part by one or more of the following: assessing communications of data on a channel of the network for the unused network address; using a different MAC address entry for identifying the unused network address in event of a conflict for the conflicting vehicles; and/or using signal level or any other dynamic but designated factor in determining which of the first or second vehicles to communicate the signals to for assignment of the unused network address.

As noted, in any of the embodiments, the network addresses may be IP addresses.

Another embodiment relates to a communication method. The method comprises, in a vehicle consist comprising a plurality of vehicles connected in a data network, storing in a first vehicle of the consist a list of available services that are available across one or more of the vehicles of the consist connected in the data network. For example, the services may comprise functions that can be performed by available devices of the network, which process, communicate, or otherwise use network data. (As noted above, "available" service or device refers to a service or device that is operably connected for potentially using network data that is communicated in the data network, not necessarily that the service or device is currently operational for doing so.) The method further comprises, at the first vehicle, communicating first information of the list of available services to other vehicles in the consist.

In another embodiment, the communication method further comprises, at the first vehicle, receiving second information of the available services, and creating and/or revising the list based on the received second information.

In another embodiment, the communication method further comprises, at the first vehicle, periodically transmitting control signals to other vehicles in the consist, and receiving the second information responsive to the control signals.

In another embodiment, the communication method further comprises one or more of the vehicles in the consist periodically transmitting the second information to the first vehicle.

In another embodiment, the communication method further comprises routing data within the data network of the vehicle consist based on the list of available services. The method may further comprise controlling the vehicle consist for travel along a route based at least in part on the data.

In another embodiment, the communication method further comprises receiving a request for the list of available services from a network device in the consist, and communicating the first information to the network device responsive to receiving the request.

In another embodiment, the communication method further comprises storing information of available devices that are available across one or more of the vehicles of the consist connected in the data network.

In another embodiment, the communication method further comprises storing, for one or more of the available services, respective failover information indicative of services and/or devices in the data network that are substantially equivalent to the one or more of the available services. The method further comprises routing data based on the failover information if one of the one or more available services ceases to become available. The data may be routed to a different vehicle in the consist than a designated recipient vehicle of the consist (i.e., the data may be routed to a vehicle other than the vehicle to which the data is addressed).

In another embodiment, the communication method further comprises monitoring plural available devices of the vehicles of the consist to determine respective operational statuses of the available devices, and maintaining the list of available services based at least in part on the operational statuses of the available devices that are monitored.

In another embodiment of a communication method in a vehicle consist comprising a plurality of vehicles linked together in a data network, the method comprises monitoring plural available devices of the vehicles in the consist to determine respective operational statuses of the plural available devices. The method further comprises maintaining information of the operational statuses of the plural available devices in a database, and communicating the information of the operational statuses to the plural vehicles in the consist.

In another embodiment, the communication method further comprises routing data in the data network of the vehicle consist based at least in part on the information of the operational statuses of the plural available devices. For example, the data may be routed to a second, substantially equivalent available device of the consist if a first available device to which the data is addressed is non-operational.

In another embodiment of the communication method, monitoring the plural available devices of the vehicles in the consist comprises receiving information relating to the plural available devices from the vehicles. Additionally or alternatively, the information of the operational statuses may be communicated to the plural vehicles in the consist responsive to receiving requests from the plural vehicles.

In another embodiment of a communication method in a vehicle consist comprising a plurality of vehicles linked together in a data network, the method comprises receiving information of respective operational statuses of plural available devices and/or services of the vehicles in the consist. The method further comprises maintaining information of the operational statuses of the plural available devices and/or services in a database, communicating the information of the operational statuses to the plural vehicles in the consist, and routing data in the data network based at least in part on the information of the operational statuses.

Another embodiment relates to a communication system. The system comprises a monitoring device configured for deployment on board a vehicle consist having a plurality of vehicles linked together in a data network. The monitoring device is further configured to communicate with plural available devices of the vehicles for determining respective operational statuses of the available devices. The monitoring device is further configured to store information of the operational statuses of the available devices (e.g., the information may be stored in a database that is operably coupled to the monitoring device). The system further comprises a signal transmitting device configured for deployment on board the vehicle consist, and further configured to communicate the information of the operational statuses of the available devices to the plural vehicles and/or to route network data based on the information of the operational statuses of the available devices.

In another embodiment of the communication system, the signal transmitting device is configured to route the network data to a substantially equivalent device of the plural available devices if an available device to which the network data is addressed enters a failure state. As noted above, failure state means a state incapable of performing a designated function at all, or incapable of performing the designated function above designated performance level threshold(s).

In another embodiment of the communication system, the monitoring device is a simple network management protocol (SNMP) supported router.

Another embodiment relates to a method for communications in a vehicle consist. The method comprises monitoring respective operational statuses of a plurality of network channels across a plurality of vehicles in the consist, and routing messages through one or more of the network channels in dependence upon the monitored operational statuses of the network channels.

In another embodiment of the method, the plurality of network channels comprises at least one channel of a first network and at least one channel of a second network. The first and second networks are at least logically distinct.

In another embodiment of the method, the first network and the second network are established by way of at least one of: the first network having a first physical pathway that is different than a second physical pathway of the second network; the first network having a first network key that is different than a second network key of the second network; and/or the first network having a first data encryption that is different than a second data encryption of the second network.

In another embodiment, the method further comprises splitting the messages across the plurality of network channels, and re-ordering the messages based on a time-stamp to maintain an order of the messages. (In the case of plural networks, the messages are split across the plural network channels of the plural networks.) Splitting includes transmitting some messages across one channel and other messages across other channels, and/or transmitting some data packets of a message across one channel and other data packets of the message across a different, second channel.

In another embodiment, the method further comprises routing the messages through the at least one channel of the first network only, unless the at least one channel of the first network is unavailable, in which case the method comprises routing the messages through the at least one channel of the second network.

In another embodiment, the method further comprises filtering duplicates of the messages and duplicate portions of the messages that are routed over plural of the network channels. More specifically, if in communicating over the plural network channels message and/or packet duplication occurs, duplicate messages and packets are identified and deleted.

In another embodiment, the method further comprises maintaining the operational statuses of the plurality of network channels in a database. In another embodiment, alternatively or additionally, the method further comprises communicating the operational statuses to the plurality of vehicles.

In another embodiment of a method for communications in a vehicle consist, the method comprises monitoring respective operational statuses of a first network and a second network of the vehicle consist. The first and second networks are at least logically distinct. The method further comprises routing messages through the first network and the second network based at least in part on the monitored operational statuses of the first network and the second network.

In another embodiment of the method, if the first network and the second network are operational, the method comprises at least one of routing the messages through the first network only, or splitting the messages for routing over both the first network and the second network. On the other hand, if the first network is non-operational, the messages are routed through the second network.

In another embodiment of the method, the method further comprises re-ordering the messages that are split for routing over both the first network and the second network based on a time-stamp to maintain an order of the messages.

In another embodiment of the method, the method further comprises filtering duplicates of the messages and duplicate portions of the messages that are routed over both the first network and the second network.

In another embodiment of a method for communications in a vehicle consist, the method comprises, at a first vehicle of the vehicle consist, transmitting and/or receiving first signals of a first network established between the first vehicle and one or more second vehicles of the vehicle consist. The method further comprises, at the first vehicle, transmitting and/or receiving second signals of a second network established between the first vehicle and one or more second vehicles of the vehicle consist. The first and second networks are at least logically distinct. In another embodiment, a system comprises a communication unit comprising one or more hardware and/or software modules configured for transmitting and/or receiving first and second signals according to: at a first vehicle of the vehicle consist, transmitting and/or receiving first signals of a first network established between the first vehicle and one or more second vehicles of the vehicle consist; and at the first vehicle, transmitting and/or receiving second signals of a second network established between the first vehicle and one or more second vehicles of the vehicle consist.

In another embodiment of the method, the first and second networks have a plurality of network channels, and the method further comprises monitoring respective operational statuses of the plurality of network channels across the plurality of vehicles in the consist, and routing messages through one or more of the network channels in dependence upon the monitored operational statuses of the network channels.

In another embodiment, the method further comprises translating the first signals for transmission as the second signals over the second network.

In another embodiment, the method further comprises tracking whether the first network and the second network are operational in the second vehicles, and routing the first signals and/or the second signals based on the tracking.

Another embodiment relates to a system for communications in a vehicle consist. The system comprises a routing unit configured for communication across a first plurality of communication channels associated with a first vehicle of the vehicle consist and a second plurality of communication channels associated with a second vehicle of the vehicle consist. The routing unit is configured for deployment on board one of the first vehicle or the second vehicle. The routing unit is further configured for routing a message through at least one of the first plurality of communication channels and at least one of the second plurality of channels in dependence upon respective operational statuses of the first and second pluralities of communication channels.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories)

may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
    a control unit configured to determine a vehicle identifier for a first remote vehicle included in a vehicle consist formed from a lead vehicle and at least the first remote vehicle;
    a communication unit configured to communicate a wireless linking message addressed to the vehicle identifier from the lead vehicle to the first remote vehicle, the communication unit also configured to establish a communication link between the lead vehicle and the first remote vehicle responsive to receipt of the wireless linking message at the first remote vehicle, wherein the control unit is configured to remotely control movement of the first remote vehicle from the lead vehicle via the communication link, and wherein the communication link is established without an operator entering the first remote vehicle; and
    wherein the control unit is configured to determine the vehicle identifier by receiving a list of one or more unique identifying codes associated with at least the first remote vehicle from an energy management system that creates a trip plan to control movement of the vehicle consist, the trip plan designating operational settings of the vehicle consist as a function of one or more of time, location, or distance along a route.

2. The system of claim 1, wherein one or more of the first remote vehicle or the lead vehicle is one or more of an automobile or a truck.

3. The system of claim 1, wherein one or more of the first remote vehicle or the lead vehicle is an aerial drone.

4. The system of claim 1, wherein the communication unit is configured to receive a wireless linking confirmation message from the first remote vehicle at the lead vehicle responsive to the wireless linking message being received at the first remote vehicle.

5. The system of claim 1, wherein the control unit is configured to determine the vehicle identifier by receiving a list of one or more unique identifying codes associated with at least the first remote vehicle from a vehicle control system that restricts movement of the vehicle consist based at least in part on a location of the vehicle consist.

6. The system of claim 5, wherein the vehicle control system includes a positive train control system.

7. The system of claim 1, wherein the vehicle consist includes the lead vehicle, the first remote vehicle, and at least a second remote vehicle, and wherein the control unit is configured to determine the vehicle identifier by determining a first unique vehicle identifier for the first remote vehicle and at least a second unique vehicle identifier for at least the second remote vehicle, the communication unit configured to communicate the wireless linking message by communicating a first wireless linking message to the first remote vehicle and communicating at least a second wireless linking message to at least the second remote vehicle, and
    wherein the communication unit is configured to establish the communication link by establishing a first communication link between the lead vehicle and the first remote vehicle and at least a second communication link between the lead vehicle and at least the second remote vehicle.

8. The system of claim 7, wherein the control unit is configured to detect a single instance of an operator actuating an input device onboard the lead vehicle and the communication unit is configured to communicate the first wireless linking message and the at least the second wireless linking message responsive to the control unit detecting the single instance of the operator actuating the input device.

9. The system of claim 1, wherein the communication unit is configured to communicate the wireless linking message by broadcasting the wireless linking message such that the first remote vehicle receives the wireless linking message and at least one other remote vehicle that is located within a wireless communication range of the communication unit but that is not included in the vehicle consist receives the wireless linking message, and wherein the communication unit is configured to prevent the at least one other remote vehicle from establishing a communication link with the lead vehicle based at least in part on the vehicle identifier.

* * * * *